US012323558B2

(12) United States Patent
Magi et al.

(10) Patent No.: US 12,323,558 B2
(45) Date of Patent: Jun. 3, 2025

(54) TECHNOLOGIES FOR VIDEO CONFERENCING

(71) Applicant: Intel Corporation, Santa Clara, CA (US)

(72) Inventors: Aleksander Magi, Portland, OR (US); Soethiha Soe, Beaverton, OR (US); Marko Bartscherer, Cornelius, OR (US); Prakash Kurma Raju, Bangalore (IN); Arvind Sundaram, Bangalore (IN); Ayeshwarya B. Mahajan, Banglaore (IN); Akarsha Rajeshwar Kadadevaramath, Karnataka (IN); Gokul V. Subramaniam, Bangalore (IN); Raghavendra Doddi, Banglaore (IN); Prasanna Pichumani, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 920 days.

(21) Appl. No.: 17/213,680

(22) Filed: Mar. 26, 2021

(65) Prior Publication Data
US 2021/0218845 A1     Jul. 15, 2021

(51) Int. Cl.
*H04M 3/56*     (2006.01)
*G06F 3/01*     (2006.01)
(Continued)

(52) U.S. Cl.
CPC ............ *H04M 3/568* (2013.01); *G06F 3/013* (2013.01); *G06V 40/103* (2022.01); *H04N 7/142* (2013.01); *H04N 7/155* (2013.01)

(58) Field of Classification Search
CPC ......... H04M 3/568; H04M 2203/6081; H04M 3/18; H04M 3/567; G06F 3/013; G06F 3/0412; G06F 3/04184; G06V 40/103; G06V 20/49; G06V 40/18; H04N 7/142; H04N 7/155; H04N 7/147; H04N 7/15
See application file for complete search history.

(56) References Cited

U.S. PATENT DOCUMENTS 8,248,448 B2   8/2012   Feng et al.
8,542,266 B2   9/2013   Leviav et al.
(Continued)

OTHER PUBLICATIONS

EPO; Extended European Search Report issued in EP Patent Application No. 22156965.0, dated Jul. 18, 2022; 8 pages.
(Continued)

*Primary Examiner* — Yosef K Laekemariam
(74) *Attorney, Agent, or Firm* — Alliance IP, LLC

(57) ABSTRACT

Techniques for video conferencing are disclosed. In one embodiment, a mirror assembly can be used to position a mirror in front of a camera, reflecting a view of the camera downward towards a whiteboard or other drawing surface, allowing a user to show a drawing during a video conference. In another embodiment, video data and audio data of a user in a video conference can be analyzed to determine what portions of the video data and audio data should be transmitted to a remote participant in the video conference. Unintentional input supplied by the user in the video data and audio data may be used to determine which portions of the video data and audio data to transmit.

23 Claims, 26 Drawing Sheets

(51) Int. Cl.
*G06V 40/10* (2022.01)
*H04N 7/14* (2006.01)
*H04N 7/15* (2006.01)

(56) References Cited

U.S. PATENT DOCUMENTS

| | | | |
|---|---|---|---|
| 10,873,697 B1* | 12/2020 | Jain | H04N 21/234318 |
| 2008/0298571 A1* | 12/2008 | Kurtz | G06F 3/017 |
| | | | 348/E7.083 |
| 2012/0154510 A1 | 6/2012 | Huitema et al. | |
| 2021/0109585 A1 | 4/2021 | Fleming et al. | |

OTHER PUBLICATIONS

U.S. Appl. No. 17/247,836, filed Dec. 24, 2020, entitled "Lid Controller Hub," by Marko Bartscherer Aleksander Magi, Paul Diefenbaugh, and Prashant Dewan.

* cited by examiner

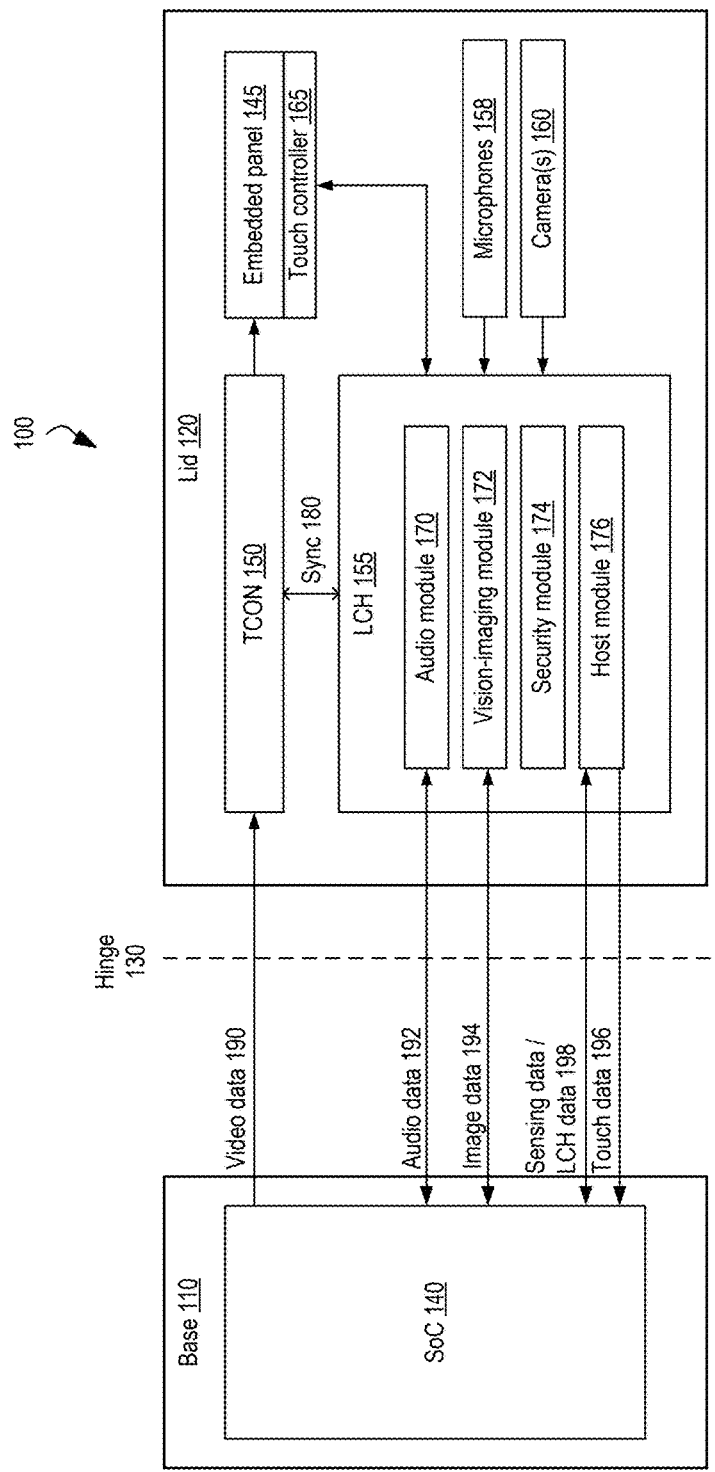
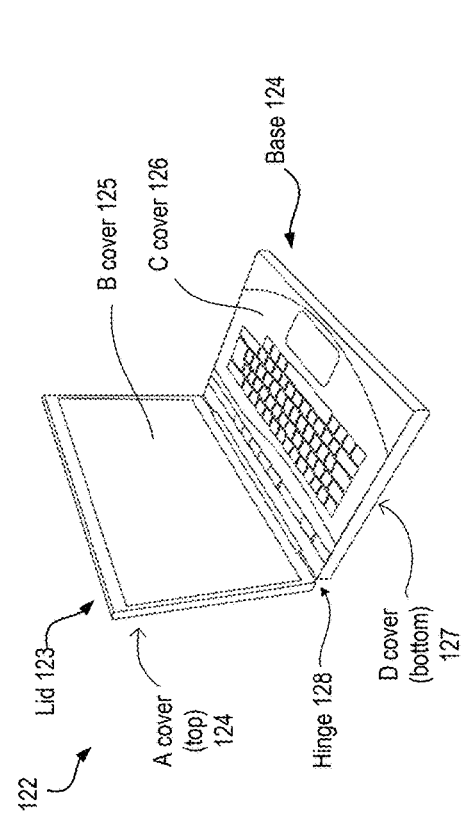
FIG. 1A
FIG. 1B

1100

| Signals | Data | Power | Total | Comments |
|---|---|---|---|---|
| Display | 19 | 16 | 35 | eDP x4 HBR2, 6 OEM signals |
| Image | 6 | 8 | 14 | 1 MP camera |
| Touch | 4 | 2 | 6 | I2C |
| Audio & Sensing | 8 | 2 | 10 | DMIC, I2C, INT |
| LCH | 7 | 0 | 7 | USB, QSPI |
| Total wires | 44 | 28 | 72 | |

FIG. 11A

1110

| Wires | Data | Power | Total | Comments |
|---|---|---|---|---|
| Display | 14 | 4 | 18 | eDP x2 HBR2, 6 OEM signals, lid power |
| Image | 6 | 0 | 6 | 1 MP camera |
| Touch | 4 | 0 | 4 | I2C |
| Audio & Sensing | 8 | 0 | 8 | DMIC, I2C, INT |
| LCH | 3 | 0 | 3 | USB, QSPI |
| Total wires | 35 | 4 | 39 | |

FIG. 11B

1120

| Wires | Data | Power | Total | Comments |
|---|---|---|---|---|
| Display | 8 | 4 | 12 | eDP x2 HBR2, lid power |
| Image | 8 | 0 | 8 | Dual cameras - RGB 2MP, IR |
| Touch | 0 | 0 | 0 | Touch over USB |
| Audio & Sensing | 4 | 0 | 4 | Soundwire |
| LCH | 5 | 0 | 5 | USB |
| Total wires | 25 | 4 | 29 | |

FIG. 11C

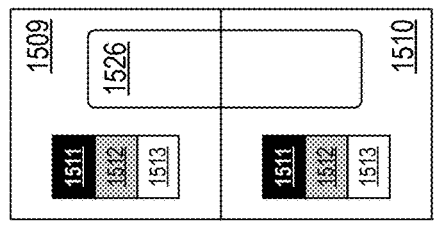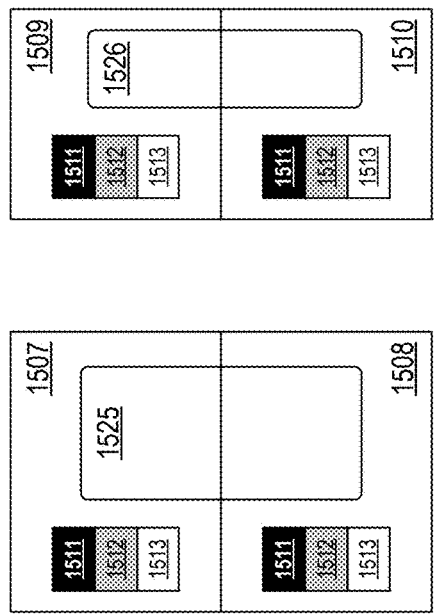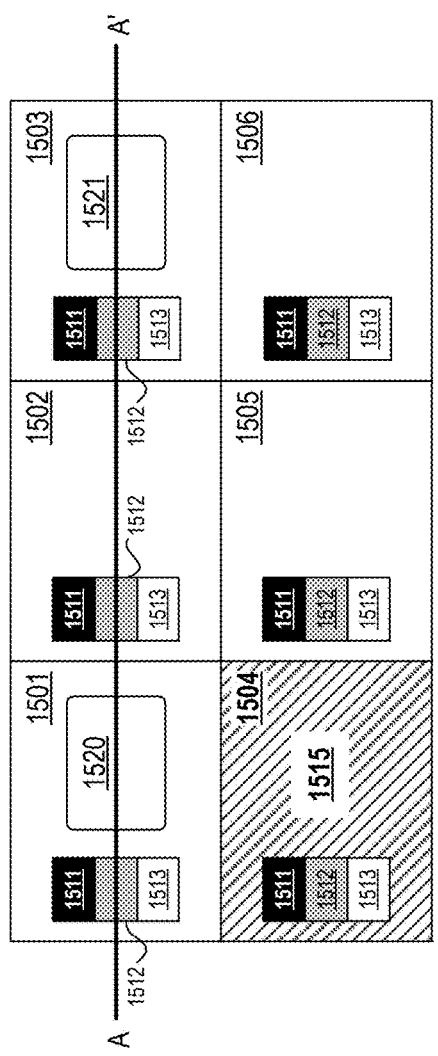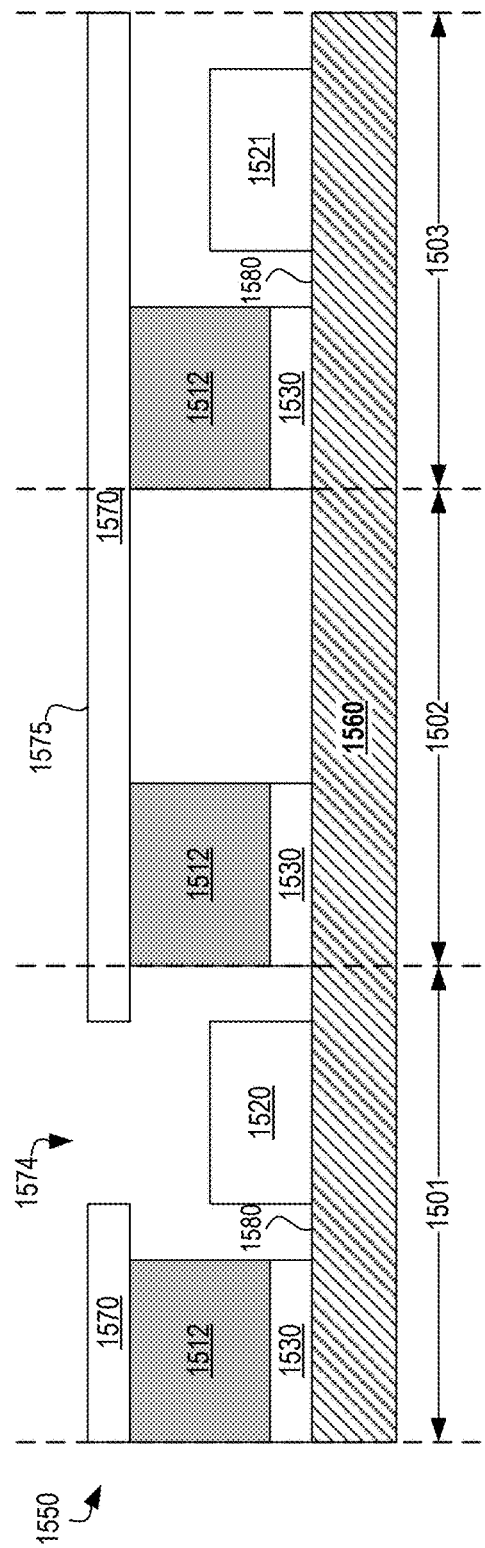

TECHNOLOGIES FOR VIDEO CONFERENCING

BACKGROUND

Video conferencing has become an important tool for both business and personal use. Widespread use of video conferencing has demonstrated both the advantages and the challenges presented by the technology. One such challenge is managing distractions, noise, camera framing, etc., in a variety of single- and multi-user environments. Another challenge is developing replacements for tools used in in-person meetings, such as whiteboards.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 1A illustrates a block diagram of a first example computing device comprising a lid controller hub.

FIG. 1B illustrates a perspective view of a second example mobile computing device comprising a lid controller hub.

FIGS. 11A-11C show tables breaking down the hinge wire count for various lid controller hub embodiments.

FIG. 15A illustrates a set of example pixels with in-display cameras.

FIG. 15B illustrates a cross-section of the example pixels of FIG. 15A taken along the line A-A'.

FIGS. 15C-15D illustrate example cameras that span multiple pixels.

DETAILED DESCRIPTION OF THE DRAWINGS

Figure 2:
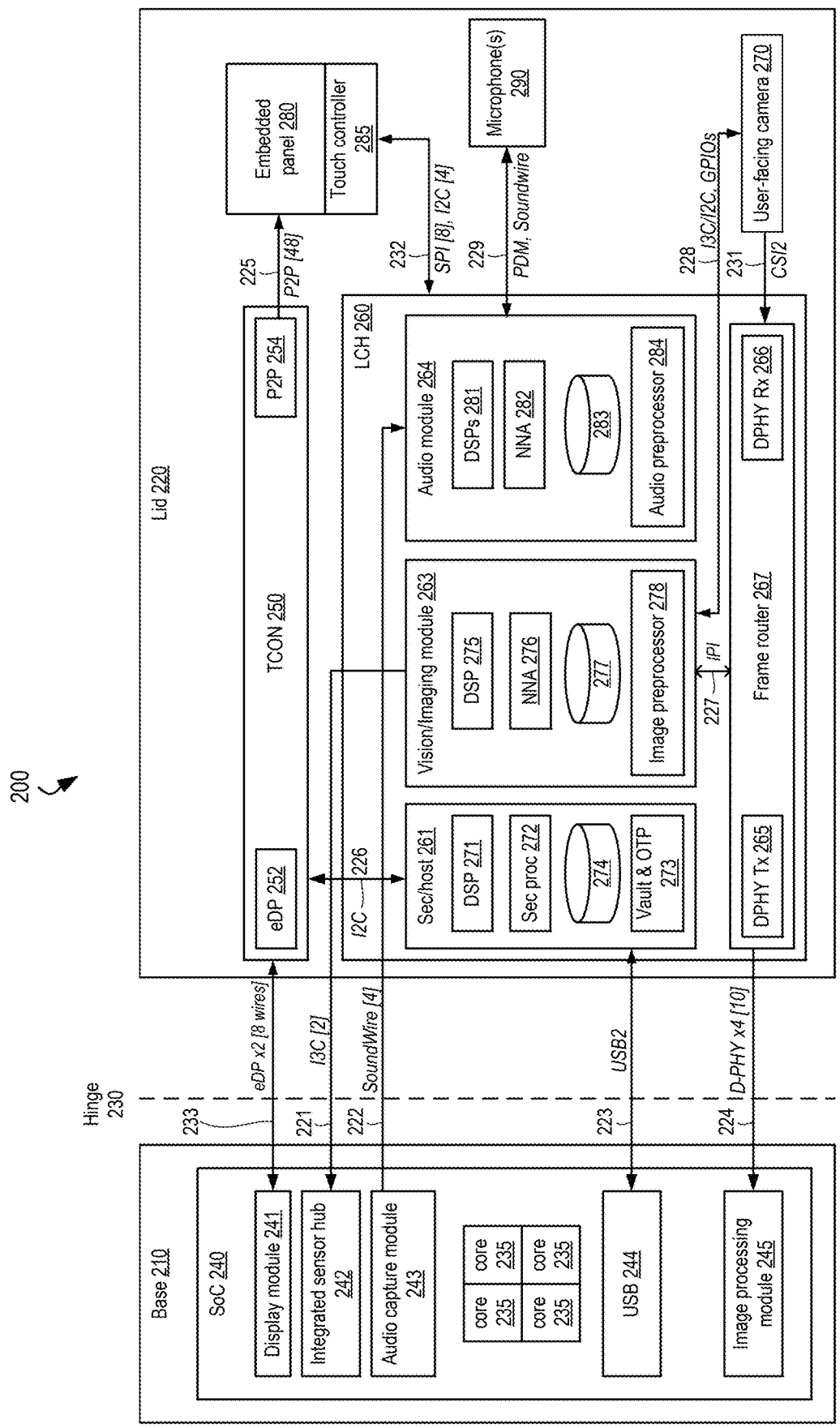
FIG. 2 illustrates a block diagram of a third example mobile computing device comprising a lid controller hub.

Lid controller hubs are disclosed herein that perform a variety of computing tasks in the lid of a laptop or computing devices with a similar form factor. A lid controller hub can process sensor data generated by microphones, a touchscreen, cameras, and other sensors located in a lid. A lid controller hub allows for laptops with improved and expanded user experiences, increased privacy and security, lower power consumption, and improved industrial design over existing devices. For example, a lid controller hub allows the sampling and processing of touch sensor data to be synchronized with a display's refresh rate, which can result in a smooth and responsive touch experience. The continual monitoring and processing of image and audio sensor data captured by cameras and microphones in the lid allow a laptop to wake when an authorized user's voice or face is detected. The lid controller hub provides enhanced security by operating in a trusted execution environment. Only properly authenticated firmware is allowed to operate in the lid controller hub, meaning that no unwanted applications can access lid-based microphones and cameras and that image and audio sensor data processed by the lid controller hub to support lid controller hub features stay local to the lid controller hub.

Enhanced and improved experiences are enabled by the lid controller hub's computing resources. For example, neural network accelerators within the lid controller hub can blur displays or faces in the background of a video call or filter out the sound of a dog barking in the background of an audio call. Further, power savings are realized through the use of various techniques such as enabling sensors only when they are likely to be in use, such as sampling touch display input at a typical sampling rates when touch interaction is detected. Also, processing sensor data locally in the lid instead of having to send the sensor data across a hinge to have it processed by the operating system provides for latency improvements. Lid controller hubs also allow for laptop designs in which fewer wires are carried across a hinge. Not only can this reduce hinge cost, it can result in a simpler and thus more aesthetically pleasing industrial design. These and other lid controller hub features and advantages are discussed in greater detail below.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1A illustrates a block diagram of a first example mobile computing device comprising a lid controller hub. The computing device 100 comprises a base 110 connected to a lid 120 by a hinge 130. The mobile computing device (also referred to herein as "user device") 100 can be a laptop or a mobile computing device with a similar form factor. The base 110 comprises a host system-on-a-chip (SoC) 140 that comprises one or more processor units integrated with one or more additional components, such as a memory controller, graphics processing unit (GPU), caches, an image processing module, and other components described herein. The base 110 can further comprise a physical keyboard, touchpad, battery, memory, storage, and external ports. The lid 120 comprises an embedded display panel 145, a timing controller (TCON) 150, a lid controller hub (LCH) 155, microphones 158, one or more cameras 160, and a touch controller 165. TCON 150 converts video data 190 received from the SoC 140 into signals that drive the display panel 145.

The display panel 145 can be any type of embedded display in which the display elements responsible for generating light or allowing the transmission of light are located in each pixel. Such displays may include TFT LCD (thin-film-transistor liquid crystal display), micro-LED (micro-light-emitting diode (LED)), OLED (organic LED), and QLED (quantum dot LED) displays. A touch controller 165 drives the touchscreen technology utilized in the display panel 145 and collects touch sensor data provided by the employed touchscreen technology. The display panel 145 can comprise a touchscreen comprising one or more dedicated layers for implementing touch capabilities or 'in-cell' or 'on-cell' touchscreen technologies that do not require dedicated touchscreen layers.

The microphones 158 can comprise microphones located in the bezel of the lid or in-display microphones located in the display area, the region of the panel that displays content. The one or more cameras 160 can similarly comprise cameras located in the bezel or in-display cameras located in the display area.

LCH 155 comprises an audio module 170, a vision/imaging module 172, a security module 174, and a host module 176. The audio module 170, the vision/imaging module 172 and the host module 176 interact with lid sensors process the sensor data generated by the sensors. The audio module 170 interacts with the microphones 158 and processes audio sensor data generated by the microphones 158, the vision/imaging module 172 interacts with the one or more cameras 160 and processes image sensor data generated by the one or more cameras 160, and the host module 176 interacts with the touch controller 165 and processes touch sensor data generated by the touch controller 165. A synchronization signal 180 is shared between the timing controller 150 and the lid controller hub 155. The synchronization signal 180 can be used to synchronize the sampling of touch sensor data and the delivery of touch sensor data to the SoC 140 with the refresh rate of the display panel 145 to allow for a smooth and responsive touch experience at the system level.

As used herein, the phrase "sensor data" can refer to sensor data generated or provided by sensor as well as sensor data that has undergone subsequent processing. For example, image sensor data can refer to sensor data received at a frame router in a vision/imaging module as well as processed sensor data output by a frame router processing stack in a vision/imaging module. The phrase "sensor data" can also refer to discrete sensor data (e.g., one or more images captured by a camera) or a stream of sensor data (e.g., a video stream generated by a camera, an audio stream generated by a microphone). The phrase "sensor data" can further refer to metadata generated from the sensor data, such as a gesture determined from touch sensor data or a head orientation or facial landmark information generated from image sensor data.

The audio module 170 processes audio sensor data generated by the microphones 158 and in some embodiments enables features such as Wake on Voice (causing the device 100 to exit from a low-power state when a voice is detected in audio sensor data), Speaker ID (causing the device 100 to exit from a low-power state when an authenticated user's voice is detected in audio sensor data), acoustic context awareness (e.g., filtering undesirable background noises), speech and voice pre-processing to condition audio sensor data for further processing by neural network accelerators, dynamic noise reduction, and audio-based adaptive thermal solutions.

The vision/imaging module 172 processes image sensor data generated by the one or more cameras 160 and in various embodiments can enable features such as Wake on Face (causing the device 100 to exit from a low-power state when a face is detected in image sensor data) and Face ID (causing the device 100 to exit from a low-power state when an authenticated user's face is detected in image sensor data). In some embodiments, the vision/imaging module 172 can enable one or more of the following features: head orientation detection, determining the location of facial landmarks (e.g., eyes, mouth, nose, eyebrows, cheek) in an image, and multi-face detection.

The host module 176 processes touch sensor data provided by the touch controller 165. The host module 176 is able to synchronize touch-related actions with the refresh rate of the embedded panel 145. This allows for the synchronization of touch and display activities at the system level, which provides for an improved touch experience for any application operating on the mobile computing device.

Thus, the LCH 155 can be considered to be a companion die to the SoC 140 in that the LCH 155 handles some sensor data-related processing tasks that are performed by SoCs in existing mobile computing devices. The proximity of the LCH 155 to the lid sensors allows for experiences and capabilities that may not be possible if sensor data has to be sent across the hinge 130 for processing by the SoC 140. The proximity of LCH 155 to the lid sensors reduces latency, which creates more time for sensor data processing. For example, as will be discussed in greater detail below, the LCH 155 comprises neural network accelerators, digital signals processors, and image and audio sensor data processing modules to enable features such as Wake on Voice, Wake on Face, and contextual understanding. Locating LCH computing resources in proximity to lid sensors also allows for power savings as lid sensor data needs to travel a shorter length—to the LCH instead of across the hinge to the base.

Lid controller hubs allow for additional power savings. For example, an LCH allows the SoC and other components in the base to enter into a low-power state while the LCH monitors incoming sensor data to determine whether the device is to transition to an active state. By being able to wake the device only when the presence of an authenticated user is detected (e.g., via Speaker ID or Face ID), the device can be kept in a low-power state longer than if the device were to wake in response to detecting the presence of any person. Lid controller hubs also allow the sampling of touch inputs at an embedded display panel to be reduced to a lower rate (or be disabled) in certain contexts. Additional power savings enabled by a lid controller hub are discussed in greater detail below.

As used herein the term "active state" when referencing a system-level state of a mobile computing device refers to a state in which the device is fully usable. That is, the full capabilities of the host processor unit and the lid controller hub are available, one or more applications can be executing, and the device is able to provide an interactive and responsive user experience—a user can be watching a movie, participating in a video call, surfing the web, operating a computer-aided design tool, or using the device in one of a myriad of other fashions. While the device is in an active state, one or more modules or other components of the device, including the lid controller hub or constituent modules or other components of the lid controller hub, can be placed in a low-power state to conserve power. The host processor units can be temporarily placed in a high-performance mode while the device is in an active state to accommodate demanding workloads. Thus, a mobile computing device can operate within a range of power levels when in an active state.

As used herein, the term "low-power state" when referencing a system-level state of a mobile computing device refers to a state in which the device is operating at a lower power consumption level than when the device is operating in an active state. Typically, the host processing unit is operating at a lower power consumption level than when the device is in an active state and more device modules or other components are collectively operating in a low-power state than when the device is in an active state. A device can operate in one or more low-power states with one difference between the low-power states being characterized by the power consumption level of the device level. In some embodiments, another difference between low-power states is characterized by how long it takes for the device to wake in response to user input (e.g., keyboard, mouse, touch, voice, user presence being detected in image sensor data, a user opening or moving the device), a network event, or input from an attached device (e.g., USB device). Such low-power states can be characterized as "standby", "idle", "sleep" or "hibernation" states.

In a first type of device-level low-power state, such as ones characterized as an "idle" or "standby" low-power state, the device can quickly transition from the low-power state to an active state in response to user input, hardware or network events. In a second type of device-level low-power state, such as one characterized as a "sleep" state, the device consumes less power than in the first type of low-power state and volatile memory is kept refreshed to maintain the device state. In a third type of device-level low-power state, such as one characterized as a "hibernate" low-power state, the device consumes less power than in the second type of low-power state. Non-volatile memory is not kept refreshed and the device state is stored in non-volatile memory. The device takes a longer time to wake from the third type of low-power state than from a first or second type of low-power state due to having to restore the system state from non-volatile memory. In a fourth type of low-power state, the device is off and not consuming power. Waking the device from an off state requires the device to undergo a full reboot. As used herein, waking a device refers to a device transitioning from a low-power state to an active state.

In reference to a lid hub controller, the term "active state", refers to a lid hub controller state in which the full resources of the lid hub controller are available. That is, the LCH can be processing sensor data as it is generated, passing along sensor data and any data generated by the LCH based on the sensor data to the host SoC, and displaying images based on video data received from the host SoC. One or more components of the LCH can individually be placed in a low-power state when the LCH is in an active state. For example, if the LCH detects that an authorized user is not detected in image sensor data, the LCH can cause a lid display to be disabled. In another example, if a privacy mode is enabled, LCH components that transmit sensor data to the host SoC can be disabled. The term "low-power" state, when referring to a lid controller hub can refer to a power state in which the LCH operates at a lower power consumption level than when in an active state, and is typically characterized by one or more LCH modules or other components being placed in a low-power state than when the LCH is in an active state. For example, when the lid of a computing device is closed, a lid display can be disabled, an LCH vision/imaging module can be placed in a low-power state and an LCH audio module can be kept operating to support a Wake on Voice feature to allow the device to continue to respond to audio queries.

A module or any other component of a mobile computing device can be placed in a low-power state in various manners, such as by having its operating voltage reduced, being supplied with a clock signal with a reduced frequency, or being placed into a low-power state through the receipt of control signals that cause the component to consume less power (such as placing a module in an image display pipeline into a low-power state in which it performs image processing on only a portion of an image).

In some embodiments, the power savings enabled by an LCH allow for a mobile computing device to be operated for a day under typical use conditions without having to be recharged. Being able to power a single day's use with a lower amount of power can also allow for a smaller battery to be used in a mobile computing device. By enabling a smaller battery as well as enabling a reduced number of wires across a hinge connecting a device to a lid, laptops comprising an LCH can be thinner and lighter and thus have an improved industrial design over existing devices.

In some embodiments, the lid controller hub technologies disclosed herein allow for laptops with intelligent collaboration and personal assistant capabilities. For example, an LCH can provide near-field and far-field audio capabilities that allow for enhanced audio reception by detecting the location of a remote audio source and improving the detection of audio arriving from the remote audio source location. When combined with Wake on Voice and Speaker ID capabilities, near- and far-field audio capabilities allow for a mobile computing device to behave similarly to the "smart speakers" that are pervasive in the market today. For example, consider a scenario where a user takes a break from working, walks away from their laptop, and asks the laptop from across the room, "What does tomorrow's weather look like?" The laptop, having transitioned into a low-power state due to not detecting the face of an authorized user in image sensor data provided by a user-facing camera, is continually monitoring incoming audio sensor data and detects speech coming from an authorized user. The laptop exits its low-power state, retrieves the requested information, and answers the user's query.

The hinge 130 can be any physical hinge that allows the base 110 and the lid 120 to be rotatably connected. The wires that pass across the hinge 130 comprise wires for passing video data 190 from the SoC 140 to the TCON 150, wires for passing audio data 192 between the SoC 140 and the audio module 170, wires for providing image data 194 from the vision/imaging module 172 to the SoC 140, wires for providing touch data 196 from the LCH 155 to the SoC 140, and wires for providing data determined from image sensor data and other information generated by the LCH 155 from the host module 176 to the SoC 140. In some embodiments, data shown as being passed over different sets of wires between the SoC and LCH are communicated over the same set of wires. For example, in some embodiments, touch data, sensing data, and other information generated by the LCH can be sent over a single USB bus.

In some embodiments, the lid 120 is removably attachable to the base 110. In some embodiments, the hinge can allow the base 110 and the lid 120 to rotate to substantially 360 degrees with respect to either other. In some embodiments, the hinge 130 carries fewer wires to communicatively couple the lid 120 to the base 110 relative to existing computing devices that do not have an LCH. This reduction in wires across the hinge 130 can result in lower device cost, not just due to the reduction in wires, but also due to being a simpler electromagnetic and radio frequency interface (EMI/RFI) solution.

The components illustrated in FIG. 1A as being located in the base of a mobile computing device can be located in a base housing and components illustrated in FIG. 1A as being located in the lid of a mobile computing device can be located in a lid housing.

FIG. 1B illustrates a perspective view of a secondary example mobile computing comprising a lid controller hub. The mobile computing device 122 can be a laptop or other mobile computing device with a similar form factor, such as a foldable tablet or smartphone. The lid 123 comprises an "A cover" 124 that is the world-facing surface of the lid 123 when the mobile computing device 122 is in a closed configuration and a "B cover" 125 that comprises a user-facing display when the lid 123 is open. The base 129 comprises a "C cover" 126 that comprises a keyboard that is upward facing when the device 122 is an open configuration and a "D cover" 127 that is the bottom of the base 129. In some embodiments, the base 129 comprises the primary computing resources (e.g., host processor unit(s), GPU) of the device 122, along with a battery, memory, and storage, and communicates with the lid 123 via wires that pass through a hinge 128. Thus, in embodiments where the mobile computing device is a dual-display device, such as a dual display laptop, tablet, or smartphone, the base can be regarded as the device portion comprising host processor units and the lid can be regarded as the device portion comprising an LCH. A Wi-Fi antenna can be located in the base or the lid of any computing device described herein.

In other embodiments, the computing device 122 can be a dual display device with a second display comprising a portion of the C cover 126. For example, in some embodiments, an "always-on" display (AOD) can occupy a region of the C cover below the keyboard that is visible when the lid 123 is closed. In other embodiments, a second display covers most of the surface of the C cover and a removable keyboard can be placed over the second display or the second display can present a virtual keyboard to allow for keyboard input.

Lid controller hubs are not limited to being implemented in laptops and other mobile computing devices having a form factor similar to that illustrated FIG. 1B. The lid controller hub technologies disclosed herein can be employed in mobile computing devices comprising one or more portions beyond a base and a single lid, the additional one or more portions comprising a display and/or one or more sensors. For example, a mobile computing device comprising an LCH can comprise a base; a primary display portion comprising a first touch display, a camera, and microphones; and a secondary display portion comprising a second touch display. A first hinge rotatably couples the base to the secondary display portion and a second hinge rotatably couples the primary display portion to the secondary display portion. An LCH located in either display portion can process sensor data generated by lid sensors located in the same display portion that the LCH is located in or by lid sensors generated in both display portions. In this example, a lid controller hub could be located in either or both of the primary and secondary display portions. For example, a first LCH could be located in the secondary display that communicates to the base via wires that pass through the first hinge and a second LCH could be located in the primary display that communicates to the base via wires passing through the first and second hinge.

FIG. 2 illustrates a block diagram of a third example mobile computing device comprising a lid controller hub. The device 200 comprises a base 210 connected to a lid 220 by a hinge 230. The base 210 comprises an SoC 240. The lid 220 comprises a timing controller (TCON) 250, a lid controller hub (LCH) 260, a user-facing camera 270, an embedded display panel 280, and one or more microphones 290.

The SoC 240 comprises a display module 241, an integrated sensor hub 242, an audio capture module 243, a Universal Serial Bus (USB) module 244, an image processing module 245, and a plurality of processor cores 235. The display module 241 communicates with an embedded DisplayPort (eDP) module in the TCON 250 via an eight-wire eDP connection 233. In some embodiments, the embedded display panel 280 is a "3K2K" display (a display having a 3K×2K resolution) with a refresh rate of up to 120 Hz and the connection 233 comprises two eDP High Bit Rate 2 (HBR2 (17.28 Gb/s)) connections. The integrated sensor hub 242 communicates with a vision/imaging module 263 of the LCH 260 via a two-wire Mobile Industry Processor Interface (MIPI) I3C (SenseWire) connection 221, the audio capture module 243 communicates with an audio module 264 of the LCH 260 via a four-wire MIPI SoundWire® connection 222, the USB module 244 communicates with a security/host module 261 of the LCH 260 via a USB connection 223, and the image processing module 245 receives image data from a MIPI D-PHY transmit port 265 of a frame router 267 of the LCH 260 via a four-lane MIPI D-PHY connection 224 comprising 10 wires. The integrated sensor hub 242 can be an Intel® integrated sensor hub or any other sensor hub capable of processing sensor data from one or more sensors.

The TCON 250 comprises the eDP port 252 and a Peripheral Component Interface Express (PCIe) port 254 that drives the embedded display panel 280 using PCIe's peer-to-peer (P2P) communication feature over a 48-wire connection 225.

The LCH 260 comprises the security/host module 261, the vision/imaging module 263, the audio module 264, and a frame router 267. The security/host module 261 comprises a digital signal processing (DSP) processor 271, a security processor 272, a vault and one-time password generator (OTP) 273, and a memory 274. In some embodiments, the DSP 271 is a Synopsis® DesignWare® ARC® EM7D or EM11D DSP processor and the security processor is a Synopsis® DesignWare® ARC® SEM security processor. In addition to being in communication with the USB module 244 in the SoC 240, the security/host module 261 communicates with the TCON 250 via an inter-integrated circuit (I2C) connection 226 to provide for synchronization between LCH and TCON activities. The memory 274 stores instructions executed by components of the LCH 260.

The vision/imaging module 263 comprises a DSP 275, a neural network accelerator (NNA) 276, an image preprocessor 278, and a memory 277. In some embodiments, the DSP 275 is a DesignWare® ARC® EM11D processor. The vising/imaging module 263 communicates with the frame router 267 via an intelligent peripheral interface (IPI) connection 227. The vision/imaging module 263 can perform face detection, detect head orientation, and enables device access based on detecting a person's face (Wake on Face) or an authorized user's face (Face ID) in image sensor data. In some embodiments, the vision/imaging module 263 can implement one or more artificial intelligence (AI) models via the neural network accelerators 276 to enable these functions. For example, the neural network accelerator 276 can implement a model trained to recognize an authorized user's face in image sensor data to enable a Wake on Face feature. The vision/imaging module 263 communicates with the camera 270 via a connection 228 comprising a pair of I2C or I3C wires and a five-wire general-purpose I/O (GPIO) connection. The frame router 267 comprises the D-PHY transmit port 265 and a D-PHY receiver 266 that receives image sensor data provided by the user-facing camera 270 via a connection 231 comprising a four-wire MIPI Camera Serial Interface 2 (CSI2) connection. The LCH 260 communicates with a touch controller 285 via a connection 232 that can comprise an eight-wire serial peripheral interface (SPI) or a four-wire I2C connection.

The audio module 264 comprises one or more DSPs 281, a neural network accelerator 282, an audio preprocessor 284, and a memory 283. In some embodiments, the lid 220 comprises four microphones 290 and the audio module 264 comprises four DSPs 281, one for each microphone. In some embodiments, each DSP 281 is a Cadence® Tensilica® HiFi DSP. The audio module 264 communicates with the one or more microphones 290 via a connection 229 that comprises a MIPI SoundWire® connection or signals sent via pulse-density modulation (PDM). In other embodiments, the connection 229 comprises a four-wire digital microphone (DMIC) interface, a two-wire integrated inter-IC sound bus (I2S) connection, and one or more GPIO wires. The audio module 264 enables waking the device from a low-power state upon detecting a human voice (Wake on Voice) or the voice of an authenticated user (Speaker ID), near- and far-field audio (input and output), and can perform additional speech recognition tasks. In some embodiments, the NNA 282 is an artificial neural network accelerator implementing one or more artificial intelligence (AI) models to enable various LCH functions. For example, the NNA 282 can implement an AI model trained to detect a wake word or phrase in audio sensor data generated by the one or more microphones 290 to enable a Wake on Voice feature.

In some embodiments, the security/host module memory 274, the vision/imaging module memory 277, and the audio module memory 283 are part of a shared memory accessible to the security/host module 261, the vision/imaging module 263, and the audio module 264. During startup of the device 200, a section of the shared memory is assigned to each of the security/host module 261, the vision/imaging module 263, and the audio module 264. After startup, each section of shared memory assigned to a module is firewalled from the other assigned sections. In some embodiments, the shared memory can be a 12 MB memory partitioned as follows: security/host memory (1 MB), vision/imaging memory (3 MB), and audio memory (8 MB).

Any connection described herein connecting two or more components can utilize a different interface, protocol, or connection technology and/or utilize a different number of wires than that described for a particular connection. Although the display module 241, integrated sensor hub 242, audio capture module 243, USB module 244, and image processing module 245 are illustrated as being integrated into the SoC 240, in other embodiments, one or more of these components can be located external to the SoC. For example, one or more of these components can be located on a die, in a package, or on a board separate from a die, package, or board comprising host processor units (e.g., cores 235).

Figure 3:
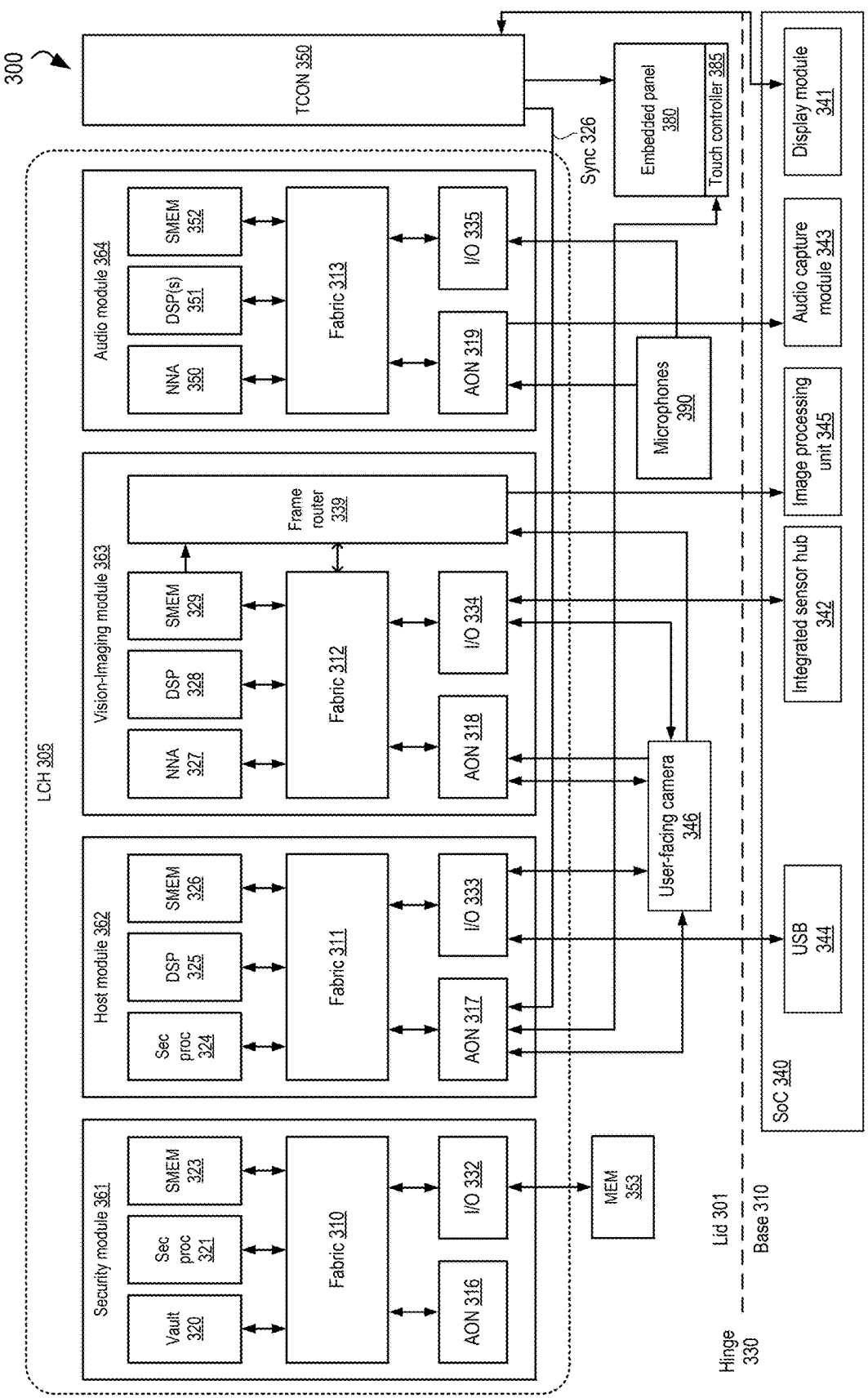
FIG. 3 illustrates a block diagram of a fourth example mobile computing device comprising a lid controller hub.

FIG. 3 illustrates a block diagram of a fourth example mobile computing device comprising a lid controller hub. The mobile computing device 300 comprises a lid 301 connected to a base 315 via a hinge 330. The lid 301 comprises a lid controller hub (LCH) 305, a timing controller 355, a user-facing camera 346, microphones 390, an embedded display panel 380, a touch controller 385, and a memory 353. The LCH 305 comprises a security module 361, a host module 362, a vision/imaging module 363, and an audio module 364. The security module 361 provides a secure processing environment for the LCH 305 and comprises a vault 320, a security processor 321, a fabric 310, I/Os 332, an always-on (AON) block 316, and a memory 323. The security module 361 is responsible for loading and authenticating firmware stored in the memory 353 and executed by various components (e.g., DSPs, neural network accelerators) of the LCH 305. The security module 361 authenticates the firmware by executing a cryptographic hash function on the firmware and making sure the resulting hash is correct and that the firmware has a proper signature using key information stored in the security module 361. The cryptographic hash function is executed by the vault 320. In some embodiments, the vault 320 comprises a cryptographic accelerator. In some embodiments, the security module 361 can present a product root of trust (PRoT) interface by which another component of the device 200 can query the LCH 305 for the results of the firmware authentication. In some embodiments, a PRoT interface can be provided over an I2C/I3C interface (e.g., I2C/I3C interface 470).

As used herein, the terms "operating", "executing", or "running" as they pertain to software or firmware in relation to a lid controller hub, a lid controller hub component, host processor unit, SoC, or other computing device component are used interchangeably and can refer to software or firmware stored in one or more computer-readable storage media accessible by the computing device component, even though the instructions contained in the software or firmware are not being actively executed by the component.

The security module 361 also stores privacy information and handles privacy tasks. In some embodiments, information that the LCH 305 uses to perform Face ID or Speaker ID to wake a computing device if an authenticated user's voice is picked up by the microphone or if an authenticated user's face is captured by a camera is stored in the security module 361. The security module 361 also enables privacy modes for an LCH or a computing device. For example, if user input indicates that a user desires to enable a privacy mode, the security module 361 can disable access by LCH resources to sensor data generated by one or more of the lid input devices (e.g., touchscreen, microphone, camera). In some embodiments, a user can set a privacy setting to cause a device to enter a privacy mode. Privacy settings include, for example, disabling video and/or audio input in a video-conferencing application or enabling an operating system level privacy setting that prevents any application or the operating system from receiving and/or processing sensor data. Setting an application or operating system privacy setting can cause information to be sent to the lid controller hub to cause the LCH to enter a privacy mode. In a privacy mode, the lid controller hub can cause an input sensor to enter a low-power state, prevent LCH resources from processing sensor data or prevent raw or processed sensor data from being sent to a host processing unit.

In some embodiments, the LCH 305 can enable Wake on Face or Face ID features while keeping image sensor data private from the remainder of the system (e.g., the operating system and any applications running on the operating system). In some embodiments, the vision/imaging module 363 continues to process image sensor data to allow Wake on Face or Face ID features to remain active while the device is in a privacy mode. In some embodiments, image sensor data is passed through the vision/imaging module 363 to an image processing module 345 in the SoC 340 only when a face (or an authorized user's face) is detected, irrespective of whether a privacy mode is enabled, for enhanced privacy and reduced power consumption. In some embodiments, the mobile computing device 300 can comprise one or more world-facing cameras in addition to user-facing camera 346 as well as one or more world-facing microphones (e.g., microphones incorporated into the "A cover" of a laptop).

In some embodiments, the lid controller hub 305 enters a privacy mode in response to a user pushing a privacy button, flipping a privacy switch, or sliding a slider over an input sensor in the lid. In some embodiments, a privacy indicator can be provided to the user to indicate that the LCH is in a privacy mode. A privacy indicator can be, for example, an LED located in the base or display bezel or a privacy icon displayed on a display. In some embodiments, a user activating an external privacy button, switch, slider, hotkey, etc. enables a privacy mode that is set at a hardware level or system level. That is, the privacy mode applies to all applications and the operating system operating on the mobile computing device. For example, if a user presses a privacy switch located in the bezel of the lid, the LCH can disable all audio sensor data and all image sensor data from being made available to the SoC in response. Audio and image sensor data is still available to the LCH to perform tasks such as Wake of Voice and Speaker ID, but the audio and image sensor data accessible to the lid controller hub is not accessible to other processing components.

The host module 362 comprises a security processor 324, a DSP 325, a memory 326, a fabric 311, an always-on block 317, and I/Os 333. In some embodiments, the host module 362 can boot the LCH, send LCH telemetry and interrupt data to the SoC, manage interaction with the touch controller 385, and send touch sensor data to the SoC 340. The host module 362 sends lid sensor data from multiple lid sensors over a USB connection to a USB module 344 in the SoC 340. Sending sensor data for multiple lid sensors over a single connection contributes to the reduction in the number of wires passing through the hinge 330 relative to existing laptop designs. The DSP 325 processes touch sensor data received from the touch controller 385. The host module 362 can synchronize the sending of touch sensor data to the SoC 340 with the display panel refresh rate by utilizing a synchronization signal 370 shared between the TCON 355 and the host module 362.

The host module 362 can dynamically adjust the refresh rate of the display panel 380 based on factors such as user presence and the amount of user touch interaction with the panel 380. For example, the host module 362 can reduce the refresh rate of the panel 380 if no user is detected or an authorized user is not detected in front of the camera 346. In another example, the refresh rate can be increased in response to detection of touch interaction at the panel 380 based on touch sensor data. In some embodiments and depending upon the refresh rate capabilities of the display panel 380, the host module 362 can cause the refresh rate of the panel 380 to be increased up to 120 Hz or down to 20 Hz or less.

The host module 362 can also adjust the refresh rate based on the application that a user is interacting with. For example, if the user is interacting with an illustration application, the host module 362 can increase the refresh rate (which can also increase the rate at which touch data is sent to the SoC 340 if the display panel refresh rate and the processing of touch sensor data are synchronized) to 120 Hz to provide for a smoother touch experience to the user. Similarly, if the host module 362 detects that the application that a user is currently interacting with is one where the content is relatively static or is one that involves a low degree of user touch interaction or simple touch interactions (e.g., such as selecting an icon or typing a message), the host module 362 can reduce the refresh rate to a lower frequency. In some embodiments, the host module 362 can adjust the refresh rate and touch sampling frequency by monitoring the frequency of touch interaction. For example, the refresh rate can be adjusted upward if there is a high degree of user interaction or if the host module 362 detects that the user is utilizing a specific touch input device (e.g., a stylus) or a particular feature of a touch input stylus (e.g., a stylus' tilt feature). If supported by the display panel, the host module 362 can cause a strobing feature of the display panel to be enabled to reduce ghosting once the refresh rate exceeds a threshold value.

The vision/imaging module 363 comprises a neural network accelerator 327, a DSP 328, a memory 329, a fabric 312, an AON block 318, I/Os 334, and a frame router 339. The vision/imaging module 363 interacts with the user-facing camera 346. The vision/imaging module 363 can interact with multiple cameras and consolidate image data from multiple cameras into a single stream for transmission to an integrated sensor hub 342 in the SoC 340. In some embodiments, the lid 301 can comprise one or more additional user-facing cameras and/or world-facing cameras in addition to user-facing camera 346. In some embodiments, any of the user-facing cameras can be in-display cameras. Image sensor data generated by the camera 346 is received by the frame router 339 where it undergoes preprocessing before being sent to the neural network accelerator 327 and/or the DSP 328. The image sensor data can also be passed through the frame router 339 to an image processing module 345 in the SoC 340. The neural network accelerator 327 and/or the DSP 328 enable face detection, head orientation detection, the recognition of facial landmarks (e.g., eyes, cheeks, eyebrows, nose, mouth), the generation of a 3D mesh that fits a detected face, along with other image processing functions. In some embodiments, facial parameters (e.g., location of facial landmarks, 3D meshes, face physical dimensions, head orientation) can be sent to the SoC at a rate of 30 frames per second (30 fps).

The audio module 364 comprises a neural network accelerator 350, one or more DSPs 351, a memory 352, a fabric 313, an AON block 319, and I/Os 335. The audio module 364 receives audio sensor data from the microphones 390. In some embodiments, there is one DSP 351 for each microphone 390. The neural network accelerator 350 and DSP 351 implement audio processing algorithms and AI models that improve audio quality. For example, the DSPs 351 can perform audio preprocessing on received audio sensor data to condition the audio sensor data for processing by audio AI models implemented by the neural network accelerator 350. One example of an audio AI model that can be implemented by the neural network accelerator 350 is a noise reduction algorithm that filters out background noises, such as the barking of a dog or the wailing of a siren. A second example is models that enable Wake on Voice or Speaker ID features. A third example is context awareness models. For example, audio contextual models can be implemented that classify the occurrence of an audio event relating to a situation where law enforcement or emergency medical providers are to be summoned, such as the breaking of glass, a car crash, or a gun shot. The LCH can provide information to the SoC indicating the occurrence of such an event and the SoC can query to the user whether authorities or medical professionals should be summoned.

The AON blocks 316-319 in the LCH modules 361-364 comprises various I/Os, timers, interrupts, and control units for supporting LCH "always-on" features, such as Wake on Voice, Speaker ID, Wake on Face, and Face ID and an always-on display that is visible and presents content when the lid 301 is closed.

Figure 4:
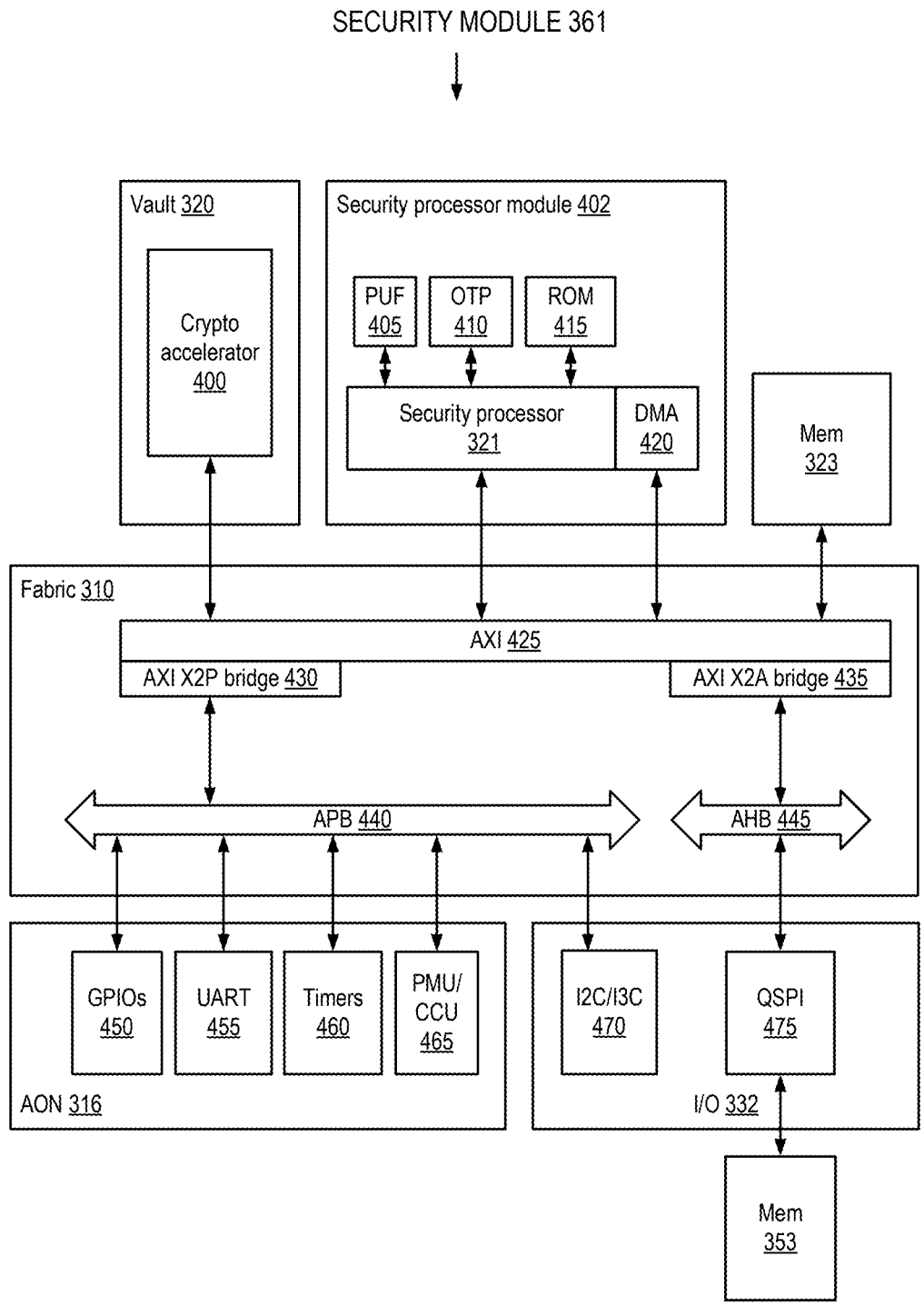
FIG. 4 illustrates a block diagram of the security module of the lid controller hub of FIG. 3.

FIG. 4 illustrates a block diagram of the security module of the lid controller hub of FIG. 3. The vault 320 comprises a cryptographic accelerator 400 that can implement the cryptographic hash function performed on the firmware stored in the memory 353. In some embodiments, the cryptographic accelerator 400 implements a 128-bit block size advanced encryption standard (AES)-compliant (AES-128) or a 384-bit secure hash algorithm (SHA)-complaint (SHA-384) encryption algorithm. The security processor 321 resides in a security processor module 402 that also comprises a platform unique feature module (PUF) 405, an OTP generator 410, a ROM 415, and a direct memory access (DMA) module 420. The PUF 405 can implement one or more security-related features that are unique to a particular LCH implementation. In some embodiments, the security processor 321 can be a DesignWare® ARC® SEM security processor. The fabric 310 allows for communication between the various components of the security module 361 and comprises an advanced extensible interface (AXI) 425, an advanced peripheral bus (APB) 440, and an advanced high-performance bus (AHB) 445. The AXI 425 communicates with the advanced peripheral bus 440 via an AXI to APB (AXI X2P) bridge 430 and the advanced high-performance bus 445 via an AXI to AHB (AXI X2A) bridge 435. The always-on block 316 comprises a plurality of GPIOs 450, a universal asynchronous receiver-transmitter (UART) 455, timers 460, and power management and clock management units (PMU/CMU) 465. The PMU/CMU 465 controls the supply of power and clock signals to LCH components and can selectively supply power and clock signals to individual LCH components so that only those components that are to be in use to support a particular LCH operational mode or feature receive power and are clocked. The I/O set 332 comprises an I2C/I3C interface 470 and a queued serial peripheral interface (QSPI) 475 to communicate to the memory 353. In some embodiments, the memory 353 is a 16 MB serial peripheral interface (SPI)-NOR flash memory that stores the LCH firmware. In some embodiments, an LCH security module can exclude one or more of the components shown in FIG. 4. In some embodiments, an LCH security module can comprise one or more additional components beyond those shown in FIG. 4.

Figure 5:
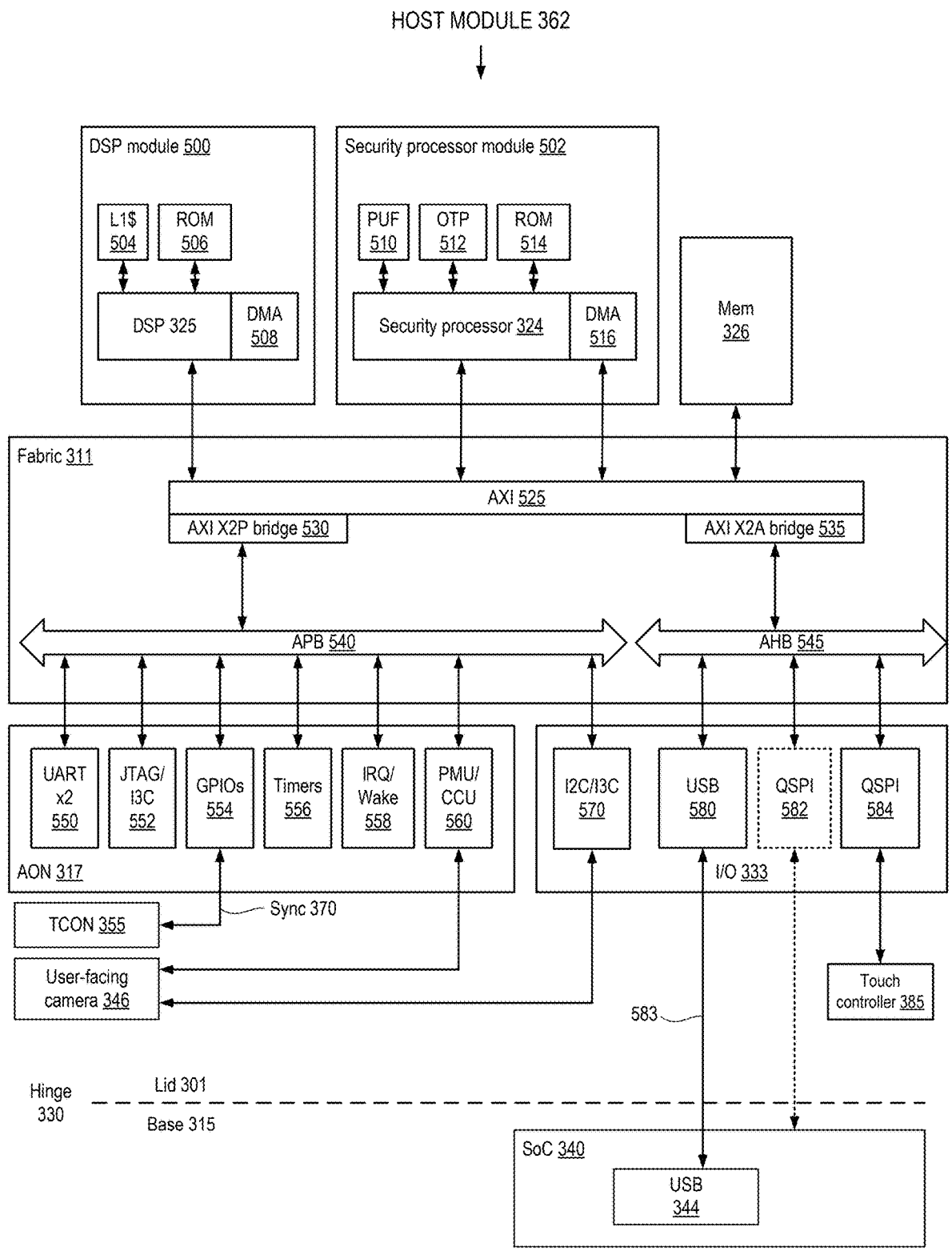
FIG. 5 illustrates a block diagram of the host module of the lid controller hub of FIG. 3.

FIG. 5 illustrates a block diagram of the host module of the lid controller hub of FIG. 3. The DSP 325 is part of a DSP module 500 that further comprises a level one (L1) cache 504, a ROM 506, and a DMA module 508. In some embodiments, the DSP 325 can be a DesignWare® ARC® EM11D DSP processor. The security processor 324 is part of a security processor module 502 that further comprises a PUF module 510 to allow for the implementation of platform-unique functions, an OTP generator 512, a ROM 514, and a DMA module 516. In some embodiments, the security processor 324 is a Synopsis® DesignWare® ARC® SEM security processor. The fabric 311 allows for communication between the various components of the host module 362 and comprises similar components as the security component fabric 310. The always-on block 317 comprises a plurality of UARTs 550, a Joint Test Action Group (JTAG)/I3C port 552 to support LCH debug, a plurality of GPIOs 554, timers 556, an interrupt request (IRQ)/wake block 558, and a PMU/CCU port 560 that provides a 19.2 MHz reference clock to the camera 346. The synchronization signal 370 is connected to one of the GPIO ports. I/Os 333 comprises an interface 570 that supports I2C and/or I3C communication with the camera 346, a USB module 580 that communicates with the USB module 344 in the SoC 340, and a QSPI block 584 that communicates with the touch controller 385. In some embodiments, the I/O set 333 provides touch sensor data with the SoC via a QSPI interface 582. In other embodiments, touch sensor data is communicated with the SoC over the USB connection 583. In some embodiments, the connection 583 is a USB 2.0 connection. By leveraging the USB connection 583 to send touch sensor data to the SoC, the hinge 330 is spared from having to carry the wires that support the QSPI connection supported by the QSPI interface 582. Not having to support this additional QSPI connection can reduce the number of wires crossing the hinge by four to eight wires.

In some embodiments, the host module 362 can support dual displays. In such embodiments, the host module 362 communicates with a second touch controller and a second timing controller. A second synchronization signal between the second timing controller and the host module allows for the processing of touch sensor data provided by the second touch controller and the sending of touch sensor data provided by the second touch sensor delivered to the SoC to be synchronized with the refresh rate of the second display. In some embodiments, the host module 362 can support three or more displays. In some embodiments, an LCH host module can exclude one or more of the components shown in FIG. 5. In some embodiments, an LCH host module can comprise one or more additional components beyond those shown in FIG. 5.

Figure 6:
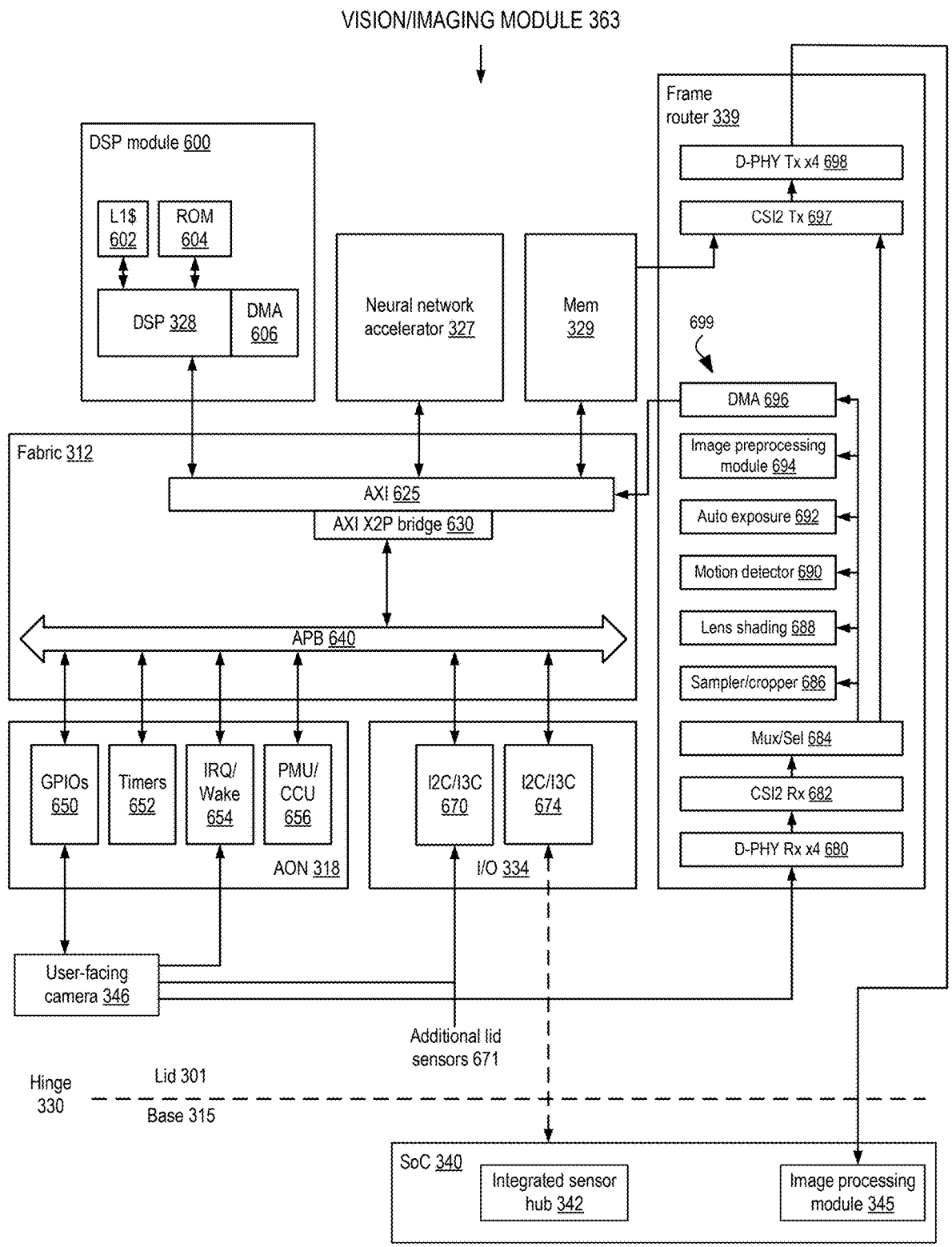
FIG. 6 illustrates a block diagram of the vision/imaging module of the lid controller hub of FIG. 3.

FIG. 6 illustrates a block diagram of the vision/imaging module of the lid controller hub of FIG. 3. The DSP 328 is part of a DSP module 600 that further comprises an L1 cache 602, a ROM 604, and a DMA module 606. In some embodiments, the DSP 328 can be a DesignWare® ARC® EM11D DSP processor. The fabric 312 allows for communication between the various components of the vision/imaging module 363 and comprises an advanced extensible interface (AXI) 625 connected to an advanced peripheral bus (APB) 640 by an AXI to APB (X2P) bridge 630. The always-on block 318 comprises a plurality of GPIOs 650, a plurality of timers 652, an IRQ/wake block 654, and a PMU/CCU 656. In some embodiments, the IRQ/wake block 654 receives a Wake on Motion (WoM) interrupt from the camera 346. The WoM interrupt can be generated based on accelerometer sensor data generated by an accelerator located in or communicatively coupled to the camera or generated in response to the camera performing motion detection processing in images captured by the camera. The I/Os 334 comprise an I2C/I3C interface 674 that sends metadata to the integrated sensor hub 342 in the SoC 340 and an I2C3/I3C interface 670 that connects to the camera 346 and other lid sensors 671 (e.g., radar sensor, time-of-flight camera, infrared). The vision/imaging module 363 can receive sensor data from the additional lid sensors 671 via the I2C/I3C interface 670. In some embodiments, the metadata comprises information such as information indicating whether information being provided by the lid controller hub is valid, information indicating an operational mode of the lid controller hub (e.g., off, a "Wake on Face" low power mode in which some of the LCH components are disabled but the LCH continually monitors image sensor data to detect a user's face), auto exposure information (e.g., the exposure level automatically set by the vision/imaging module 363 for the camera 346), and information relating to faces detected in images or video captured by the camera 346 (e.g., information indicating a confidence level that a face is present, information indicating a confidence level that the face matches an authorized user's face, bounding box information indicating the location of a face in a captured image or video, orientation information indicating an orientation of a detected face, and facial landmark information).

The frame router 339 receives image sensor data from the camera 346 and can process the image sensor data before passing the image sensor data to the neural network accelerator 327 and/or the DSP 328 for further processing. The frame router 339 also allows the received image sensor data to bypass frame router processing and be sent to the image processing module 345 in the SoC 340. Image sensor data can be sent to the image processing module 345 concurrently with being processed by a frame router processing stack 699. Image sensor data generated by the camera 346 is received at the frame router 339 by a MIPI D-PHY receiver 680 where it is passed to a MIPI CSI2 receiver 682. A multiplexer/selector block 684 allows the image sensor data to be processed by the frame router processing stack 699, to be sent directly to a CSI2 transmitter 697 and a D-PHY transmitter 698 for transmission to the image processing module 345, or both.

The frame router processing stack 699 comprises one or more modules that can perform preprocessing of image sensor data to condition the image sensor data for processing by the neural network accelerator 327 and/or the DSP 328, and perform additional image processing on the image sensor data. The frame router processing stack 699 comprises a sampler/cropper module 686, a lens shading module 688, a motion detector module 690, an auto exposure module 692, an image preprocessing module 694, and a DMA module 696. The sampler/cropper module 686 can reduce the frame rate of video represented by the image sensor data and/or crops the size of images represented by the image sensor data. The lens shading module 688 can apply one or more lens shading effect to images represented by the image sensor data. In some embodiments, a lens shading effects to be applied to the images represented by the image sensor data can be user selected. The motion detector 690 can detect motion across multiple images represented by the image sensor data. The motion detector can indicate any motion or the motion of a particular object (e.g., a face) over multiple images.

The auto exposure module 692 can determine whether an image represented by the image sensor data is over-exposed or under-exposed and cause the exposure of the camera 346 to be adjusted to improve the exposure of future images captured by the camera 346. In some embodiments, the auto exposure module 362 can modify the image sensor data to improve the quality of the image represented by the image sensor data to account for over-exposure or under-exposure. The image preprocessing module 694 performs image processing of the image sensor data to further condition the image sensor data for processing by the neural network accelerator 327 and/or the DSP 328. After the image sensor data has been processed by the one or more modules of the frame router processing stack 699 it can be passed to other components in the vision/imaging module 363 via the fabric 312. In some embodiments, the frame router processing stack 699 contains more or fewer modules than those shown in FIG. 6. In some embodiments, the frame router processing stack 699 is configurable in that image sensor data is processed by selected modules of the frame processing stack. In some embodiments, the order in which modules in the frame processing stack operate on the image sensor data is configurable as well.

Once image sensor data has been processed by the frame router processing stack 699, the processed image sensor data is provided to the DSP 328 and/or the neural network accelerator 327 for further processing. The neural network accelerator 327 enables the Wake on Face function by detecting the presence of a face in the processed image sensor data and the Face ID function by detecting the presence of the face of an authenticated user in the processed image sensor data. In some embodiments, the NNA 327 is capable of detecting multiple faces in image sensor data and the presence of multiple authenticated users in image sensor data. The neural network accelerator 327 is configurable and can be updated with information that allows the NNA 327 to identify one or more authenticated users or identify a new authenticated user. In some embodiments, the NNA 327 and/or DSP 328 enable one or more adaptive dimming features. One example of an adaptive dimming feature is the dimming of image or video regions not occupied by a human face, a useful feature for video conferencing or video call applications. Another example is globally dimming a screen while a computing device is in an active state and a face is longer detected in front of the camera and then undimming the display when the face is again detected. If this latter adaptive dimming feature is extended to incorporate Face ID, the screen is undimmed only when an authenticated user is again detected.

In some embodiments, the frame router processing stack 699 comprises a super resolution module (not shown) that can upscale or downscale the resolution of an image represented by image sensor data. For example, in embodiments where image sensor data represents 1-megapixel images, a super resolution module can upscale the 1-megapixel images to higher resolution images before they are passed to the image processing module 345. In some embodiments, an LCH vision/imaging module can exclude one or more of the components shown in FIG. 6. In some embodiments, an LCH vision/imaging module can comprise one or more additional components beyond those shown in FIG. 6.

Figure 7:
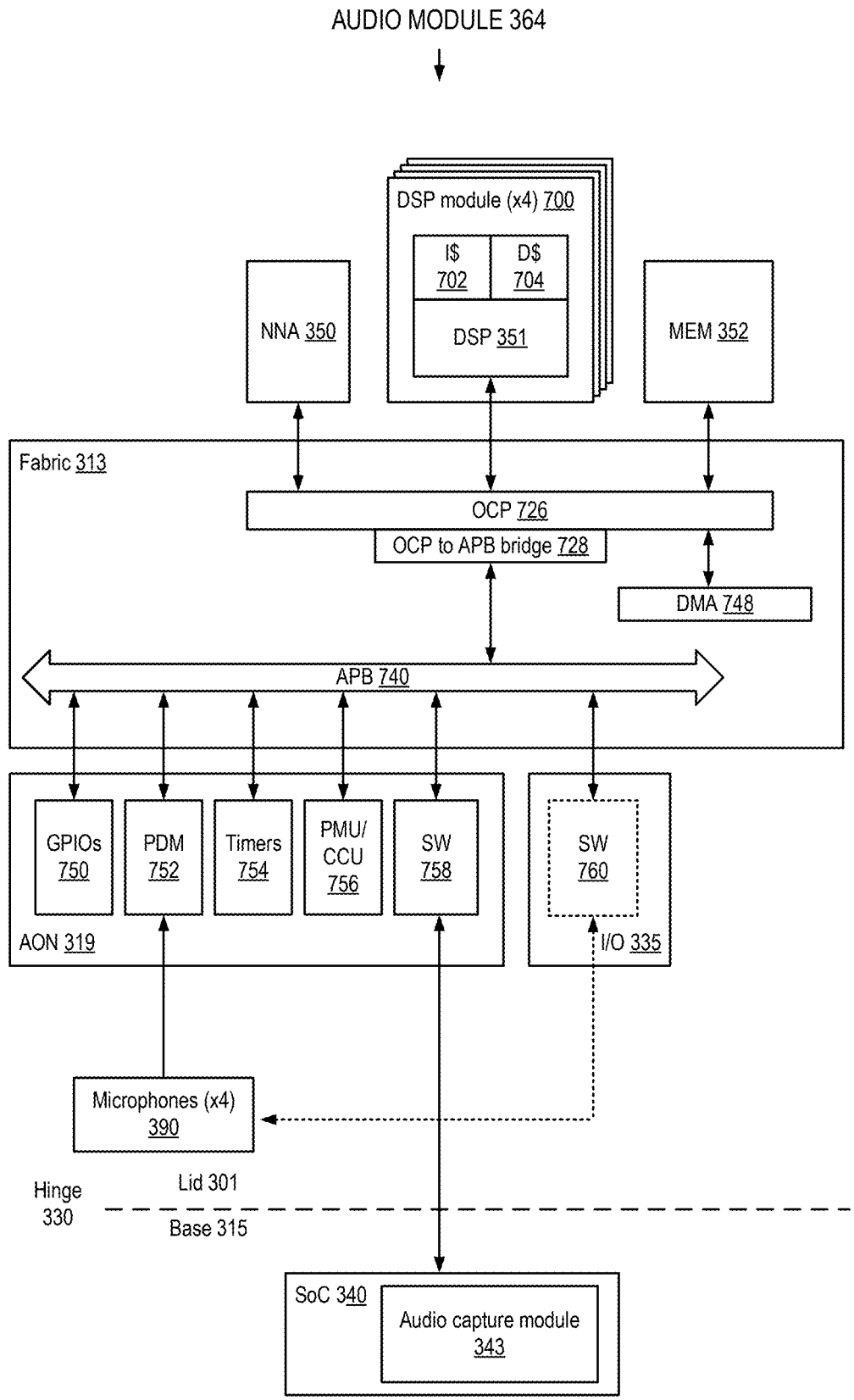
FIG. 7 illustrates a block diagram of the audio module of the lid controller hub of FIG. 3.

FIG. 7 illustrates a block diagram of the audio module 364 of the lid controller hub of FIG. 3. In some embodiments, the NNA 350 can be an artificial neural network accelerator. In some embodiments, the NNA 350 can be an Intel® Gaussian & Neural Accelerator (GNA) or other low-power neural coprocessor. The DSP 351 is part of a DSP module 700 that further comprises an instruction cache 702 and a data cache 704. In some embodiments, each DSP 351 is a Cadence® Tensilica® HiFi DSP. The audio module 364 comprises one DSP module 700 for each microphone in the lid. In some embodiments, the DSP 351 can perform dynamic noise reduction on audio sensor data. In other embodiments, more or fewer than four microphones can be used, and audio sensor data provided by multiple microphones can be processed by a single DSP 351. In some embodiments, the NNA 350 implements one or more models that improve audio quality. For example, the NNA 350 can implement one or more "smart mute" models that remove or reduce background noises that can be disruptive during an audio or video call.

In some embodiments, the DSPs 351 can enable far-field capabilities. For example, lids comprising multiple front-facing microphones distributed across the bezel (or over the display area if in-display microphones are used) can perform beamforming or spatial filtering on audio signals generated by the microphones to allow for far-field capabilities (e.g., enhanced detection of sound generated by a remote acoustic source). The audio module 364, utilizing the DSP 351s, can determine the location of a remote audio source to enhance the detection of sound received from the remote audio source location. In some embodiments, the DSPs 351 can determine the location of an audio source by determining delays to be added to audio signals generated by the microphones such that the audio signals overlap in time and then inferring the distance to the audio source from each microphone based on the delay added to each audio signal. By adding the determined delays to the audio signals provided by the microphones, audio detection in the direction of a remote audio source can be enhanced. The enhanced audio can be provided to the NNA 350 for speech detection to enable Wake on Voice or Speaker ID features. The enhanced audio can be subjected to further processing by the DSPs 351 as well. The identified location of the audio source can be provided to the SoC for use by the operating system or an application running on the operating system.

In some embodiments, the DSPs 351 can detect information encoded in audio sensor data at near-ultrasound (e.g., 15 kHz-20 kHz) or ultrasound (e.g., >20 kHz) frequencies, thus providing for a low-frequency low-power communication channel. Information detected in near-ultrasound/ultrasound frequencies can be passed to the audio capture module 343 in the SoC 340. An ultrasonic communication channel can be used, for example, to communicate meeting connection or Wi-Fi connection information to a mobile computing device by another computing device (e.g., Wi-Fi router, repeater, presentation equipment) in a meeting room. The audio module 364 can further drive the one or more microphones 390 to transmit information at ultrasonic frequencies. Thus, the audio channel can be used as a two-way low-frequency low-power communication channel between computing devices.

In some embodiments, the audio module 364 can enable adaptive cooling. For example, the audio module 364 can determine an ambient noise level and send information indicating the level of ambient noise to the SoC. The SoC can use this information as a factor in determining a level of operation for a cooling fan of the computing device. For example, the speed of a cooling fan can be scaled up or down with increasing and decreasing ambient noise levels, which can allow for increased cooling performance in noisier environments.

The fabric 313 allows for communication between the various components of the audio module 364. The fabric 313 comprises open core protocol (OCP) interfaces 726 to connect the NNA 550, the DSP modules 700, the memory 352 and the DMA 748 to the APB 740 via an OCP to APB bridge 728. The always-on block 319 comprises a plurality of GPIOs 750, a pulse density modulation (PDM) module 752 that receives audio sensor data generated by the microphones 390, one or more timers 754, a PMU/CCU 756, and a MIPI SoundWire® module 758 for transmitting and receiving audio data to the audio capture module 343. In some embodiments, audio sensor data provided by the microphones 390 is received at a DesignWare® Sound-Wire® module 760. In some embodiments, an LCH audio module can exclude one or more of the components shown in FIG. 7. In some embodiments, an LCH audio module can comprise one or more additional components beyond those shown in FIG. 7.

Figure 8:
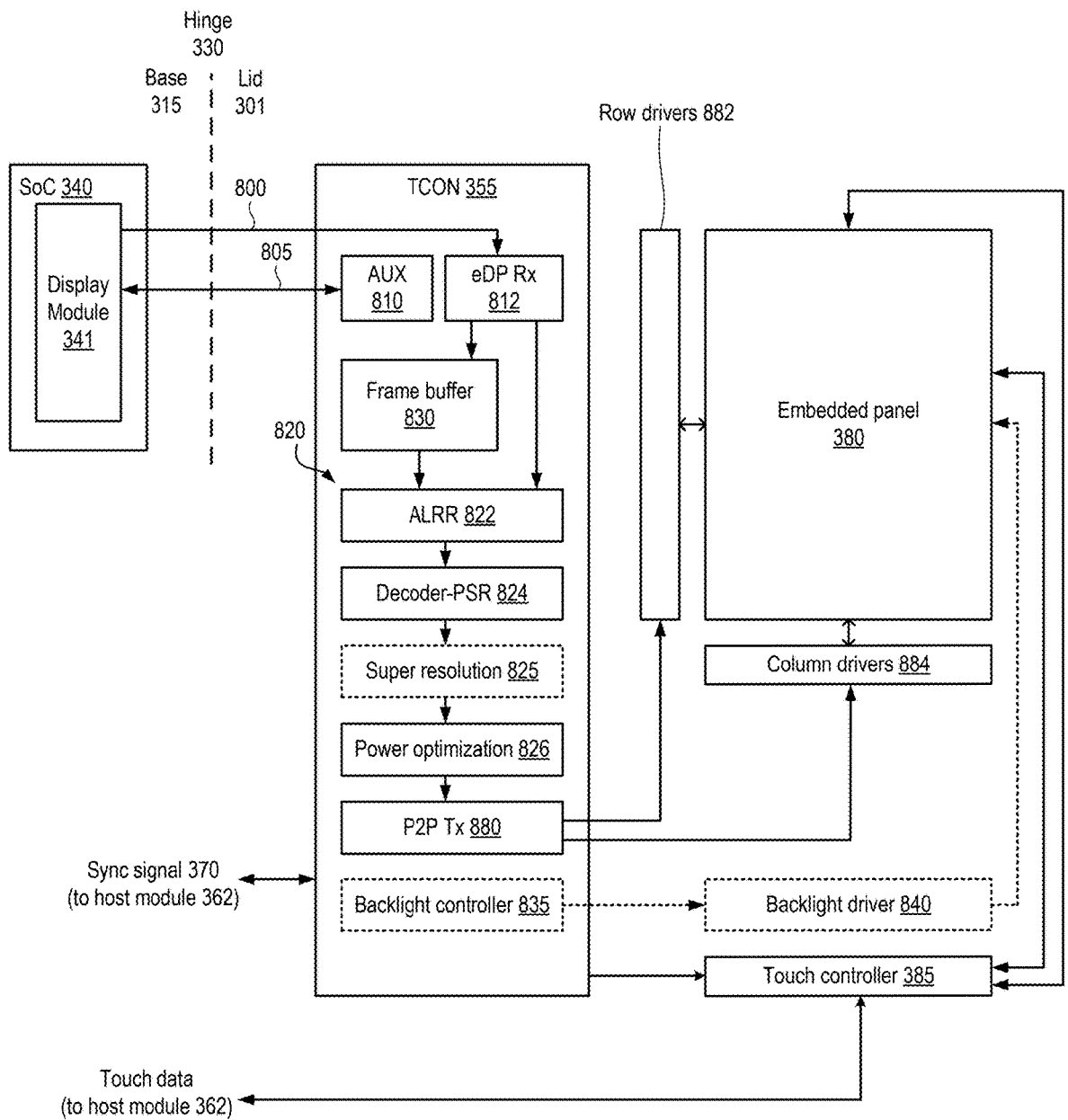
FIG. 8 illustrates a block diagram of the timing controller, embedded display panel, and additional electronics used in conjunction with the lid controller hub of FIG. 3

FIG. 8 illustrates a block diagram of the timing controller, embedded display panel, and additional electronics used in conjunction with the lid controller hub of FIG. 3. The timing controller 355 receives video data from the display module 341 of the SoC 340 over an eDP connection comprising a plurality of main link lanes 800 and an auxiliary (AUX) channel 805. Video data and auxiliary channel information provided by the display module 341 is received at the TCON 355 by an eDP main link receiver 812 and an auxiliary channel receiver 810 and. A timing controller processing stack 820 comprises one or more modules responsible for pixel processing and converting the video data sent from the display module 341 into signals that drive the control circuitry of the display panel 380, (e.g., row drivers 882, column drivers 884). Video data can be processed by timing controller processing stack 820 without being stored in a frame buffer 830 or video data can be stored in the frame buffer 830 before processing by the timing controller processing stack 820. The frame buffer 830 stores pixel information for one or more video frames (or frames, as used herein, the terms "image" and "frame" are used interchangeably). For example, in some embodiments, a frame buffer can store the color information for pixels in a video frame to be displayed on the panel.

The timing controller processing stack 820 comprises an autonomous low refresh rate module (ALRR) 822, a decoder-panel self-refresh (decoder-PSR) module 824, and a power optimization module 826. The ALRR module 822 can dynamically adjust the refresh rate of the display 380. In some embodiments, the ALRR module 822 can adjust the display refresh rate between 20 Hz and 120 Hz. The ALRR module 822 can implement various dynamic refresh rate approaches, such as adjusting the display refresh rate based on the frame rate of received video data, which can vary in gaming applications depending on the complexity of images being rendered. A refresh rate determined by the ALRR module 822 can be provided to the host module as the synchronization signal 370. In some embodiments, the synchronization signal comprises an indication that a display refresh is about to occur. In some embodiments, the ALRR module 822 can dynamically adjust the panel refresh rate by adjusting the length of the blanking period. In some embodiments, the ALRR module 822 can adjust the panel refresh rate based on information received from the host module 362. For example, in some embodiments, the host module 362 can send information to the ALRR module 822 indicating that the refresh rate is to be reduced if the vision/imaging module 363 determines there is no user in front of the camera. In some embodiments, the host module 362 can send information to the ALRR module 822 indicating that the refresh rate is to be increased if the host module 362 determines that there is touch interaction at the panel 380 based on touch sensor data received from the touch controller 385.

In some embodiments, the decoder-PSR module 824 can comprise a Video Electronics Standards Association (VESA) Display Streaming Compression (VDSC) decoder that decodes video data encoded using the VDSC compression standard. In other embodiments, the decoder-panel self-refresh module 824 can comprise a panel self-refresh (PSR) implementation that, when enabled, refreshes all or a portion of the display panel 380 based on video data stored in the frame buffer and utilized in a prior refresh cycle. This can allow a portion of the display pipeline leading up to the frame buffer to enter into a low-power state. In some embodiments, the decoder-panel self-refresh module 824 can be the PSR feature implemented in eDP v1.3 or the PSR2 feature implemented in eDP v1.4. In some embodiments, the TCON can achieve additional power savings by entering a zero or low refresh state when the mobile computing device operating system is being upgraded. In a zero-refresh state, the timing controller does not refresh the display. In a low refresh state, the timing controller refreshes the display at a slow rate (e.g., 20 Hz or less).

In some embodiments, the timing controller processing stack 820 can include a super resolution module 825 that can downscale or upscale the resolution of video frames provided by the display module 341 to match that of the display panel 380. For example, if the embedded panel 380 is a 3K×2K panel and the display module 341 provides 4K video frames rendered at 4K, the super resolution module 825 can downscale the 4K video frames to 3K×2K video frames. In some embodiments, the super resolution module 825 can upscale the resolution of videos. For example, if a gaming application renders images with a 1360×768 resolution, the super resolution module 825 can upscale the video frames to 3K×2K to take full advantage of the resolution capabilities of the display panel 380. In some embodiments, a super resolution module 825 that upscales video frames can utilize one or more neural network models to perform the upscaling.

The power optimization module 826 comprises additional algorithms for reducing power consumed by the TCON 355. In some embodiments, the power optimization module 826 comprises a local contrast enhancement and global dimming module that enhances the local contrast and applies global dimming to individual frames to reduce power consumption of the display panel 380.

In some embodiments, the timing controller processing stack 820 can comprise more or fewer modules than shown in FIG. 8. For example, in some embodiments, the timing controller processing stack 820 comprises an ALRR module and an eDP PSR2 module but does not contain a power optimization module. In other embodiments, modules in addition to those illustrated in FIG. 8 can be included in the timing controller stack 820. The modules included in the timing controller processing stack 820 can depend on the type of embedded display panel 380 included in the lid 301. For example, if the display panel 380 is a backlit liquid crystal display (LCD), the timing controller processing stack 820 would not include a module comprising the global dimming and local contrast power reduction approach discussed above as that approach is more amenable for use with emissive displays (displays in which the light emitting elements are located in individual pixels, such as QLED, OLED, and micro-LED displays) rather than backlit LCD displays. In some embodiments, the timing controller processing stack 820 comprises a color and gamma correction module.

After video data has been processed by the timing controller processing stack 820, a P2P transmitter 880 converts the video data into signals that drive control circuitry for the display panel 380. The control circuitry for the display panel 380 comprises row drivers 882 and column drivers 884 that drive rows and columns of pixels in a display 380 within the embedded 380 to control the color and brightness of individual pixels.

In embodiments where the embedded panel 380 is a backlit LCD display, the TCON 355 can comprise a backlight controller 835 that generates signals to drive a backlight driver 840 to control the backlighting of the display panel 380. The backlight controller 835 sends signals to the backlight driver 840 based on video frame data representing the image to be displayed on the panel 380. The backlight controller 835 can implement low-power features such as turning off or reducing the brightness of the backlighting for those portions of the panel (or the entire panel) if a region of the image (or the entire image) to be displayed is mostly dark. In some embodiments, the backlight controller 835 reduces power consumption by adjusting the chroma values of pixels while reducing the brightness of the backlight such that there is little or no visual degradation perceived by a viewer. In some embodiments the backlight is controlled based on signals send to the lid via the eDP auxiliary channel, which can reduce the number of wires sent across the hinge 330.

The touch controller 385 is responsible for driving the touchscreen technology of the embedded panel 380 and collecting touch sensor data from the display panel 380. The touch controller 385 can sample touch sensor data periodically or aperiodically and can receive control information from the timing controller 355 and/or the lid controller hub 305. The touch controller 385 can sample touch sensor data at a sampling rate similar or close to the display panel refresh rate. The touch sampling can be adjusted in response to an adjustment in the display panel refresh rate. Thus, if the display panel is being refreshed at a low rate or not being refreshed at all, the touch controller can be placed in a low-power state in which it is sampling touch sensor data at a low rate or not at all. When the computing device exits the low-power state in response to, for example, the vision/imaging module 363 detecting a user in the image data being continually analyzed by the vision/imaging module 363, the touch controller 385 can increase the touch sensor sampling rate or begin sampling touch sensor data again. In some embodiments, as will be discussed in greater detail below, the sampling of touch sensor data can be synchronized with the display panel refresh rate, which can allow for a smooth and responsive touch experience. In some embodiments, the touch controller can sample touch sensor data at a rate that is independent from the display refresh rate.

Although the timing controllers 250 and 351 of FIGS. 2 and 3 are illustrated as being separate from lid controller hubs 260 and 305, respectively, any of the timing controllers described herein can be integrated onto the same die, package, or printed circuit board as a lid controller hub. Thus, reference to a lid controller hub can refer to a component that includes a timing controller and reference to a timing controller can refer to a component within a lid controller hub. FIGS. 10A-10D illustrate various possible physical relationships between a timing controller and a lid controller hub.

In some embodiments, a lid controller hub can have more or fewer components and/or implement fewer features or capabilities than the LCH embodiments described herein. For example, in some embodiments, a mobile computing device may comprise an LCH without an audio module and perform processing of audio sensor data in the base. In another example, a mobile computing device may comprise an LCH without a vision/imaging module and perform processing of image sensor data in the base.

Figure 9:
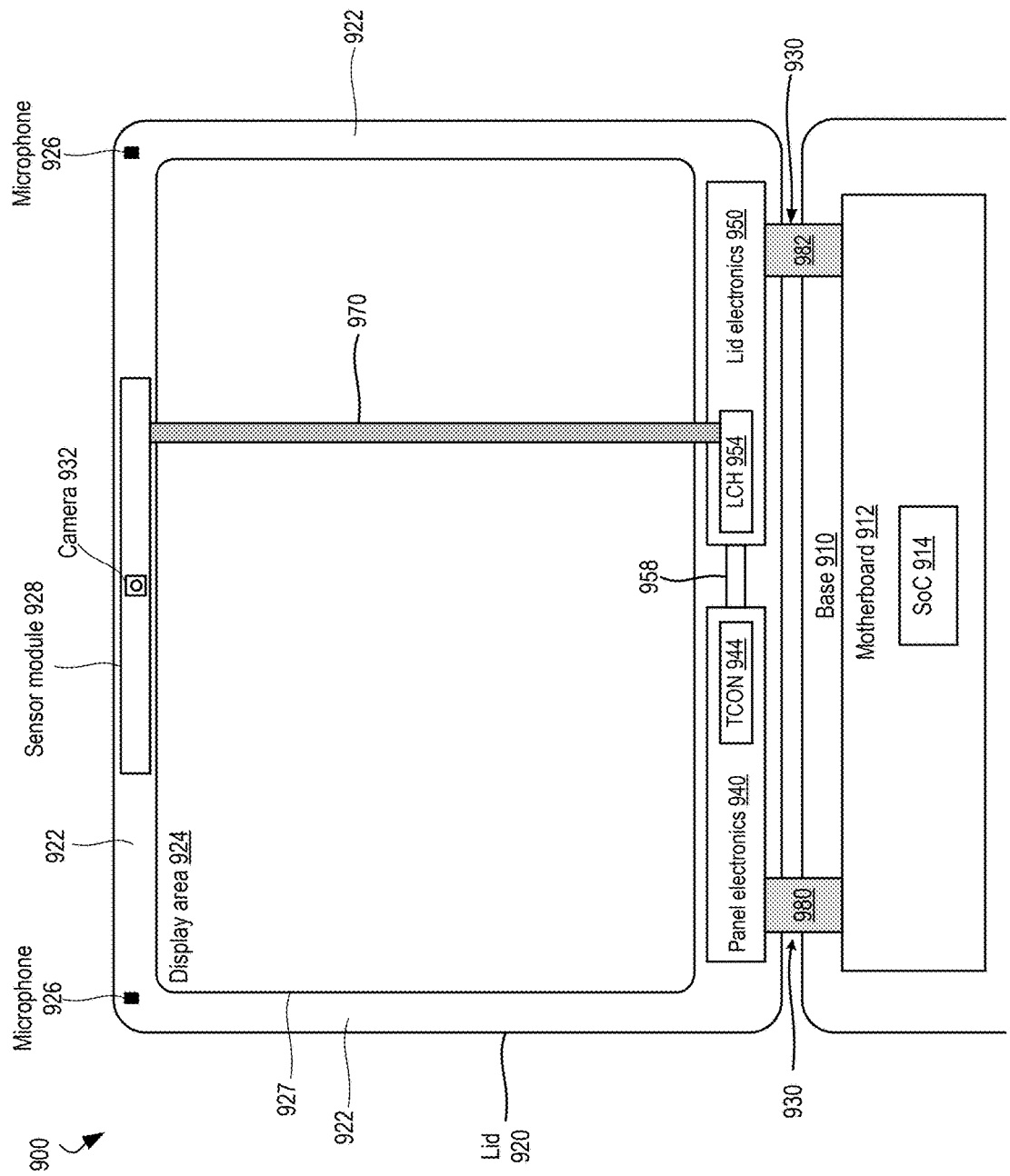
FIG. 9 illustrates a block diagram illustrating an example physical arrangement of components in a mobile computing device comprising a lid controller hub.

FIG. 9 illustrates a block diagram illustrating an example physical arrangement of components in a mobile computing device comprising a lid controller hub. The mobile computing device 900 comprises a base 910 connected to a lid 920 via a hinge 930. The base 910 comprises a motherboard 912 on which an SoC 914 and other computing device components are located. The lid 920 comprises a bezel 922 that extends around the periphery of a display area 924, which is the active area of an embedded display panel 927 located within the lid, e.g., the portion of the embedded display panel that displays content. The lid 920 further comprises a pair of microphones 926 in the upper left and right corners of the lid 920, and a sensor module 928 located along a center top portion of the bezel 922. The sensor module 928 comprises a front-facing camera 932. In some embodiments, the sensor module 928 is a printed circuit board on which the camera 932 is mounted. The lid 920 further comprises panel electronics 940 and lid electronics 950 located in a bottom portion of the lid 920. The lid electronics 950 comprises a lid controller hub 954 and the panel electronics 940 comprises a timing controller 944. In some embodiments the lid electronics 950 comprises a printed circuit board on which the LCH 954 in mounted. In some embodiments the panel electronics 940 comprises a printed circuit board upon which the TCON 944 and additional panel circuitry is mounted, such as row and column drivers, a backlight driver (if the embedded display is an LCD backlit display), and a touch controller. The timing controller 944 and the lid controller hub 954 communicate via a connector 958 which can be a cable connector connecting two circuit boards. The connector 958 can carry the synchronization signal that allows for touch sampling activities to be synchronized with the display refresh rate. In some embodiments, the LCH 954 can deliver power to the TCON 944 and other electronic components that are part of the panel electronics 940 via the connector 958. A sensor data cable 970 carries image sensor data generated by the camera 932, audio sensor data generated by the microphones 926, a touch sensor data generated by the touchscreen technology to the lid controller hub 954. Wires carrying audio signal data generated by the microphones 926 can extend from the microphones 926 in the upper and left corners of the lid to the sensor module 928, where they aggregated with the wires carrying image sensor data generated by the camera 932 and delivered to the lid controller hub 954 via the sensor data cable 970.

The hinge 930 comprises a left hinge portion 980 and a right hinge portion 982. The hinge 930 physically couples the lid 920 to the base 910 and allows for the lid 920 to be rotated relative to the base. The wires connecting the lid controller hub 954 to the base 910 pass through one or both of the hinge portions 980 and 982. Although shown as comprising two hinge portions, the hinge 930 can assume a variety of different configurations in other embodiments. For example, the hinge 930 could comprise a single hinge portion or more than two hinge portions, and the wires that connect the lid controller hub 954 to the SoC 914 could cross the hinge at any hinge portion. With the number of wires crossing the hinge 930 being less than in existing laptop devices, the hinge 930 can be less expensive and simpler component relative to hinges in existing laptops.

In other embodiments, the lid 920 can have different sensor arrangements than that shown in FIG. 9. For example, the lid 920 can comprise additional sensors such as additional front-facing cameras, a front-facing depth sensing camera, an infrared sensor, and one or more world-facing cameras. In some embodiments, the lid 920 can comprise additional microphones located in the bezel, or just one microphone located on the sensor module. The sensor module 928 can aggregate wires carrying sensor data generated by additional sensors located in the lid and deliver them to the sensor data cable 970, which delivers the additional sensor data to the lid controller hub 954.

In some embodiments, the lid comprises in-display sensors such as in-display microphones or in-display cameras. These sensors are located in the display area 924, in pixel area not utilized by the emissive elements that generate the light for each pixel and are discussed in greater detail below. The sensor data generated by in-display cameras and in-display microphones can be aggregated by the sensor module 928 as well as other sensor modules located in the lid and deliver the sensor data generated by the in-display sensors to the lid controller hub 954 for processing.

In some embodiments, one or more microphones and cameras can be located in a position within the lid that is convenient for use in an "always-on" usage scenario, such as when the lid is closed. For example, one or more microphones and cameras can be located on the "A cover" of a laptop or other world-facing surface (such as a top edge or side edge of a lid) of a mobile computing device when the device is closed to enable the capture and monitoring of audio or image data to detect the utterance of a wake word or phrase or the presence of a person in the field of view of the camera.

Figure 10A:
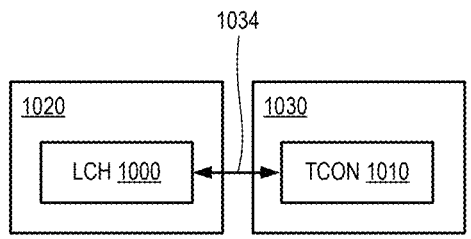
FIGS. 10A-10E illustrates block diagrams of example timing controller and lid controller hub physical arrangements within a lid.
Figure 10B:
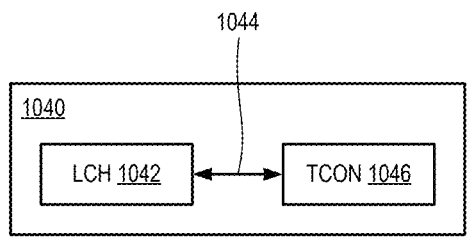

FIGS. 10A-10E illustrate block diagrams of example timing controller and lid controller hub physical arrangements within a lid. FIG. 10A illustrates a lid controller hub 1000 and a timing controller 1010 located on a first module 1020 that is physically separate from a second module 1030. In some embodiments, the first and second modules 1020 and 1030 are printed circuit boards. The lid controller hub 1000 and the timing controller 1010 communicate via a connection 1034. FIG. 10B illustrates a lid controller hub 1042 and a timing controller 1046 located on a third module 1040. The LCH 1042 and the TCON 1046 communicate via a connection 1044. In some embodiments, the third module 1040 is a printed circuit board and the connection 1044 comprises one or more printed circuit board traces. One advantage to taking a modular approach to lid controller hub and timing controller design is that it allows timing controller vendors to offer a single timing controller that works with multiple LCH designs having different feature sets.

Figure 10C:
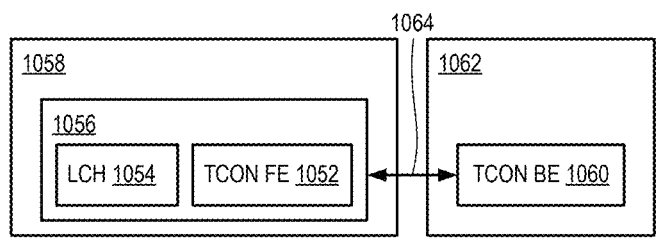

FIG. 10C illustrates a timing controller split into front end and back end components. A timing controller front end (TCON FE) 1052 and a lid controller hub 1054 are integrated in or are co-located on a first common component 1056. In some embodiments, the first common component 1056 is an integrated circuit package and the TCON FE 1052 and the LCH 1054 are separate integrated circuit die integrated in a multi-chip package or separate circuits integrated on a single integrated circuit die. The first common component 1056 is located on a fourth module 1058 and a timing controller back end (TCON BE) 1060 is located on a fifth module 1062. The timing controller front end and back end components communicate via a connection 1064. Breaking the timing controller into front end and back end components can provide for flexibility in the development of timing controllers with various timing controller processing stacks. For example, a timing controller back end can comprise modules that drive an embedded display, such as the P2P transmitter 880 of the timing controller processing stack 820 in FIG. 8 and other modules that may be common to various timing controller frame processor stacks, such as a decoder or panel self-refresh module. A timing controller front end can comprise modules that are specific for a particular mobile device design. For example, in some embodiments, a TCON FE comprises a power optimization module 826 that performs global dimming and local contrast enhancement that is desired to be implemented in specific laptop models, or an ALRR module where it is convenient to have the timing controller and lid controller hub components that work in synchronization (e.g., via synchronization signal 370) to be located closer together for reduced latency.

Figure 10D:
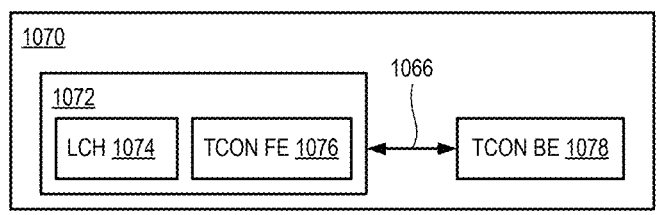
Figure 10E:
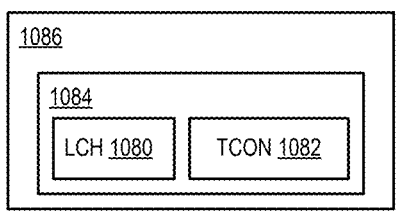

FIG. 10D illustrates an embodiment in which a second common component 1072 and a timing controller back end 1078 are located on the same module, a sixth module 1070, and the second common component 1072 and the TCON BE 1078 communicate via a connection 1066. FIG. 10E illustrates an embodiment in which a lid controller hub 1080 and a timing controller 1082 are integrated on a third common component 1084 that is located on a seventh module 1086. In some embodiments, the third common component 1084 is an integrated circuit package and the LCH 1080 and TCON 1082 are individual integrated circuit die packaged in a multi-chip package or circuits located on a single integrated circuit die. In embodiments where the lid controller hub and the timing controller are located on physically separate modules (e.g., FIG. 10A, FIG. 10C), the connection between modules can comprise a plurality of wires, a flexible printed circuit, a printed circuit, or by one or more other components that provide for communication between modules.

The modules and components in FIGS. 10C-10E that comprise a lid controller hub and a timing controller (e.g., fourth module 1058, second common component 1072, and third common component 1084) can be referred to a lid controller hub.

FIGS. 11A-11C show tables breaking down the hinge wire count for various lid controller hub embodiments. The display wires deliver video data from the SoC display module to the LCH timing controller, the image wires deliver image sensor data generated by one or more lid cameras to the SoC image processing module, the touch wires provide touch sensor data to the SoC integrated sensor hub, the audio and sensing wires provide audio sensor data to the SoC audio capture module and other types sensor data to the integrated sensor hub, and the additional set of "LCH" wires provide for additional communication between the LCH and the SoC. The type of sensor data provided by the audio and sensing wires can comprise visual sensing data generated by vision-based input sensors such as fingerprint sensors, blood vessel sensors, etc. In some embodiment, the vision sensing data can be generated based on information generated by one or more general-purpose cameras rather than a dedicated biometric sensor, such as a fingerprint sensor.

Table 1100 shows a wire breakdown for a 72-wire embodiment. The display wires comprise 19 data wires and 16 power wires for a total of 35 wires to support four eDP HBR2 lanes and six signals for original equipment manufacturer (OEM) use. The image wires comprise six data wires and eight power wires for a total of 14 wires to carry image sensor data generated by a single 1-megapixel camera. The touch wires comprise four data wires and two power wires for a total of six wires to support an I2C connection to carry touch sensor data generated by the touch controller. The audio and sensing wires comprise eight data wires and two power wires for a total of ten wires to support DMIC and I2C connections to support audio sensor data generated by four microphones, along with a single interrupt (INT) wire. Seven additional data wires carry additional information for communication between the LCH and SoC over USB and QSPI connections.

Table 1110 shows a wire breakdown for a 39-wire embodiment in which providing dedicated wires for powering the lid components and eliminating various data signals contribute to the wire count reduction. The display wires comprise 14 data wires and 4 power wires for a total of 18 wires that support two eDP HBR2 lines, six OEM signals and power delivery to the lid. The power provided over the four power wires power the lid controller hub and the other lid components. Power resources in the lid receive the power provided over the dedicated power wires from the base and control the delivery of power to the lid components. The image wires, touch wires, and audio & sensing wires comprise the same number of data wires as in the embodiment illustrated in table 1100, but do not comprise power wires due power being provided to the lid separately. Three additional data wires carry additional information between the LCH and the SoC, down from seven in the embodiment illustrated in table 1100.

Table 1120 shows a wire breakdown for a 29-wire embodiment in which further wire count reductions are achieved by leveraging the existing USB bus to also carry touch sensor data and eliminating the six display data wires carrying OEM signals. The display wires comprise eight data wires and four power wires for a total of 12 wires. The image wires comprise four data wires each for two cameras—a 2-megapixel RGB (red-green-blue) camera and an infrared (IR) camera. The audio & sensing comprise four wires (less than half the embodiment illustrated in table 1110) to support a SoundWire® connection to carry audio data for four microphones. There are no wires dedicated to the transmission of touch sensor data and five wires are used to communicate the touch sensor data. Additional information is to be communicated between the LCH and SoC via a USB connection. Thus, tables 1100 and 1120 illustrate wire count reductions that are enabled by powering the lid via a set of dedicated power wires, reducing the number of eDP channels, leveraging an existing connection (USB) to transport touch sensor data, and eliminating OEM-specific signals. Further reduction in the hinge wire count can be realized via streaming video data from the base to the lid, and audio sensor data, touch sensor data, image sensor data, and sensing data from the lid to the base over a single interface. In some embodiments, this single connection can comprise a PCIe connection.

In embodiments other than those summarized in tables 1100, 1110, and 1120, a hinge can carry more or fewer total wires, more or fewer wires to carry signals of each type listed type (display, image, touch, audio & sensing, etc.), and can utilize connection and interface technologies other than those shown in tables 1100, 1100, and 1120.

Figure 12A:
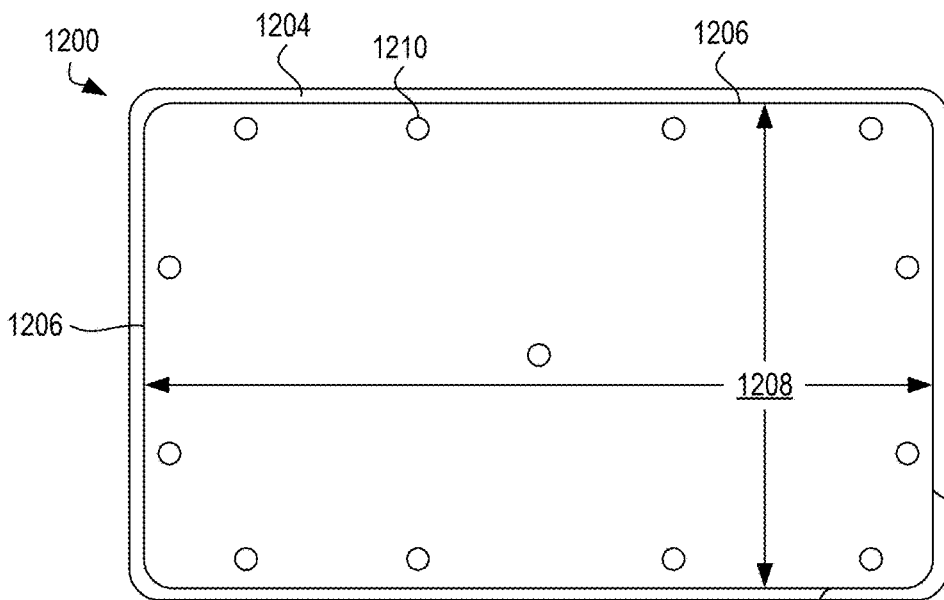
FIGS. 12A-12C illustrate example arrangements of in-display microphones and cameras in a lid.
Figure 12B:
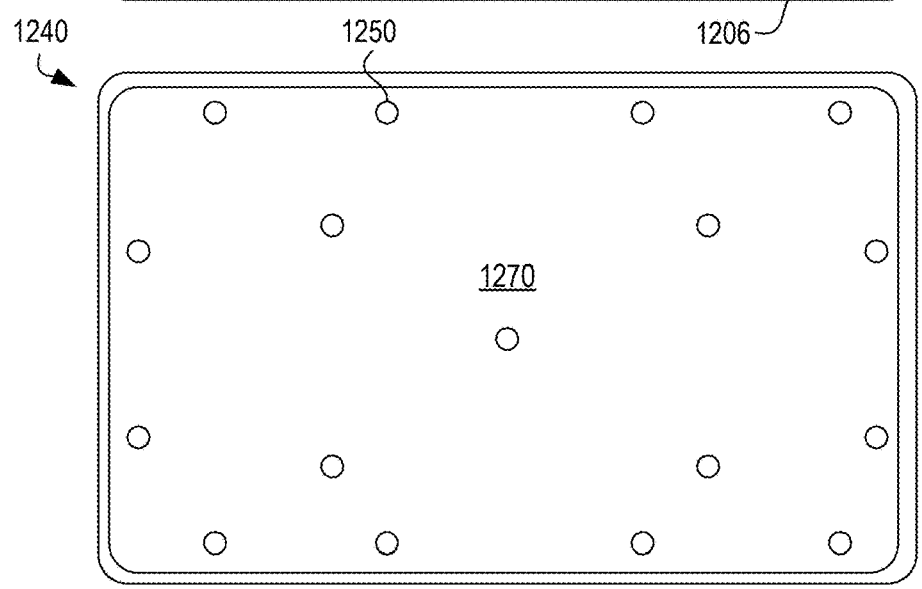
Figure 12C:
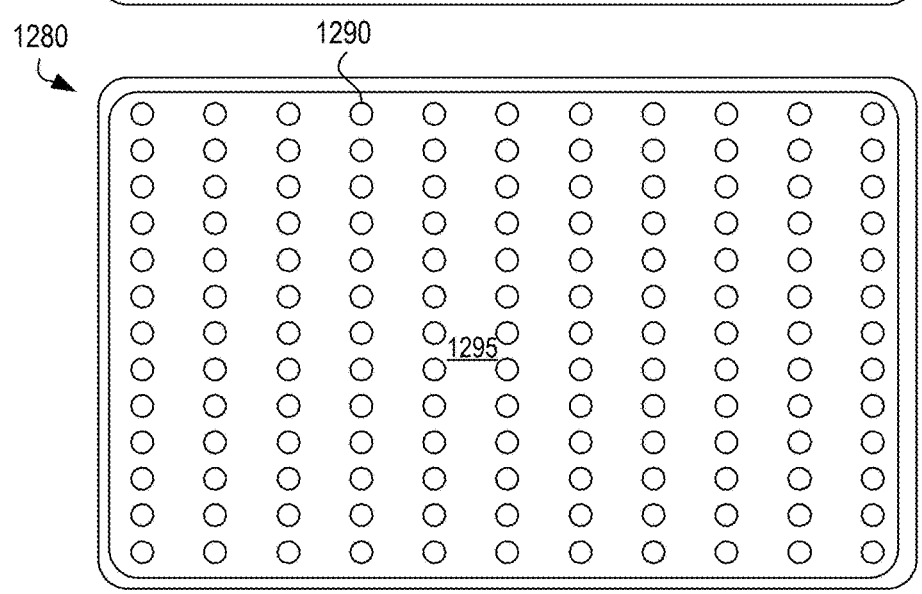

As mentioned earlier, a lid can comprise in-display cameras and in-display microphones in addition to cameras and microphones that are located in the lid bezel. FIGS. 12A-12C illustrate example arrangements of in-display microphones and cameras in a lid. FIG. 12A illustrates a lid 1200 comprising a bezel 1204, in-display microphones 1210, and a display area 1208. The bezel 1204 borders the display area 1208, which is defined by a plurality of pixels that reside on a display substrate (not shown). The pixels extend to interior edges 1206 of the bezel 1204 and the display area 1028 thus extends from one interior bezel edge 1206 to the opposite bezel edge 1206 in both the horizontal and vertical directions. The in-display microphones 1210 share real estate with the pixel display elements, as will be discussed in greater detail below. The microphones 1210 include a set of microphones located in a peripheral region of a display area 1208 and a microphone located substantially in the center of the display area 1208. FIG. 12B illustrates a lid 1240 in which in-display microphones 1250 include a set of microphones located in a peripheral region of a display area 1270, a microphone located at the center of the display area 1270, and four additional microphones distributed across the display area 1270. FIG. 12C illustrates a lid 1280 in which an array of in-display microphones 1290 are located within a display area 1295 of the lid 1280. In other embodiments, a display can have a plurality of in-display microphones that vary in number and arrangement from the example configurations shown in FIGS. 12A-12C.

FIGS. 12A-12C also illustrate example arrangements of front-facing cameras in an embedded display panel, with 1210, 1250, and 1290 representing in-display cameras instead of microphones. In some embodiments, an embedded display panel can comprise a combination of in-display microphones and cameras. An embedded display can comprise arrangements of in-display cameras or combinations of in-display cameras and in-display microphones that vary in number and arrangement from the example configurations shown in FIGS. 12A-12C.

Figure 13A:
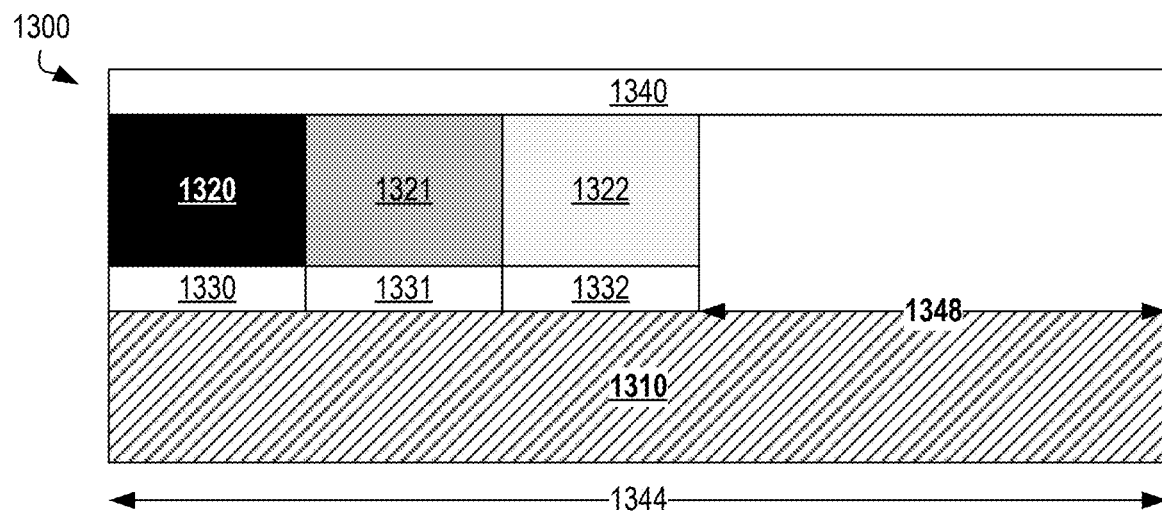
FIGS. 13A-13B illustrate simplified cross-sections of pixels in an example emissive display.
Figure 13B:
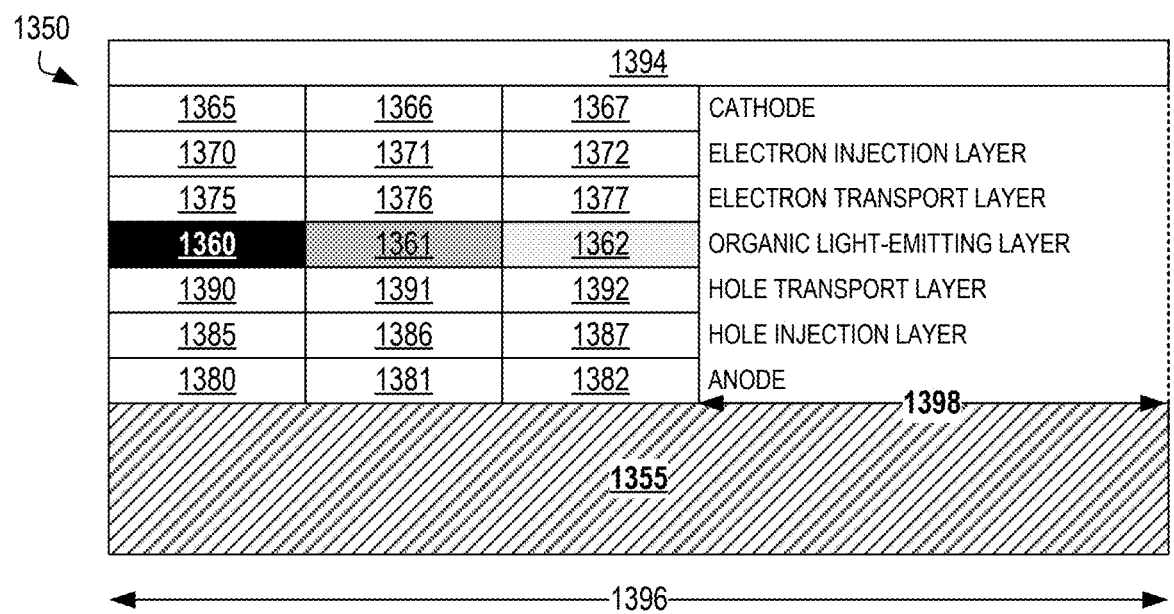

FIGS. 13A-13B illustrate simplified cross-sections of pixels in an example emissive display. FIG. 13A illustrates a simplified illustration of the cross-section of a pixel in an example micro-LED display. Micro-LED pixel 1300 comprises a display substrate 1310, a red LED 1320, a green LED 1321, a blue LED 1322, electrodes 1330-1332, and a transparent display medium 1340. The LEDs 1320-1322 are the individual light-producing elements for the pixel 1300, with the amount of light produced by each LED 1320-1322 being controlled by the associated electrode 1330-1332.

The LED stacks (red LED stack (layers 1320 and 1330), green LED stack (layers 1321 and 1331) and blue LED stack (layers 1322 and 1332)) can be manufactured on a substrate using microelectronic manufacturing technologies. In some embodiments, the display substrate 1310 is a substrate different from the substrate upon which the LEDs stacks are manufactured and the LED stacks are transferred from the manufacturing substrate to the display substrate 1310. In other embodiments, the LED stacks are grown directly on the display substrate 1310. In both embodiments, multiple pixels can be located on a single display substrate and multiple display substrates can be assembled to achieve a display of a desired size.

The pixel 1300 has a pixel width 1344, which can depend on, for example, display resolution and display size. For example, for a given display resolution, the pixel width 1344 can increase with display size. For a given display size, the pixel width 1344 can decrease with increased resolution. The pixel 1300 has an unused pixel area 1348, which is part of the black matrix area of a display. In some displays, the combination of LED size, display size, and display resolution can be such that the unused pixel area 1348 can be large enough to accommodate the integration of components, such as microphones, within a pixel.

FIG. 13B illustrates a simplified illustration of the cross-section of a pixel in an example OLED display. OLED pixel 1350 comprises a display substrate 1355, organic light-emitting layers 1360-1362, which are capable of producing red (layer 1360), green (layer 1361) and blue (layer 1362) light, respectively. The OLED pixel 1350 further comprises cathode layers 1365-1367, electron injection layers 1370-1372, electron transport layers 1375-1377, anode layers 1380-1382, hole injections layers 1385-1387, hole transport layers 1390-1392, and a transparent display medium 1394. The OLED pixel 1350 generates light through application of a voltage across the cathode layers 1365-1367 and anode layers 1380-1382, which results in the injection of electrons and holes into electron injection layers 1370-1372 and hole injection layers 1385-1387, respectively. The injected electrons and holes traverse the electron transport layers 1375-1377 and hole transport layers 1390-1392, respectively, and electron-hole pairs recombine in the organic light-emitting layers 1360-1362, respectively, to generate light.

Similar to the LED stacks in micro-LED displays, OLED stacks (red OLED stack (layers 1365, 1370, 1375, 1360, 1390, 1385, 1380), green OLED stack (layers 1366, 1371, 1376, 1361, 1391, 1386, 1381), and blue OLED stack (layers 1367, 1372, 1377, 1362, 1392, 1387, 1382), can be manufactured on a substrate separate from the display substrate 1355. In some embodiments, the display substrate 1355 is a substrate different from the substrate upon which the OLED stacks are transferred from the manufacturing substrate to the display substrate 1355. In other embodiments, the OLED stacks are directly grown on the display substrate 1355. In both types of embodiments, multiple display substrate components can be assembled in order to achieve a desired display size. The transparent display mediums 1340 and 1394 can be any transparent medium such as glass, plastic or a film. In some embodiments, the transparent display medium can comprise a touchscreen.

Again, similar to the micro-LED pixel 1300, the OLED pixel 1350 has a pixel width 1396 that can depend on factors such as display resolution and display size. The OLED pixel 1350 has an unused pixel area 1398 and in some displays, the combination of OLED stack widths, display size, and display resolution can be such that the unused pixel area 1398 is large enough to accommodate the integration of components, such as microphones, within a pixel.

As used herein, the term "display substrate" can refer to any substrate used in a display and upon which pixel display elements are manufactured or placed. For example, the display substrate can be a backplane manufactured separately from the pixel display elements (e.g., micro-LED/OLEDs in pixels 1300 and 1350) and upon which pixel display elements are attached, or a substrate upon which pixel display elements are manufactured.

Figure 14C:
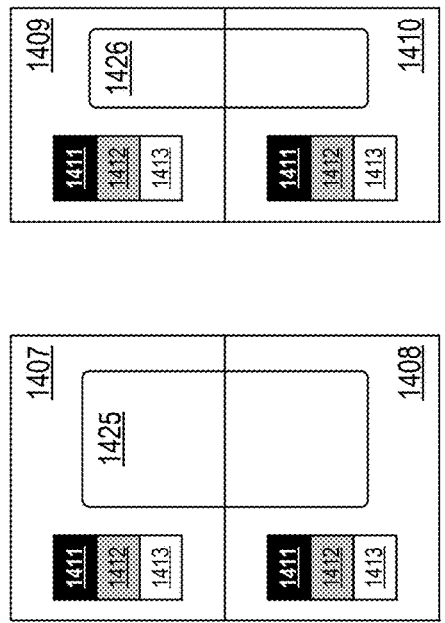
FIGS. 14C-14D illustrate example microphones that span multiple pixels.
Figure 14D:
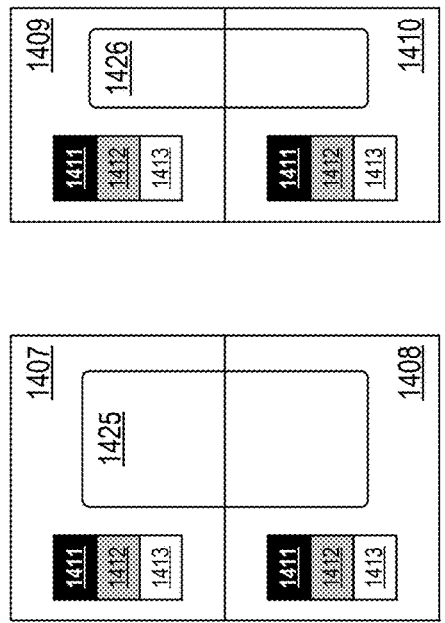
Figure 14A:
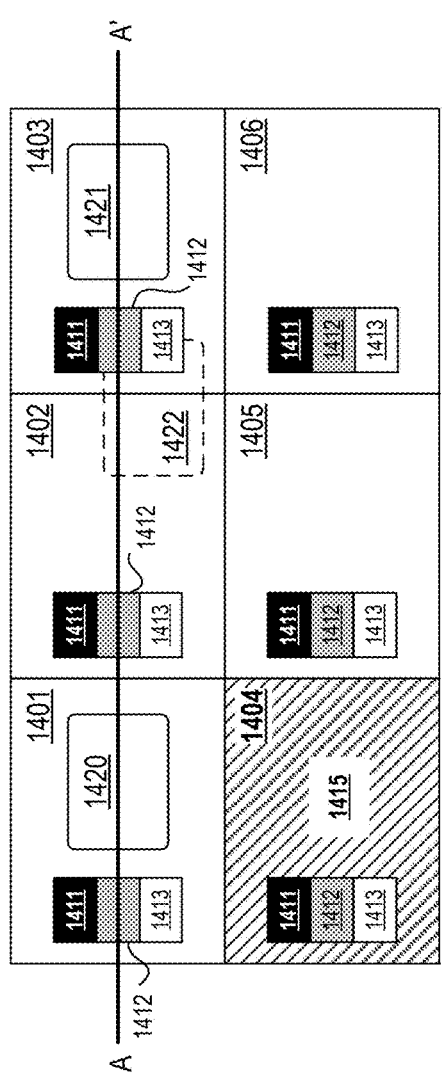
FIG. 14A illustrates a set of example pixels with integrated microphones.

FIG. 14A illustrates a set of example pixels with integrated microphones. Pixels 1401-1406 each have a red display element 1411, green display element 1412, and blue display element 1413, which can be, for example, micro-LEDs or OLEDs. Each of the pixels 1401-1406 occupies a pixel area. For example, the pixel 1404 occupies pixel area 1415. The amount of pixel area occupied by the display elements 1411-1413 in each pixel leaves enough remaining black matrix space for the inclusion of miniature microphones. Pixels 1401 and 1403 contain front-facing microphones 1420 and 1421, respectively, located alongside the display elements 1411-1413. As rear-facing microphones are located on the back side of the display substrate, they are not constrained by unused pixel area or display element size and can be placed anywhere on the back side of a display substrate. For example, rear-facing microphone 1422 straddles pixels 1402 and 1403.

Figure 14B:
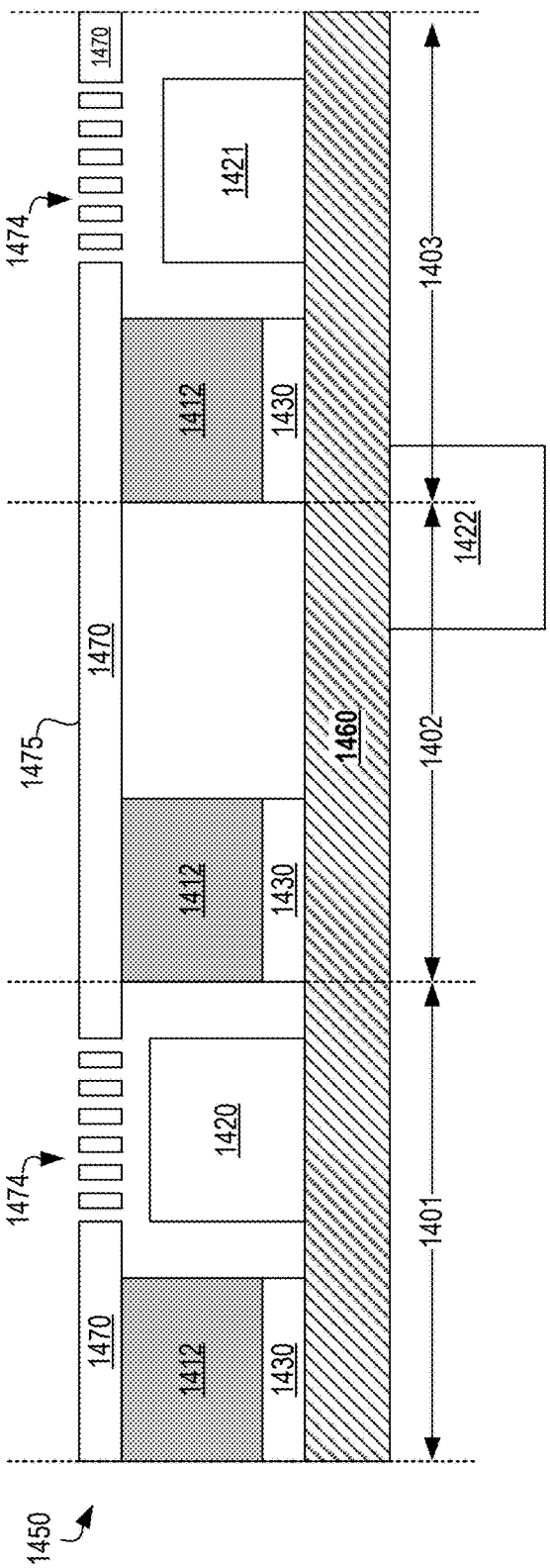
FIG. 14B illustrates a cross-section of the example pixels of FIG. 14A taken along the line A-A'.

FIG. 14B illustrates a cross-section of the example pixels of FIG. 14A taken along the line A-A'. Cross-section 1450 illustrates the cross-section of pixels 1401-1403. Green display elements 1412 and corresponding electrodes 1430 for the pixels 1401-1403 are located on display substrate 1460. The pixels 1401-1403 are covered by transparent display medium 1470 that has holes 1474 above microphones 1420 and 1421 to allow for acoustic vibrations reaching a display surface 1475 to reach the microphones 1420 and 1421. The rear-facing microphone 1422 is located on the back side of the display substrate 1460. In some embodiments, a display housing (not shown) in which pixels 1401-1403 are located has vents or other openings to allow acoustic vibrations reaching the back side of the housing to reach rear-facing microphone 1422.

In some embodiments, the microphones used in the technologies described herein can be discrete microphones that are manufactured or fabricated independently from the pixel display elements and are transferred from a manufacturing substrate or otherwise attached to a display substrate. In other embodiments, the microphones can be fabricated directly on the display substrate. Although front-facing microphones are shown as being located on the surface of the display substrate 1460 in FIG. 14B, in embodiments where the microphones are fabricated on a display substrate, they can reside at least partially within the display substrate.

As used herein, the term "located on" in reference to any sensors (microphones, piezoelectric elements, thermal sensors) with respect to the display substrate refers to sensors that are physically coupled to the display substrate in any manner (e.g., discrete sensors that are directly attached to the substrate, discrete sensors that are attached to the substrate via one or more intervening layers, sensors that have been fabricated on the display substrate). As used herein, the term "located on" in reference to LEDs with respect to the display substrate similarly refers to LEDs that are physically coupled to the display substrate in any manner (e.g., discrete LEDs that are directly attached to the substrate, discrete LEDs that are attached to the substrate via one or more intervening layers, LEDs that have been fabricated on the display substrate). In some embodiments, front-facing microphones are located in the peripheral area of a display to reduce any visual distraction that holes in the display above the front-facing microphones (such as holes 1474) may present to a user. In other embodiments, holes above a microphone may small enough or few enough in number such that they present little or no distraction from the viewing experience.

Although the front-facing microphones 1420 and 1421 are each shown as residing within one pixel, in other embodiments, front-facing microphones can straddle multiple pixels. This can, for example, allow for the integration of larger microphones into a display area or for microphones to be integrated into a display with smaller pixels. FIGS. 14C-14D illustrate example microphones that span multiple pixels. FIG. 14C illustrates adjacent pixels 1407 and 1408 having the same size as pixels 1401-1406 and a front-facing microphone 1425 that is bigger than front-facing microphones 1420-1421 and occupies pixel area not used by display elements in two pixels. FIG. 14D illustrates adjacent pixels 1409 and 1410 that are narrower in width than pixels 1401-1406 and a front-facing microphone 1426 that spans both pixels. Using larger microphones can allow for improved acoustic performance of a display, such as allowing for improved acoustic detection. Displays that have many integrated miniature microphones distributed across the display area can have acoustic detection capabilities that exceed displays having just one or a few discrete microphones located in the display bezel.

In some embodiments, the microphones described herein are MEMS (microelectromechanical systems) microphones. In some embodiments, the microphones generate analog audio signals that are provided to the audio processing components and in other embodiments, the microphones provide digital audio signals to the audio processing components. Microphones generating digital audio signals can contain a local analog-to-digital converter and provide a digital audio output in pulse-density modulation (PDM), I2S (Inter-IC Sound), or other digital audio signal formats. In embodiments where the microphones generate digital audio signals, the audio processing components may not comprise analog-to-digital converters. In some embodiments, the integrated microphones are MEMS PDM microphones having dimensions of approximately 3.5 mm (width)×2.65 mm (length)×0.98 mm (height).

As microphones can be integrated into individual pixels or across several pixels using the technologies described herein, a wide variety of microphone configurations can be incorporated into a display. FIGS. 12A-12C and 14A-14D illustrate several microphone configurations and many more are possible. The display-integrated microphones described herein generate audio signals that are sent to the audio module of a lid controller hub (e.g., audio module 364 in FIGS. 3 and 7).

Displays with microphones integrated into the display area as described herein can perform various audio processing tasks. For example, displays in which multiple front-facing microphones are distributed over the display area can perform beamforming or spatial filtering on audio signals generated by the microphones to allow for far-field capabilities (e.g., enhanced detection of sound generated by a remote acoustic source). Audio processing components can determine the location of a remote audio source, select a subset of microphones based on the audio source location, and utilize audio signals from the selected subset of microphones to enhance detection of sound received at the display from the audio source. In some embodiments, the audio processing components can determine the location of an audio source by determining delays to be added to audio signals generated by various combinations of microphones such that the audio signals overlap in time and then inferring the distance to the audio source from each microphone in the combination based on the added delay to each audio signal. By adding the determined delays to the audio signals provided by the microphones, audio detection in the direction of the remote audio source can be enhanced. A subset of the total number of microphones in a display can be used in beamforming or spatial filtering, and microphones not included in the subset can be powered off to reduce power. Beamforming can similarly be performed using rear-facing microphones distributed across the back side of the display substrate. As compared to displays having a few microphones incorporated into a display bezel, displays with microphones integrated into the display area are capable of improved beamforming due to the greater number of microphones that can be integrated into the display and being spread over a greater area.

In some embodiments, a display is configured with a set of rear-facing microphones distributed across the display area that allows for a closeable device incorporating the display to have audio detection capabilities when the display is closed. For example, a closed device can be in a low-power mode in which the rear-facing microphones and audio processing components capable of performing wake phrase or word detection or identifying a particular user (Speaker ID) are enabled.

In some embodiments, a display comprising both front- and rear-facing microphones can utilize both types of microphones for noise reduction, enhanced audio detection (far field audio), and enhanced audio recording. For example, if a user is operating a laptop in a noisy environment, such as a coffee shop or cafeteria, audio signals from one or more rear-facing microphones picking up ambient noise can be used to reduce noise in an audio signal provided by a front-facing microphone containing the voice of the laptop user. In another example, an audio recording made by a device containing such a display can include audio received by both front- and rear-facing microphones. By including audio captured by both front- and rear-facing microphones, such a recording can provide a more accurate audio representation of the recorded environment. In further examples, a display comprising both front- and rear-facing microphones can provide for 360-degree far field audio reception. For example, the beamforming or spatial filtering approaches described herein can be applied to audio signals provided by both front- and rear-facing microphones to provide enhanced audio detection.

Displays with integrated microphones located within the display area have advantages over displays with microphones located in a display bezel. Displays with microphones located in the display area can have a narrower bezel as bezel space is not needed for housing the integrated microphones. Displays with reduced bezel width can be more aesthetically pleasing to a viewer and allow for a larger display area within a given display housing size. The integration of microphones in a display area allows for a greater number of microphones to be included in a device, which can allow for improved audio detection and noise reduction. Moreover, displays that have microphones located across the display area allow for displays with enhanced audio detection capabilities through the use of beamforming or spatial filtering of received audio signals as described above. Further, the cost and complexity of routing audio signals from microphones located in the display area to audio processing components that are also located in the display area can be less than wiring discrete microphones located in a display bezel to audio processing components located external to the display.

FIG. 15A illustrates a set of example pixels with in-display cameras. Pixels 1501-1506 each have a red display element 1511, green display element 1512, and blue display element 1513. In some embodiments, these display elements are micro-LEDs or OLEDs. Each of the pixels 1501-1506 occupies a pixel area. For example, the pixel 1504 occupies pixel area 1515. The amount of pixel area occupied by the display elements 1511-1513 in each pixel leaves enough remaining black matrix area for the inclusion of miniature cameras or other sensors. Pixels 1501 and 1503 contain cameras 1520 and 1521, respectively, located alongside the display elements 1511-1513. As used herein, the term "in-display camera" refers to a camera that is located in the pixel area of one or more pixels within a display. Cameras 1520 and 1521 are in-display cameras.

FIG. 15B illustrates a cross-section of the example pixels of FIG. 15A taken along the line A-A'. Cross-section 1550 illustrates a cross-section of pixels 1501-1503. The green display elements 1512 and the corresponding electrodes 1530 for the pixels 1501-1503 are located on display substrate 1560 and are located behind a transparent display medium 1570. A camera located in a display area can receive light that passes or does not pass through a transparent display medium. For example, the region of the transparent display medium 1570 above the camera 1520 has a hole in it to allow for light to hit the image sensor of the camera 1520 without having to pass through the transparent display medium. The region of the transparent display medium 1570 above the camera 1521 does not have a hole and the light reaching the image sensor in the camera 1521 passes through the transparent display medium.

In some embodiments, in-display cameras can be discrete cameras manufactured independently from pixel display elements and the discrete cameras are attached to a display substrate after they are manufactured. In other embodiments, one or more camera components, such as the image sensor can be fabricated directly on a display substrate. Although the cameras 1520-1521 are shown as being located on a front surface 1580 of the display substrate 1560 in FIG. 15B, in embodiments where camera components are fabricated on a display substrate, the cameras can reside at least partially within the display substrate.

As used herein, the term "located on" in reference to any sensors or components (e.g., cameras, thermal sensors) with respect to the display substrate refers to sensors or components that are physically coupled to the display substrate in any manner, such as discrete sensors or other components that are directly attached to the substrate, discrete sensors or components that are attached to the substrate via one or more intervening layers, and sensors or components that have been fabricated on the display substrate. As used herein, the term "located on" in reference to LEDs with respect to the display substrate similarly refers to LEDs that are physically coupled to the display substrate in any manner, such as discrete LEDs that are directly attached to the substrate, discrete LEDs that are attached to the substrate via one or more intervening layers, and LEDs that have been fabricated on the display substrate.

Although cameras 1520 and 1521 are shown as each residing within one pixel in FIGS. 15A and 15B, in other embodiments, in-display cameras can span multiple pixels. This can allow, for example, for the integration of larger cameras into a display area or for cameras to be integrated into a display with pixels having a smaller black matrix area. FIGS. 15C-15D illustrate example cameras that span multiple pixels. FIG. 15C illustrates adjacent pixels 1507 and 1508 having the same size as pixels 1501-1506 and a camera 1525 that is bigger than cameras 1520-1521 and that occupies a portion of the pixel area in the pixels 1507-1508. FIG. 15D illustrates adjacent pixels 1509 and 1510 that are narrower in width than pixels 1501-1506 and a camera 1526 that spans both pixels. Using larger cameras can allow for an improved image or video capture, such as for allowing the capture of higher-resolution images and video at individual cameras.

As cameras can be integrated into individual pixels or across several pixels, a wide variety of camera configurations can be incorporated into a display. FIGS. 12A-12C, and 15A-15D illustrate just a few camera configurations and many more are possible. In some embodiments, thousands of cameras could be located in the display area. Displays that have a plurality of in-display cameras distributed across the display area can have image and video capture capabilities exceeding those of displays having just one or a few cameras located in a bezel.

The in-display cameras described herein generate image sensor data that is sent to a vision/imaging module in a lid controller hub, such as vision/imaging module 363 in FIGS. 3 and 6. Image sensor data is the data that is output from the camera to other components. Image sensor data can be image data, which is data representing an image or video data, which is data representing video. Image data or video data can be in compressed or uncompressed form. Image sensor data can also be data from which image data or video data is generated by another component (e.g., the vision/imaging module 363 or any component therein).

The interconnections providing the image sensor data from the cameras to a lid controller hub can be located on the display substrate. The interconnections can be fabricated on the display substrate, attached to the display substrate, or physically coupled to the display substrate in any other manner. In some embodiments, display manufacture comprises manufacturing individual display substrate portions to which pixels are attached and assembling the display substrate portions together to achieve a desired display size.

Figure 16:
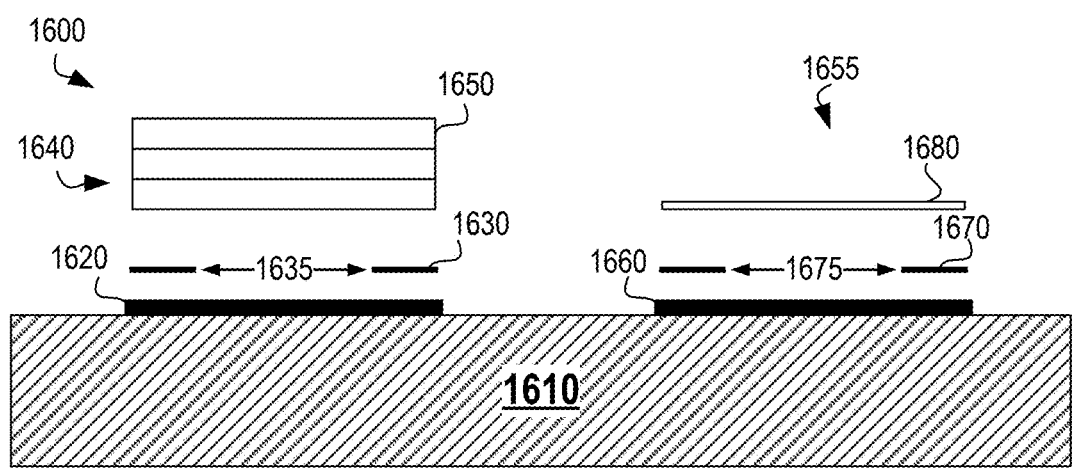
FIG. 16 illustrates example cameras that can be incorporated into an embedded display.

FIG. 16 illustrates example cameras that can be incorporated into an embedded display. A camera 1600 is located on a display substrate 1610 and comprises an image sensor 1620, an aperture 1630, and a microlens assembly 1640. The image sensor 1620 can be a CMOS photodetector or any other type of photodetector. The image sensor 1620 comprises a number of camera pixels, the individual elements used for capturing light in a camera, and the number of pixels in the camera can be used as a measure of the camera's resolution (e.g., 1 megapixel, 12 megapixels, 20 megapixels). The aperture 1630 has an opening width 1635. The microlens assembly 1640 comprises one or more microlenses 1650 that focus light to a focal point and which can be made of glass, plastic, or other transparent material. The microlens assembly 1640 typically comprises multiple microlenses to account for various types of aberrations (such as chromatic aberration) and distortions.

A camera 1655 is also located on display substrate 1610 and comprises an image sensor 1660, an aperture 1670 and a metalens 1680. The camera 1655 is similar to camera 1600 except for the use of a metalens instead of a microlens assembly as the focusing element. Generally, a metalens is a planar lens comprising physical structures on its surface that act to manipulate different wavelengths of light such they reach the same focal point. Metalenses do not produce the chromatic aberration that can occur with single existing microlenses. Metalenses can be much thinner than glass, plastic or other types of microlenses and can be fabricated using MEMS (microelectromechanical systems) or NEMS (nanoelectromechanical systems) approaches. As such, a camera comprising a single, thin metalens, such as the camera 1655 can be thinner than a camera comprising a microlens assembly comprising multiple microlenses, such as the camera 1600. The aperture 1670 has an opening width 1675.

The distance from the microlens assembly 1640 to image sensor 1620 and from the metalens 1680 to the image sensor 1660 defines the focal length of the cameras 1600 and 1655, respectively, and the ratio of the focal length to the aperture opening width (1635, 1675) defines the f-stop for the camera, a measure of the amount of light that reaches the surface of the image sensor. The f-stop is also a measure of the camera's depth of field, with small f-stop cameras having shallower depths of field and large f-stop cameras having deeper depths of field. The depth of field can have a dramatic effect on a captured image. In an image with a shallow depth of field it is often only the subject of the picture that is in focus whereas in an image with a deep depth of field, most objects are typically in focus.

In some embodiments, the cameras 1600 and 1655 are fixed-focus cameras. That is, their focal length is not adjustable. In other embodiments, the focal length of cameras 1600 and 1655 can be adjusted by moving the microlens assembly 1640 or the metalens 1680 either closer to or further away from the associated image sensor. In some embodiments, the distance of the microlens assembly 1640 or the metalens 1680 to their respective image sensors can be adjusted by MEMS-based actuators or other approaches.

In-display cameras can be distributed across a display area in various densities. For example, cameras can be located at 100-pixel intervals, 10-pixel intervals, in adjacent pixels, or in other densities. A certain level of camera density (how many cameras there are per unit area for a region of the display) may be desirable for a particular use case. For example, if the cameras are to be used for image and video capture, a lower camera density may suffice than if the cameras are to be used for touch detection or touch location determination.

In some embodiments, image data corresponding to images captured by multiple individual cameras can be utilized to generate a composite image. The composite image can have a higher resolution than any image capable of being captured by the individual cameras. For example, a system can utilize image data corresponding to images captured by several 3-megapixel cameras to produce a 6-megapixel image. In some embodiments, composite images or videos generated from images or videos captured by individual in-display cameras could have ultra-high resolution, such as in the gigapixel range. Composite images and videos could be used for ultra-high resolution self-photography and videos, ultra-high resolution security monitors, or other applications.

The generation of higher-resolution images from image data corresponding to images captured by multiple individual cameras can allow for individual cameras with lower megapixel counts to be located in the individual pixels. This can allow for cameras to be integrated into higher resolution displays for a given screen size or in smaller displays for a given resolution (where there are more pixels per unit area of display size and thus less free pixel area available to accommodate the integration of cameras at the pixel level). Composite images can be generated in real time as images are captured, with only the image data for the composite image being stored, or the image data for e images captured by the individual cameras can be stored and a composite image can be generated during post-processing. Composite video can be similarly generated using video data corresponding to videos generated by multiple individual cameras, with the composite video being generated in real time or during post-processing.

In some embodiments, in-display cameras can be used in place of touchscreens to detect an object (e.g., finger, stylus) touching the display surface and determining where on the display the touch has occurred. Some existing touchscreen technologies (e.g., resistance-based, capacitance-based) can add thickness to a display though the addition of multiple layers on top of a transparent display medium while others use in-cell or on-cell touch technologies to reduce display thickness. As used herein, the term "transparent display medium" includes touchscreen layers, regardless of whether the touchscreen layers are located on top of a transparent display medium or a transparent display medium is used as a touchscreen layer. Some existing touchscreen technologies employ transparent conductive surfaces laminated together with an isolation layer separating them. These additional layers add thickness to a display and can reduce the transmittance of light through the display. Eliminating the use of separate touchscreen layers can reduce display expense as the transparent conductors used in touchscreens are typically made of indium tin oxide, which can be expensive.

Touch detection and touch location determination can be performed using in-display cameras by, for example, detecting the occlusion of visible or infrared light caused by an object touching or being in close proximity to the display. A touch detection module, which can be located in the display or otherwise communicatively coupled to the display can receive images captured by in-display cameras and process the image data to detect one or more touches to the display surface and determine the location of the touches. Touch detection can be done by, for example, determining whether image sensor data indicates that the received light at an image sensor has dropped below a threshold. In another example, touch detection can be performed by determining whether image sensor data indicates that the received light at a camera has dropped by a determined percentage or amount. In yet another example, touch detection can be performed by determining whether image sensor data indicates that the received light at a camera has dropped by a predetermined percentage or amount within a predetermined amount of time.

Touch location determination can be done, for example, by using the location of the camera whose associated image sensor data indicates that a touch has been detected at the display (e.g., the associated image sensor data indicates that the received light at an image sensor of the camera has dropped below a threshold, dropped by a predetermined percentage or amount, or dropped by a predetermined percentage or amount in a predetermined amount of time) as the touch location. In some embodiments, the touch location is based on the location within an image sensor at which the lowest level of light is received. If the image sensor data associated with multiple neighboring cameras indicate a touch, the touch location can be determined by determining the centroid of the locations of the multiple neighboring cameras.

In some embodiments, touch-enabled displays that utilize in-display cameras for touch detection and touch location determination can have a camera density greater than displays comprising in-displays cameras that are not touch-enabled. However, it is not necessary that displays that are touch-enabled through the use of in-display cameras have cameras located in every pixel. The touch detection module can utilize image sensor data from one or more cameras to determine a touch location. The density of in-display cameras can also depend in part on the touch detection algorithms used.

Information indicating the presence of a touch and touch location information can be provided to an operating system, an application, or any other software or hardware component of a system comprising a display or communicatively coupled to the display. Multiple touches can be detected as well. In some embodiments, in-display cameras provide updated image sensor data to the touch detection module at a frequency sufficient to provide for the kind of touch display experience that users have come to expect of modern touch-enabled devices. The touch detection capabilities of a display can be temporarily disabled as in-display cameras are utilized for other purposes as described herein.

In some embodiments, if a touch is detected by the system in the context of the system having prompted the user to touch their finger, thumb, or palm against the display to authenticate a user, the system can cause the one or more pixel display elements located at or in the vicinity of where a touch has been detected to emit light to allow the region where a user's finger, thumb, or palm is touching to be illuminated. This illumination may allow for the capture of a fingerprint, thumbprint, or palmprint in which print characteristics may be more discernible or easily extractible by the system or device.

The use of in-display cameras allows for the detection of a touch to the display surface by a wider variety of objects than can be detected by existing capacitive touchscreen technologies. Capacitive touchscreens detect a touch to the display by detecting a local change in the electrostatic field generated by the capacitive touchscreen. As such, capacitive touchscreens can detect a conductive object touching or in close proximity to the display surface, such as a finger or metallic stylus. As in-display cameras rely on the occlusion of light to detect touches and not on sensing a change in capacitance at the display surface, in-display camera-based approaches for touch sensing can detect the touch of a wide variety of objects, including passive styluses. There are no limitations that the touching object be conductive or otherwise able to generate a change in a display's electrostatic field.

In some embodiments, in-display cameras can be used to detect gestures that can be used by a user to interface with a system or device. A display incorporating in-display cameras can allow for the recognition of two-dimensional (2D) gestures (e.g., swipe, tap, pinch, unpinch) made by one or more fingers or other objects on a display surface or of three-dimensional (3D) gestures made by a stylus, finger, hand, or another object in the volume of space in front of a display. As used herein, the phrase "3D gesture" describes a gesture, at least a portion of which, is made in the volume of space in front of a display and without touching the display surface.

The twist gesture can be mapped to an operation to be performed by an operating system or an application executing on the system. For example, a twist gesture can cause the manipulation of an object in a CAD (computer-aided design) application. For instance, a twist gesture can cause a selected object in the CAD application to be deformed by the application keeping one end of the object fixed and rotating the opposite end of the object by an amount corresponding to a determined amount of twisting of the physical object by the user. For example, a 3D cylinder in a CAD program can be selected and be twisted about its longitudinal axis in response to the system detecting a user twisting a stylus in front of the display. The resulting deformed cylinder can look like a piece of twisted licorice candy. The amount of rotation, distortion, or other manipulation that a selected object undergoes in response to the detection of a physical object being in front of the display being rotated does not need to have a one-to-one correspondence with the amount of detected rotation of the physical object. For example, in response to detecting that a stylus is rotated 360 degrees, a selected object can be rotated 180 degrees (one-half of the detected amount of rotation), 720 degrees (twice the detected amount of rotation), or any other amount proportional to the amount of detected rotation of the physical object.

Systems incorporating a display or communicatively coupled to a display with in-display cameras are capable of capturing 3D gestures over a greater volume of space in front of the display than what can be captured by only a small number of cameras located in a display bezel. This is due to in-display cameras being capable of being located across a display collectively have a wider viewing area relative to the collective viewing area of a few bezel cameras. If a display contains only one or more cameras located in a display bezel, those cameras will be less likely to capture 3D gestures made away from the bezel (e.g., in the center region of the display) or 3D gestures made close to the display surface. Multiple cameras located in a display area can also be used to capture depth information for a 3D gesture.

The ability to recognize 3D gestures in front of the display area allows for the detection and recognition of gestures not possible with displays comprising resistive or capacitive touchscreens or bezel cameras. For example, systems incorporating in-display cameras can detect 3D gestures that start or end with a touch to the display. For example, a "pick-up-move-place" gesture can comprise a user performing a pinch gesture on the display surface to select an object shown at or in the vicinity of the location where the pinched fingers come together (pinch location), picking up the object by moving their pinched fingers away from the display surface, moving the object by moving their pinched fingers along a path from the pinched location to a destination location, placing the object by moving their pinched finger back towards the display surface until the pinched fingers touch the display surface and unpinching their fingers at the destination location.

During a "pick-up-move-place" gesture, the selected object can change from an unselected appearance to a selected appearance in response to detection of the pinch portion of the gesture, the selected object can be moved across the display from the pinch location to the destination location in response to detection of the move portion of the gesture, and the selected object can change back to an unselected appearance in response to detecting the placing portion of the gesture. Such a gesture could be used for the manipulation of objects in a three-dimensional environment rendered on a display. Such a three-dimensional environment could be part of a CAD application or a game. The three-dimension nature of this gesture could manifest itself by, for example, the selected object not interacting with other objects in the environment located along the path traveled by the selected objected as it is moved between the pinched location and the destination location. That is, the selected object is being picked up and lifted over the other objects in the application via the 3D "pick-up-move-place" gesture.

Variations of this gesture could also be recognized. For example, a "pick-up-and-drop" gesture could comprise a user picking up an object by moving their pinched fingers away from the display surface after grabbing the object with a pinch gesture and then "dropping" the object by unpinching their fingers while they are located above the display. An application could generate a response to detecting that a picked-up object has been dropped. The magnitude of the response could correspond to the "height" from which the object was dropped, the height corresponding to a distance from the display surface that the pinched fingers were determined to be positioned when they were unpinched. In some embodiments, the response of the application to an object being dropped can correspond to one or more attributes of the dropped object, such as its weight.

For example, in a gaming application, the system could detect a user picking up a boulder by detecting a pinch gesture at the location where the boulder is shown on the display, detect that the user has moved their pinched fingers a distance from the display surface, and detect that the user has unpinched their pinched fingers at a distance from the display surface. The application can interpret the unpinching of the pinched fingers at a distance away from the display surface as the boulder being dropped from a height. The gaming application can alter the gaming environment to a degree that corresponds to the "height" from which the boulder was dropped, the height corresponding to a distance from the display surface at which the system determined the pinched fingers to have been unpinched and the weight of the boulder. For example, if the boulder was dropped from a small height, a small crater may be created in the environment, and the application can generate a soft thud noise as the boulder hits the ground. If the boulder is dropped from a greater height, a larger crater can be formed, nearby trees could be knocked over, and the application could generate a loud crashing sound as the boulder hits the ground. In other embodiments, the application can take into account attributes of the boulder, such as its weight, in determining the magnitude of the response, a heavier boulder creating a greater alternation in the game environment when dropped.

In some embodiments, a measure of the distance of unpinched or pinched fingers from the display surface can be determined by the size of fingertips extracted from image sensor data generated by in-display cameras, with larger extracted fingertip sizes indicating that the fingertips are closer to the display surface. The determined distance of pinched or unpinched fingers does not need to be determined according to a standardized measurement system (e.g., metric, imperial), and can be any metric wherein fingers located further away from the display surface are a greater distance away from the display surface than fingers located nearer the display surface.

Figure 17:
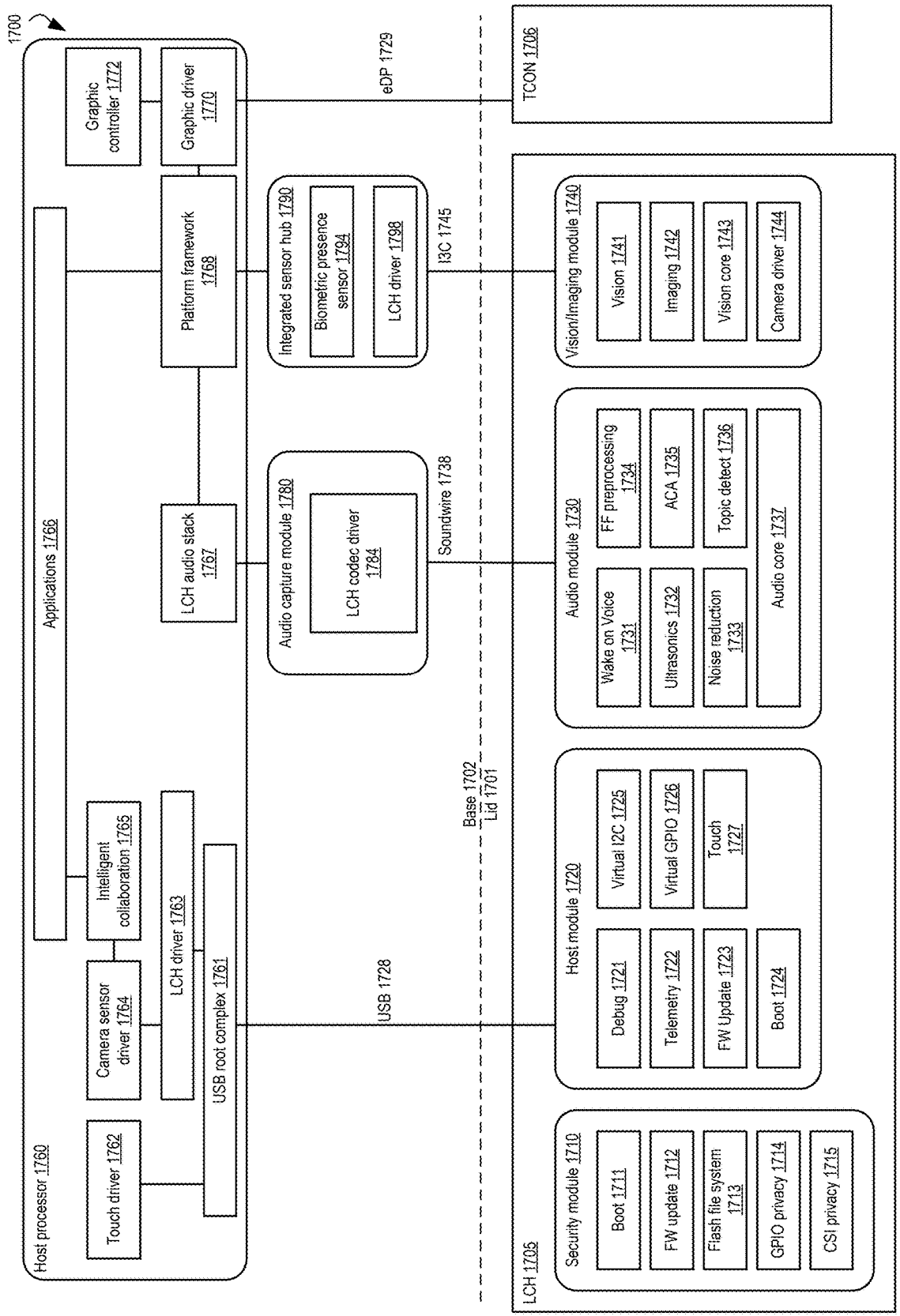
FIG. 17 illustrates a block diagram of an example software/firmware environment of a mobile computing device comprising a lid controller hub.

FIG. 17 illustrates a block diagram of an example software/firmware environment of a mobile computing device comprising a lid controller hub. The environment 1700 comprises a lid controller hub 1705 and a timing controller 1706 located in a lid 1701 in communication with components located in a base 1702 of the device. The LCH 1705 comprises a security module 1710, a host module 1720, an audio module 1730, and a vision/imaging module 1740. The security module 1710 comprises a boot module 1711, a firmware update module 1712, a flash file system module 1713, a GPIO privacy module 1714, and a CSI privacy module 1715. In some embodiments, any of the modules 1711-1715 can operate on or be implemented by one or more of the security module 1710 components illustrated in FIGS. 2-4 or otherwise disclosed herein. The boot module 1711 brings the security module into an operational state in response to the computing device being turned on. In some embodiments, the boot module 1711 brings additional components of the LCH 1705 into an operational state in response to the computing device being turned on. The firmware update module 1712 updates firmware used by the security module 1710, which allows for updates to the modules 1711 and 1713-1715. The flash file system module 1713 implements a file system for firmware and other files stored in flash memory accessible to the security module 1710. The GPIO and CSI privacy modules 1714 and 1715 control the accessibility by LCH components to image sensor data generated by cameras located in the lid.

The host module 1720 comprises a debug module 1721, a telemetry module 1722, a firmware update module 1723, a boot module 1724, a virtual I2C module 1725, a virtual GPIO 1726, and a touch module 1727. In some embodiments, any of the modules 1721-1727 can operate on or be implemented by one or more of the host module components illustrated in FIGS. 2-3 and 5 or otherwise disclosed herein. The boot module 1724 brings the host module 1720 into an operational state in response to the computing device being turned on. In some embodiments, the boot module 1724 brings additional components of the LCH 1705 into an operational responsible in response to the computing device being turned on. The firmware update module 1723 updates firmware used by the host module 1720, which allows for updates to the modules 1721-1722 and 1724-1727. The debug module 1721 provides debug capabilities for the host module 1720. In some embodiments the debug module 1721 utilizes a JTAG port to provide debug information to the base 1702. In some embodiments. The telemetry module 1722 generates telemetry information that can be used to monitor LCH performance. In some embodiments, the telemetry module 1722 can provide information generated by a power management unit (PMU) and/or a clock controller unit (CCU) located in the LCH. The virtual I2C module 1725 and the virtual GPIO 1726 allow the host processor 1760 to remotely control the GPIO and I2C ports on the LCH as if they were part of the SoC. By providing control of LCH GPIO and I2C ports to a host processor over a low-pin USB connection allows for the reduction in the number of wires in the device hinge. The touch module 1727 processes touch sensor data provided to the host module 1720 by a touch sensor controller and drives the display's touch controller. The touch module 1727 can determine, for example, the location on a display of one or more touches to the display and gesture information (e.g., type of gesture, information indicating the location of the gesture on the display). Information determined by the touch module 1727 and other information generated by the host module 1720 can be communicated to the base 1702 over the USB connection 1728.

The audio module 1730 comprises a Wake on Voice module 1731, an ultrasonics module 1732, a noise reduction module 1733, a far-field preprocessing module 1734, an acoustic context awareness module 1735, a topic detection module 1736, and an audio core 1737. In some embodiments, any of the modules 1731-1737 can operate on or be implemented by one or more of the audio module components illustrated in FIGS. 2-3 and 6 or otherwise disclosed herein. The Wake on Voice module 1731 implements the Wake on Voice feature previously described and in some embodiments can further implement the previously described Speaker ID feature. The ultrasonics module 1732 can support a low-power low-frequency ultrasonic channel by detecting information in near-ultrasound/ultrasonic frequencies in audio sensor data. In some embodiments, the ultrasonics module 1732 can drive one or more speakers located in the computing device to transmit information via ultrasonic communication to another computing device. The noise reduction module 1733 implements one or more noise reduction algorithms on audio sensor data. The far-field preprocessing module 1734 perform preprocessing on audio sensor data to enhance audio signals received from a remote audio source. The acoustic context awareness module 1735 can implement algorithms or models that process audio sensor data based on a determined audio context of the audio signal (e.g., detecting an undesired background noise and then filtering the unwanted background noise out of the audio signal).

The topic detection module 1736 determines one or more topics in speech detected in audio sensor data. In some embodiments, the topic detection module 1736 comprises natural language processing algorithms. In some embodiments, the topic detection module 1736 can determine a topic being discussed prior to an audio query by a user and provide a response to the user based on a tracked topic. For example, a topic detection module 1736 can determine a person, place, or other topic discussed in a time period (e.g., in the past 30 seconds, past 1 minute, past 5 minutes) prior to a query, and answer the query based on the topic. For instance, if a user is talking to another person about Hawaii, the topic detection module 1736 can determine that "Hawaii" is a topic of conversation. If the user then asks the computing device, "What's the weather there?", the computing device can provide a response that provides the weather in Hawaii. The audio core 1737 is a real-time operating system and infrastructure that the audio processing algorithms implemented in the audio module 1730 are built upon. The audio module 1730 communicates with an audio capture module 1780 in the base 1702 via a SoundWire® connection 1738.

The vision/imaging module 1740 comprises a vision module 1741, an imaging module 1742, a vision core 1743, and a camera driver 1744. In some embodiments, any of the components 1741-1744 can operate on or be implemented by one or more of the vision/imaging module components illustrated in FIGS. 2-3 and 7 or otherwise disclosed herein. The vision/imaging module 1740 communicates with an integrated sensor hub 1790 in the base 1702 via an I3C connection 1745. The vision module 1741 and the imaging module 1742 can implement one or more of the algorithms disclosed herein as acting on image sensor data provided by one or more cameras of the computing device. For example, the vision and image modules can implement, separately or working in concert, one or more of the Wake on Face, Face ID, head orientation detection, facial landmark tracking, 3D mesh generation features described herein. The vision core 1743 is a real-time operating system and infrastructure that video and image processing algorithms implemented in the vision/imaging module 1740 are built upon. The vision/imaging module 1740 interacts with one or more lid cameras via the camera driver 1744. In some instance the camera driver 1744 can be a microdriver.

The components in the base comprise a host processor 1760, an audio capture module 1780 and an integrated sensor hub 1790. In some embodiments, these three components are integrated on an SoC. The audio capture module 1780 comprises an LCH audio codec driver 1784. The integrated sensor hub 1790 can be an Intel® integrated sensor hub or any other sensor hub capable of processing sensor data from one or more sensors. The integrated sensor hub 1790 communicates with the LCH 1705 via an LCH driver 1798, which, in some embodiments, can be a microdriver. The integrated sensor hub 1790 further comprises a biometric presence sensor 1794. The biometric presence sensor 1794 can comprise a sensor located in the base 1702 that is capable of generating sensor data used by the computing device to determine the presence of a user. The biometric presence sensor 1794 can comprise, for example, a pressure sensor, a fingerprint sensor, an infrared sensor, or a galvanic skin response sensor. In some embodiments, the integrated sensor hub 1790 can determine the presence of a user based on image sensor data received from the LCH and/or sensor data generated by a biometric presence sensor located in the lid (e.g., lid-based fingerprint sensor, a lid-based infrared sensor).

The host processor 1760 comprises a USB root complex 1761 that connects a touch driver 1762 and an LCH driver 1763 to host module 1720. The host module 1720 communicates data determined from image sensor data, such as the presence of one or more users in an image or video, facial landmark data, 3D mesh data, etc. to one or more applications 1766 on the host processor 1760 via the USB connection 1728 to the USB root complex 1761. The data passes from the USB root complex 1761 through an LCH driver 1763, a camera sensor driver 1764, and an intelligent collaboration module 1765 to reach the one or more applications 1766.

The host processor 1760 further comprises a platform framework module 1768 that allows for power management at the platform level. For example, the platform framework module 1768 provides for the management of power to individual platform-level resources such as the host processor 1760, SoC components (GPU, I/O controllers, etc.), LCH, display, etc. The platform framework module 1768 also provides for the management of other system-level settings, such as clock rates for controlling the operating frequency of various components, fan settings to increase cooling performance. The platform framework module 1768 communicates with an LCH audio stack 1767 to allow for the control of audio settings and a graphic driver 1770 to allow for the control of graphic settings. The graphic driver 1770 provides video data to the timing controller 1706 via an eDP connection 1729 and a graphic controller 1772 provides for user control over a computing device's graphic settings. For example, a user can configure graphic settings to optimize for performance, image quality, or battery life. In some embodiments, the graphic controller is an Intel® Graphic Control Panel application instance.

Figure 18:
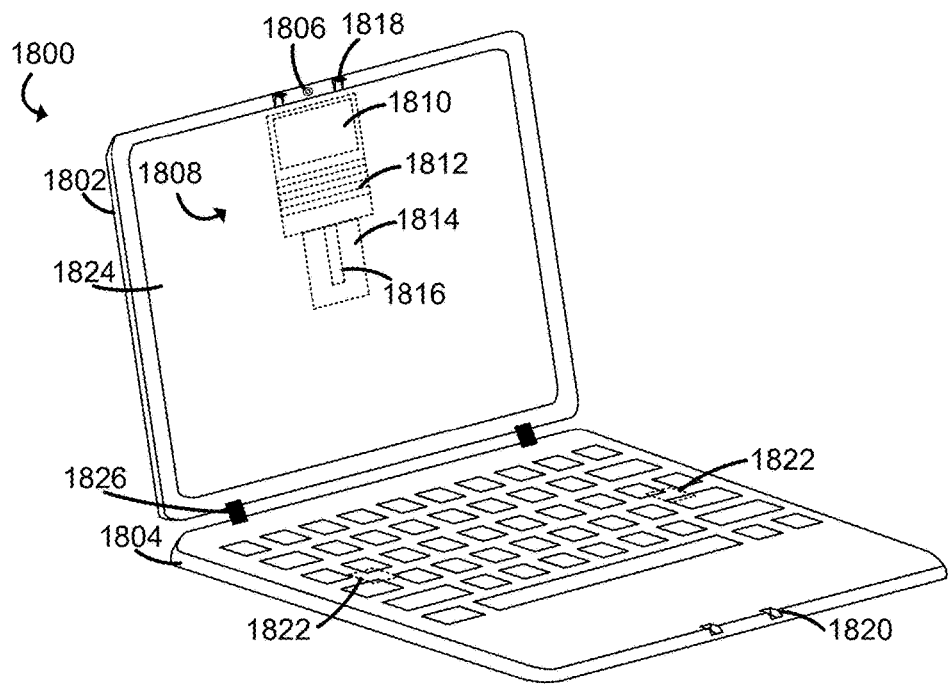
FIG. 18 is a simplified drawing of at least one embodiment of a computing device for imaging a white board with use of a mirror.
Figure 19:
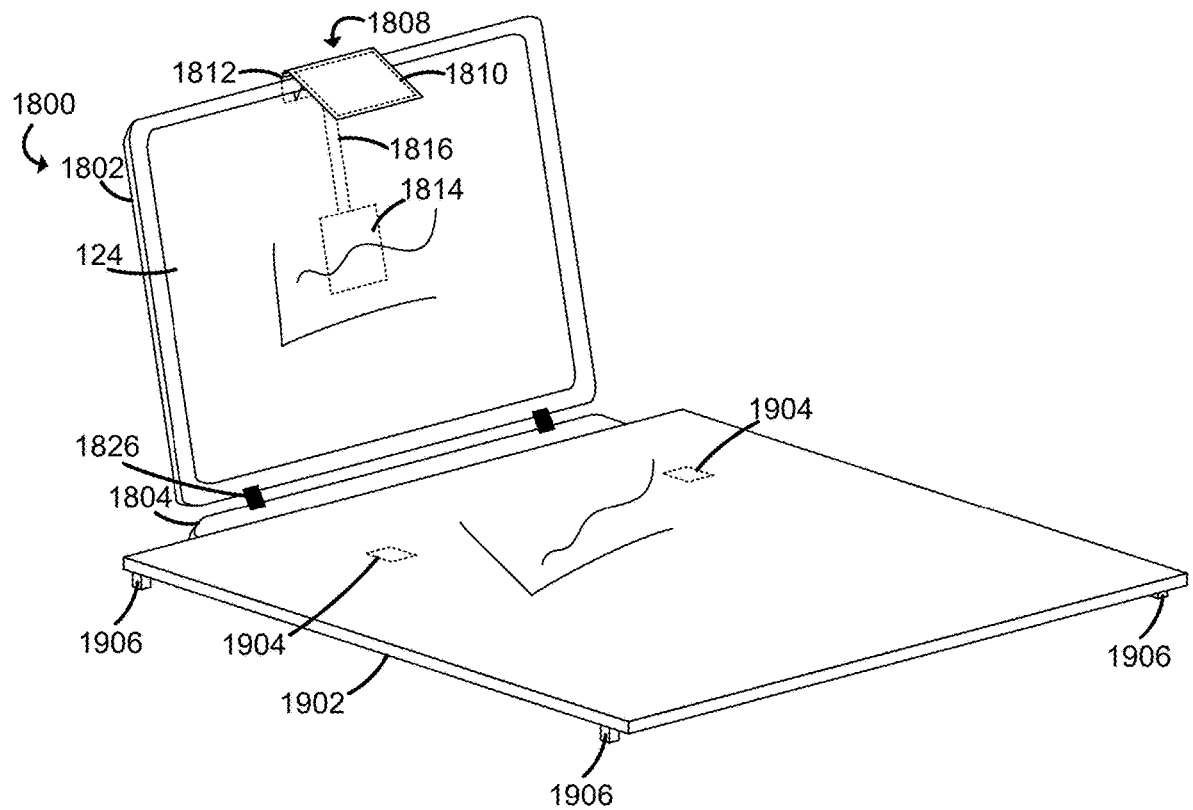
FIG. 19 is a simplified drawing of the computing device of FIG. 18 with a white board over the keyboard of the computing device that is imaged with use of a mirror.

Referring now to FIG. 18, an illustrative computing device 1800 includes a display portion 1802 and a base portion 1804. The illustrative display portion 1802 includes a camera 1806 and a mirror assembly 1808. The mirror assembly is driven by an actuator 1816 in an actuator housing 1814. In use, a user can put a whiteboard (such as whiteboard 1902 shown in FIG. 19) on the base 1804. The mirror assembly 1808 can extend from the display portion 1802 into a position to reflect the whiteboard 1902 towards the camera 1806, as shown in FIG. 19. A drawing on the whiteboard 1902 can then be visible by the camera 1806 and displayed on a display 1824 of the display portion 1802. The drawing can also be sent to remote computing devices during a video conference, allowing the user of the computing device 1800 to share drawings on the whiteboard 1902. The computing device 1800 can be any of the computing devices described or referenced herein, such as computing devices 100, 122, 200, 300, and 900. The display portion 1802 can be any of the lids described or referenced herein, such as lids 120, 123, 220, 309, 920, and 1701. The base portion 1804 can be any of the bases described or referenced herein, such as bases 110, 129, 210, 315, and 910. The camera 1806 can be any of the cameras described or referenced herein, such as cameras 160, 270, 346, and 932. The display 1824 can be any of the embedded display panels described or referenced herein, such as panels 145, 280, 380, and 926.

The illustrative computing device 1800 is embodied as a laptop with a clamshell configuration. The illustrative computing device 1800 can be in an open configuration (shown in FIGS. 18 & 19) or a closed configuration, with the display portion 1802 positioned on top of the base portion 1804 with the display 1824 facing downwards toward the base portion 1804. Additionally or alternatively, the computing device 1800 may be embodied as a laptop with additional configurations. For example, the computing device 1800 may be a laptop with a display that can rotate up to 360°, allowing the computing device 1800 to be in a book configuration, a tablet configuration, etc. The computing device 1800 may be a 2-in-1 device, with a display portion 1802 that can separate from the base portion 1804. In some embodiments, the computing device 1800 may be embodied as a tablet or other mobile device, with only a display portion 1802 and not a base portion 1804. In such embodiments, the computing device 1800 may rest on a stand (which may be integrated into the display portion 1802 or may be a separate component) while the camera 1806 and mirror assembly 1808 are used to display a whiteboard 1902 positioned on a surface next to the computing device 1800. It should be appreciated that, in some embodiments, the computing device 1800 may be embodied as a computing device described above, such as computing device 100, computing device 122, device 200, etc. Accordingly, in some embodiments, display portion 1802 may be embodied as a lid described above, such as lid 120, lid 123, lid 220, etc., and base portion 1804 may be embodied as a base described above, such as base 110, base 124, base 210, etc.

The computing device 1800 may include several components, such as a battery, one or more processors, a memory, one or more antennas (such as a Wi-Fi® antenna, a Bluetooth® antenna, a 5G antenna, a cellular antenna, etc.), a keyboard, one or more connectors (such as one or more USB2 connectors, one or more USB3 connectors, an SD card slot, a headphone and/or microphone jack, a power connector, etc.), etc. Each of those various components may be in the display portion 1802 and/or the base portion 1804.

The illustrative display portion 1802 has a display 1824. The display 1824 may be any suitable size and/or resolution, such as a 5-18 inch display, with a resolution from 2340×480 to 3820×2400. The display 1824 may use any suitable display technology, such as LED, OLED, QD-LED, etc. The display 1824 may be a touchscreen display.

The display portion 1802 includes the mirror assembly 1808. The illustrative mirror assembly 1808 is positioned inside the display portion 1802, behind the display 1824, such that the mirror assembly 1808 is not visible when in the closed configuration, as shown in FIG. 18. The mirror assembly 1808 may be any suitable material, such as plastic, metal, wood, or any suitable combination thereof. The mirror assembly 1808 includes a hinge 1812 allowing the mirror 1810 to rotate (e.g., be bent toward the base portion 1804) once it extends out of the display portion 1802. In the illustrative embodiment, the hinge 1812 is a living hinge. In other embodiments, the hinge 1812 may be a different kind of hinge, such as a hinge made up of two or more separate components. The mirror assembly 1808 is described in more detail below in regard to FIGS. 20 & 21.

The display portion 1802 also includes an actuator 1816 and an actuator housing 1814. The actuator 1816 is configured to extend the mirror assembly 1808 out of the display portion 1802. The actuator 1816 may be electromechanical, mechanical, or any other suitable configuration. The actuator include one or more springs, motors, screws, and/or the like. The actuator 1816 may be configured to apply a force pushing the mirror assembly 1808 out of the display portion 1802, apply a force pulling the mirror assembly 1808 into the display portion 1802, or both. The actuator 1816 may be made of any suitable material, such as plastic, metal, steel, aluminum, iron, stainless steel, etc. The actuator housing 1814 supports the actuator 1816 as it applies a force to the mirror assembly 1808. The actuator housing 1814 may include one or more control elements that mechanically or electronically control motion of the actuator 1816. One possible embodiment of the actuator 1816 and actuator housing 1814 is discussed in more detail below in regard to FIGS. 22 & 23, and a second possible embodiment of the actuator 1816 and actuator housing 1814 is discussed in more detail below in regard to FIGS. 24-27. It should be appreciated that other embodiments of the actuator 1816 and actuator housing 1814 may be used.

The camera 1806 may include one or more fixed or adjustable lenses and one or more image sensors. The image sensors may be any suitable type of image sensors, such as a CMOS or CCD image sensor. The camera 1806 may have any suitable aperture, focal length, field of view, etc. For example, the camera 1806 may have a field of view of 60-110° in the azimuthal and/or elevation directions. In the illustrative embodiment, the camera 1806 has a field of view that can capture the entire whiteboard 1902.

The illustrative display portion 1802 includes one or more protrusions 1818 that the mirror assembly 1808 is configured to rest against when the mirror assembly 1808 is in the open configuration. The illustrative protrusions 1818 are configured to hold the mirror assembly 1808 at an angle and position such that the whiteboard 1902 is imaged by the camera 1806. In the illustrative embodiment, the one or more protrusions 1818 mate with corresponding recess 1820 in the base portion 1804 when the computing device 1800 is in the closed configuration.

In the illustrative embodiment, the base portion 1804 is connected to the display portion 1802 by one or more hinges 1826. The illustrative base portion 1804 may include a keyboard, a mouse pad, a track pad, a touch pad, or other input devices. In some embodiments, the base portion 1804 may include sensors 1822 that are configured to sense the presence of the whiteboard 1902, which may have magnets 1904 that are sensed by the sensors 1822. In some embodiments, the base portion 1802 may include one or more magnets that attract magnets 1904 in the whiteboard 1902 to hold the whiteboard 1902 in place. In some embodiments, the sensors 1822 may sense the presence of the whiteboard 1902 in other ways, such as by reading an RFID tag, monitoring a light level, etc. In other embodiments, the presence of the whiteboard 1902 may not be automatically sensed by the computing device 1800. Rather, a user may manually indicate to the computing device 1800 that the whiteboard 1902 is present, or the computing device 1800 may not be aware of whether the whiteboard 1902 is present or not.

The illustrative whiteboard 1902 is configured to be placed on top of the base portion 1804. The illustrative whiteboard 1902 includes one or more magnets 1904 that may be used to hold the whiteboard 1902 in place and/or sense the presence of the whiteboard 1902. The whiteboard 1902 may have any suitable dimensions, such as a width of 100-500 millimeters and/or a length of 100-500 millimeters. The whiteboard 1902 may have any suitable thickness, such as 2-15 millimeters. The whiteboard 1902 may be made of any suitable material, such as plastic, wood, metal, etc. The top surface of the illustrative whiteboard 1902 may coated with a matte-finished or glossy white coating, such as a polyester or acrylic coating. It should be appreciated that computing device 1800 may be compatible with other drawing boards besides a whiteboard 1902. For example, the computing device 1800 may be compatible with a blackboard drawing surface, a clipboard drawing surface, a notebook drawing surface, and/or any suitable combination of those drawing boards. For example, in one embodiment, a whiteboard 1800 may have a clip that can hold one or more sheets of paper, allowing a user to draw on paper that is displayed on the display 1826. The illustrative whiteboard 1902 includes one or more feet 1906 that prop up the corners of the whiteboard 1902. In the illustrative embodiment, the feet 1906 of the whiteboard 1902 hold the whiteboard 1902 to be at a height such that the lower surface of the whiteboard 1902 is approximately at the same height as the upper surface of the base portion 1804. In other embodiments, the feet 1906 may be longer such that the feet 1906 hold the whiteboard 1902 above the base portion 1804, or the feet 1906 may be shorter such that the feet 1906 do not touch the surface that the base portion 1804 is on, allowing the white board 1902 to rest on the base portion 1804. In some embodiments, the whiteboard 1902 may not include feet 1906.

Figure 20:
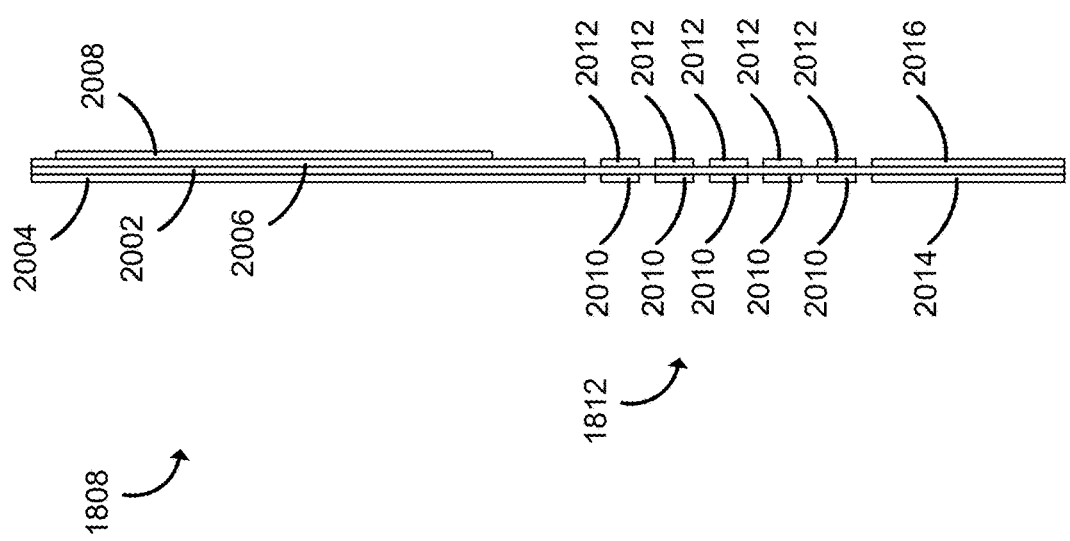
FIG. 20 is a simplified drawing of the mirror mount of FIGS. 18 & 19 in a straight or closed configuration.

Referring now to FIG. 20, in one embodiment, a side view of a mirror assembly 1808 is shown in a straight or closed configuration. The mirror assembly 1808 includes a center layer 2002 extending along the length of the mirror assembly 1808. At one end of the mirror assembly 1808, a first outer layer 2004 and a second outer layer 2006 are disposed on either side of the center layer 2002. A mirror 2008 is disposed adjacent the second outer layer 2006. In the illustrative embodiment, the first outer layer 2004 and the second outer layer 2006 extend from one end of the mirror assembly 1808 to the beginning of the living hinge 1812. Each of the illustrative first outer layer 2004 and the second outer layer 2006 extend along the full width of the mirror assembly 1808 (i.e., into the page on FIG. 20).

The illustrative living hinge 1812 is constructed with several first outer layer strips 2010 and second outer layer strips 2012 with gaps between them exposing the center layer 2002, as shown in FIG. 20. The gaps between the outer layer strips 2010, 2012 allow the center layer 2002 to flex, forming the living hinge 1812. Below the living hinger 1812, outer layer strips 2014 and 2016 extend to the end of the mirror assembly 1808.

The mirror assembly 1808 may be any suitable dimensions. In the illustrative embodiment, the mirror assembly 1808 has a width of 75 millimeters and a length of 100 millimeters. In other embodiments, the mirror assembly 1808 may have any suitable width and/or length, such as 25-250 millimeters. The thickness of the mirror assembly 1808 may be any suitable thickness. In the illustrative embodiment, the mirror assembly 1808 has a thickness of 0.8 millimeters (not including the mirror 2008), with the center layer 2002 having a thickness of 0.4 millimeters, and each outer layer 2004, 2006, 2010, 2012, 2014, 2016 having a thickness of 0.2 millimeters. In other embodiments, the mirror assembly 1808 may have any suitable thickness, such as 0.5-3 millimeters, and each layer 2002, 2004, 2006, 2010, 2012, 2014, 2016 may have any suitable thickness, such as 0.1-1.0 millimeter. It should be appreciated that, in embodiments with a living hinge 1812, the center layer 2002 (or whatever layer bends as part of the hinge 1812) may have a thickness suitable to a desired amount of bend.

In the illustrative embodiment, the center layer 2002 is polypropylene. In other embodiments, the center layer 2002 may be any other suitable material, such as polyethylene or other plastic with high fatigue resistance, metal, wood, etc. In the illustrative embodiment, each outer layer 2004, 2006, 2010, 2012, 2014, 2016 is aluminum. In other embodiments, the outer layer 2004, 2006, 2010, 2012, 2014, 2016 may be any other suitable material, such as plastic, metal or wood. In some embodiments, the body of the hinge assembly 1808 is one material, with the living hinge 1812 formed from the same material at a different thickness, allowing it to bend.

The mirror 2008 may be any suitable type of mirror. In the illustrative embodiment, the mirror 2008 is made of a transparent material (such as glass, plastic, polycarbonate, etc.) with a reflective surface on the back, which, in the illustrative embodiment, is in contact with the outer layer 2006. The reflective surface may be, e.g., a thin layer of silver, aluminum, or other metal, a dielectric stack, and/or any other suitable reflective surface. In some embodiments, the reflective surface may be the surface of the outer layer 2006, such as polished aluminum, with or without a layer 2008 on top of it. In the illustrative embodiment, the width of the mirror 2008 is 70 millimeters, slightly less than the width of the center layer 2002. In other embodiments, the mirror 2008 may have any suitable width that is greater than, equal to, or less than that of the center layer 2002, such as any suited from 25-200 millimeters. The length of the illustrative mirror 2008 is 40 millimeters. In other embodiments, the mirror 2008 may have any suitable length, such as 10-200 millimeters. In the illustrative embodiment, the dimensions of the mirror 2008 are such that, when the mirror assembly 1808 is in the open configuration, the entire field of view of the camera 1806 views the mirror 2008. In the illustrative embodiment, the shape of the mirror 2008 is rectangular. In other embodiments, the mirror 2008 may be different shapes, such as a trapezoid.

Figure 21:
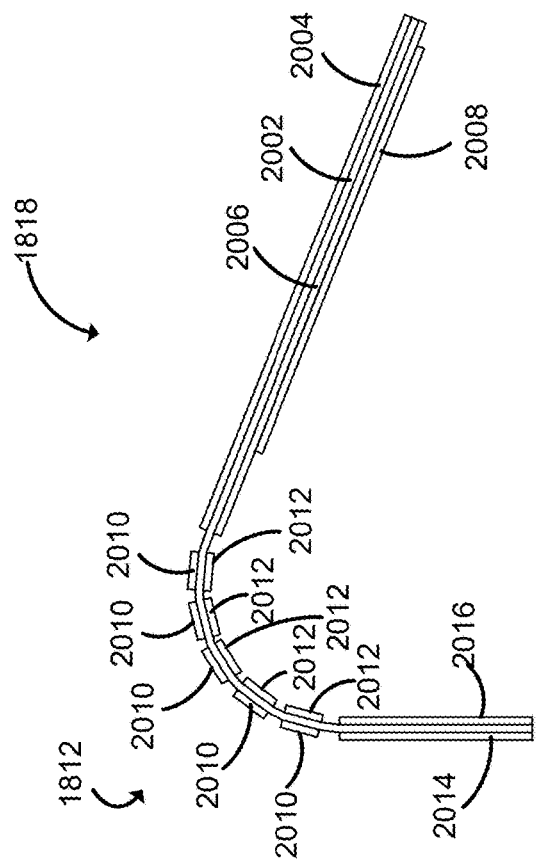
FIG. 21 is a simplified drawing of the mirror mount of FIGS. 18 & 19 in a curved or open configuration.

Referring now to FIG. 21, in one embodiment, the mirror assembly 1808 is shown in a curved or open configuration. In the open configuration, the hinge 1812 is bent, orienting the mirror 2008 and outer layers 2004, 2006 at an angle relative to the outer layers 2014, 2016. In the illustrative embodiment, the hinge 1812, mirror 2008, and outer layers 2004, 2006 extend outside of the display portion 1802, and at least some of the outer layers 2014, 2016 remain inside of the display portion 1802. The angle the hinge 1812 may rotate may be any suitable value, such as any angle from 30-150°. In the illustrative embodiment, the hinge 1812 rotates 120° until the outer layer 2006 and/or the mirror 2008 rest on the protrusions 1818. In some embodiments, the orientation of the mirror assembly 1808 may be controlled by the user, such as by the user manually adjusting the orientation.

Figure 22:
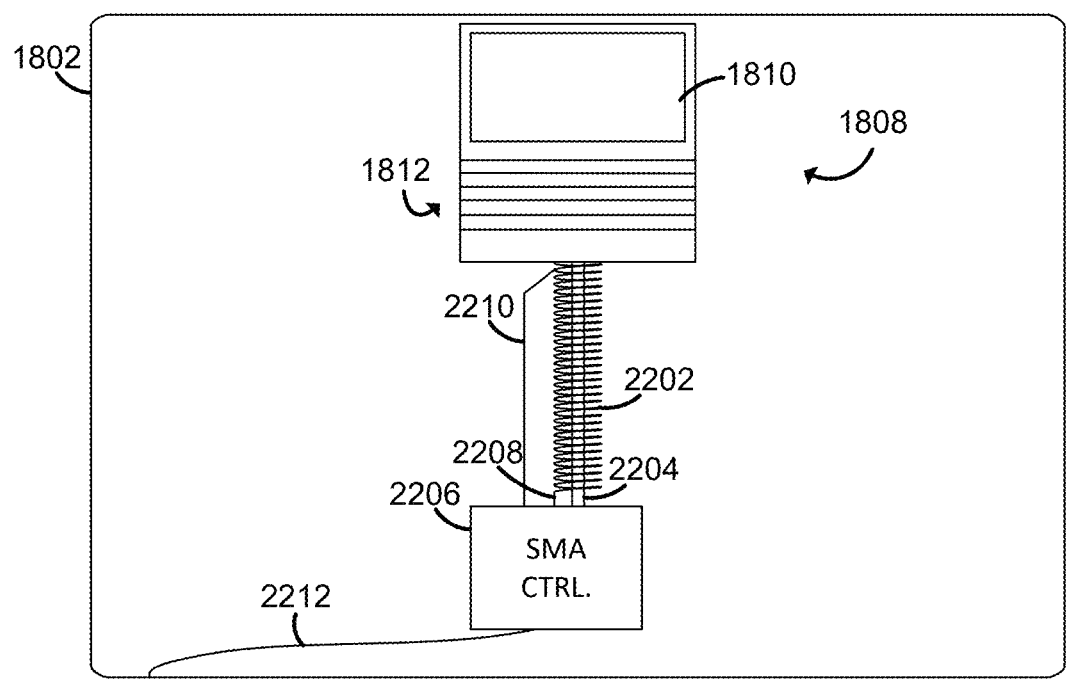
FIG. 22 is a simplified drawing of one embodiment of a shape-memory alloy spring used to actuate the mirror of FIGS. 18 & 19 in a closed configuration.
Figure 23:
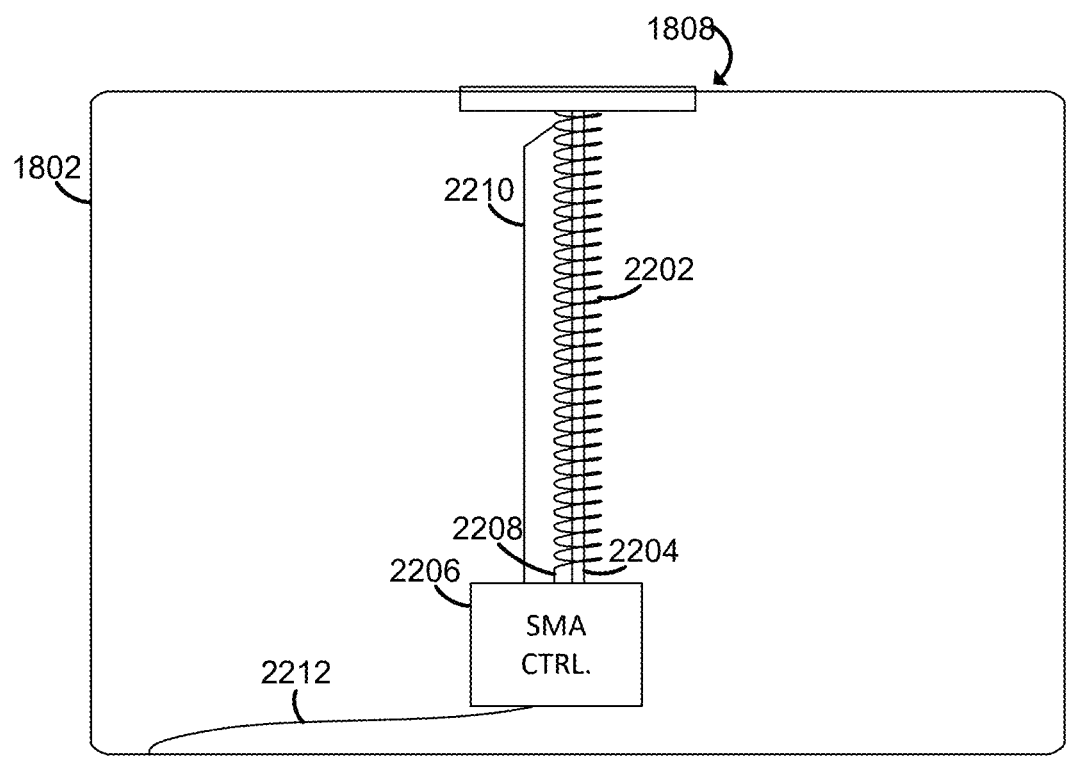
FIG. 23 is a simplified drawing of one embodiment of a shape-memory alloy spring used as an electromechanical actuator to actuate the mirror of FIGS. 18 & 19 in an open configuration.

Referring now to FIGS. 22 & 23, in one embodiment, a shape memory alloy (SMA) spring 2202 in the display portion 1802 acts as an actuator to move the mirror assembly 1808. The SMA spring 2202 is configured to have two different configurations that can be accessed based on the memory effect. In use, at ambient temperature, the SMA spring 2202 is at a first configuration, with the SMA spring 2202 keeping the mirror assembly 1808 in a closed or retracted position, as shown in FIG. 22. The SMA spring 2202 can be heated, such as by passing a current through it. The heated SMA spring 2202 deforms to a new shape based on the memory effect, pushing out the mirror assembly 1808, as shown in FIG. 23. When the SMA spring 2202 is allowed to cool, it returns to the first configuration, retracting the mirror assembly 1808 back into the display portion 1802.

The illustrative SMA spring 2202 is a nickel-titanium alloy, such as 50% nickel and 50% titanium by number of atoms. The percentage of nickel vs. titanium may vary, such as 48-52% nickel by number of atoms. It should be appreciated that varying the ratio of nickel to titanium may adjust the transition temperature between the two configurations. The transition temperature may be any suitable temperature above an expected ambient temperature, such as 40-60° C. In the illustrative embodiment, the transition temperature is 50° C. In the illustrative embodiment, the SMA spring 2202 has a thermally-conductive sheath around it that couples the SMA spring 2202 more strongly to the ambient temperature, which increases the cooling rate of the SMA spring 2202, allowing it to return to the first configuration more quickly when the current applied to the SMA spring 2202 is removed.

In the illustrative embodiment, the mirror assembly 1808 as configured to slide along one or more rods 2204, fixing the lateral movement of the mirror assembly 1808 and SMA spring 2202. Additionally or alternatively, there may be other mechanisms for fixing the lateral movement of the mirror assembly 1808 and SMA spring 2202, such as one or more tracks, a housing, etc.

In the illustrative embodiment, an SMA controller 2206 is positioned inside the display 1802 to control the SMA spring 2202. The illustrative SMA controller 2206 has a first lead 2208 connected to one end of the SMA spring 2202 and a second lead 2210 connected to the other end of the SMA spring 2202. The SMA controller 2206 can supply current across the two leads 2208, 2210, passing current through the SMA spring 2202. The SMA controller 2206 may include one or more voltage or current sources as well as one or more switches or relays to provide the current. In some embodiments, the display portion 1802 may have a position sensor that senses the position of the mirror assembly 1808. The SMA controller 2206 may use an indication from the position sensor as feedback in controlling the current supplied to the SMA spring 2202. The position sensor may be any suitable position sensor, such as an electromechanical position sensor, a laser position sensor, etc. In some embodiments, there may be a mechanical limit to the extension of the mirror assembly 1808, and the SMA spring 2202 may simply push the mirror assembly 1808 up to the mechanical limit without any feedback from a position sensor.

The SMA controller 2206 has one or more connectors 2212 connecting the SMA controller 2206 to other components of the computing device 1800. For example, the connectors 2212 may connect the SMA controller 2206 to a battery or other power source of the computing device. Additionally or alternatively, the SMA controller 2206 may be connected to the sensors 1822 that sense the presence of the whiteboard 1902. In some embodiments, the SMA controller 2206 may be connected to a processor of the computing device 1800, which can control the SMA controller 2206 and/or SMA spring 2202 using software or firmware.

Referring now to FIGS. 24-27, in one embodiment, a mechanical switch assembly 2400 includes a track frame 2402 that defines a track 2404. A rod 2406 is fixed at one end 2410 to the display portion 1802 and has a second end 2408 that is free to move around the track 2404. The track frame 2402 is attached to the mirror assembly 1808 and can move up and down together with the mirror assembly 1808. In the illustrative embodiment, the second end 2408 moves in a clockwise direction around the track 2404 as the track frame 2402 and mirror assembly 1808 move up and down. The direction around the track 2404 may be controlled in any suitable manner, such as a mechanism that prevents movement in the counterclockwise direction or cutouts in the track 2404 (not shown in the figures) that direct the end 2408 of the rod 2406 to move in a certain direction.

Figure 24:
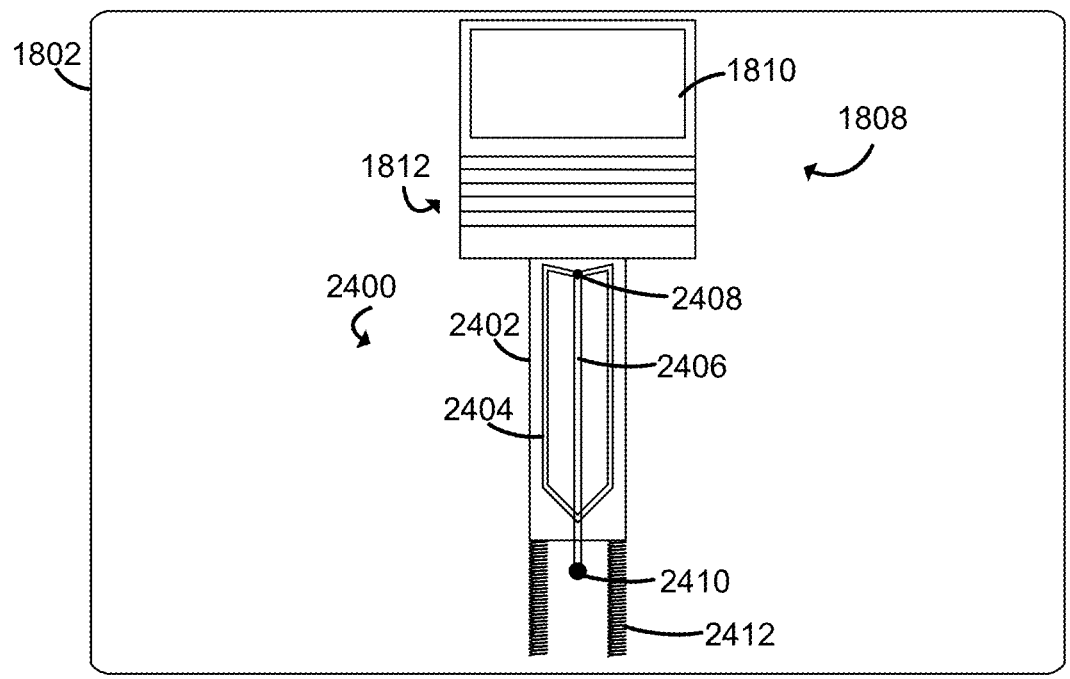
FIG. 24 is a simplified drawing of one embodiment of a mechanical actuator used to actuate the mirror of FIGS. 18 & 19 in a closed configuration.

As shown in FIG. 24, at rest and in a closed configuration, the mirror assembly 1808 is inside the display portion 1802. One or more springs 2412 press against the track frame 2402, applying a force on the track frame 2402 and mirror assembly 1808 to extend outward from the display portion 1802. However, the end 2408 of the rod 2406 in the track 2404 prevents the track frame 2402 from extending, as the end 2408 cannot travel any further downward in the track 2404 without first traveling upward.

Figure 25:
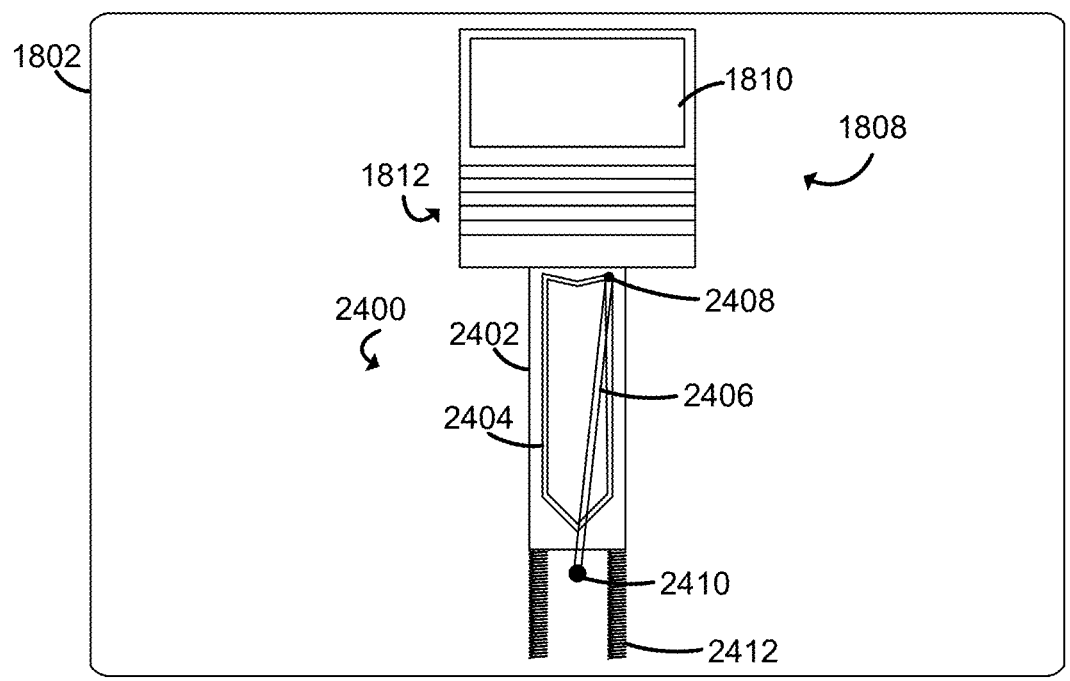
FIG. 25 is a simplified drawing of one embodiment of a mechanical actuator used to actuate the mirror of FIGS. 18 & 19 transitioning from a closed to an open configuration.
Figure 26:
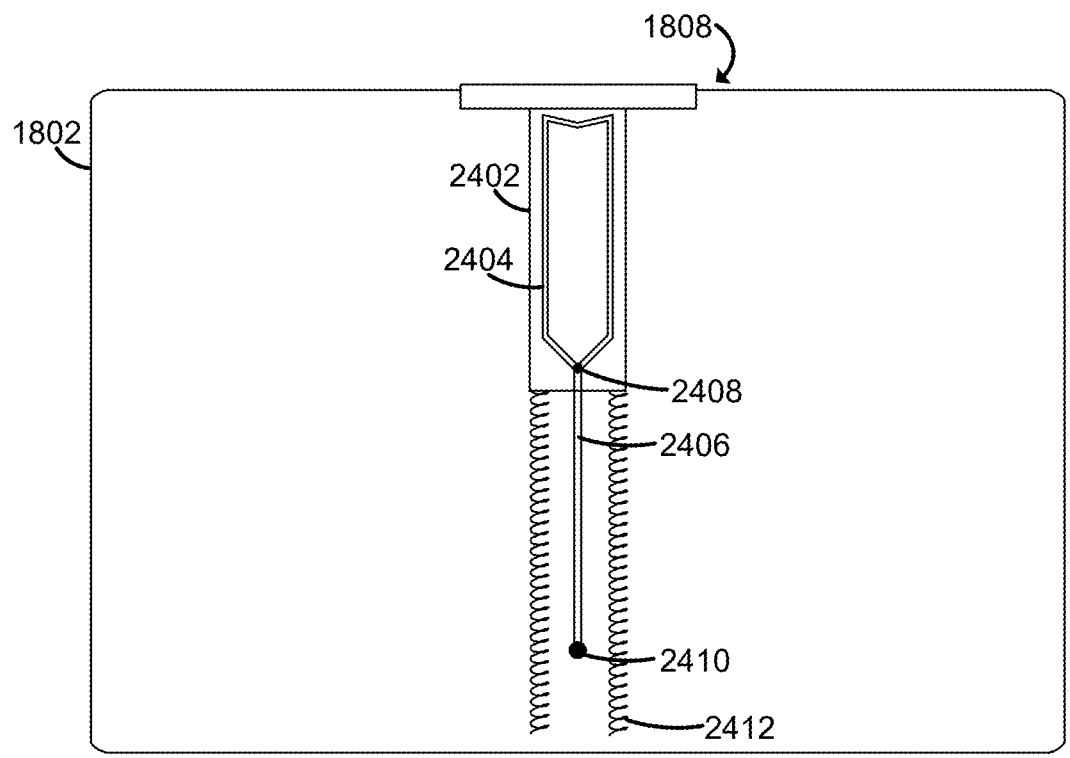
FIG. 26 is a simplified drawing of one embodiment of a mechanical actuator used to actuate the mirror of FIGS. 18 & 19 in an open configuration.
Figure 27:
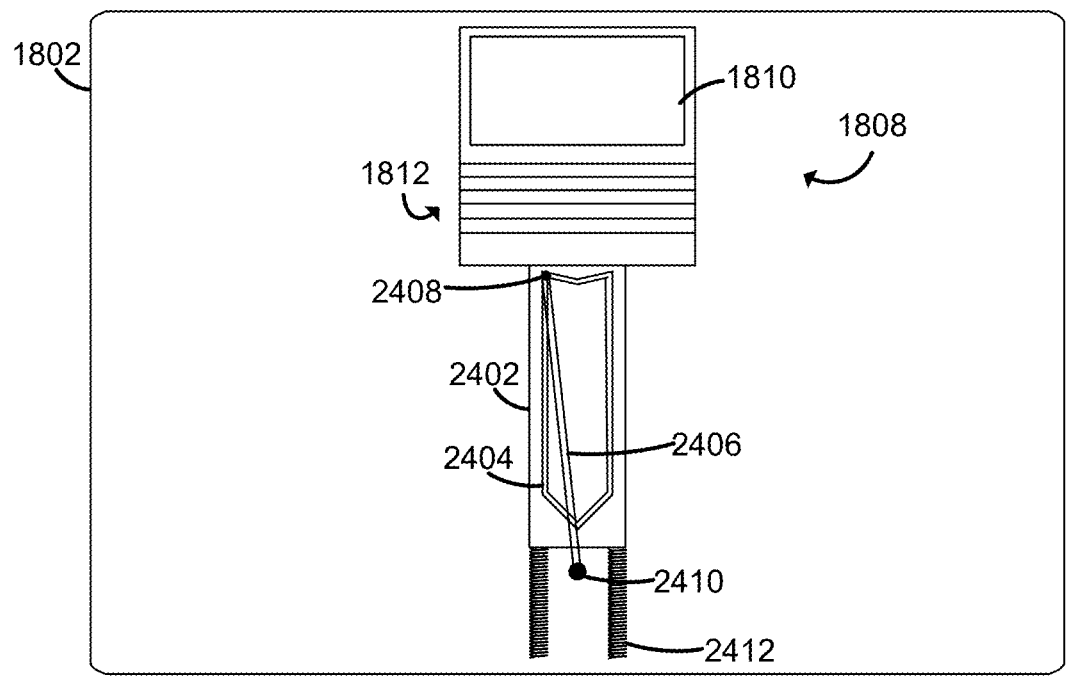
FIG. 27 is a simplified drawing of one embodiment of a mechanical actuator used to actuate the mirror of FIGS. 18 & 19 transitioning from an open to a closed configuration.

In order to move the mirror assembly 1808 into an open configuration, a user presses the mirror assembly 1808 further into the display portion 1802 a small amount. As a result, the second end 2408 of the rod 2406 moves to the right (i.e., clockwise), as shown in FIG. 25. When the user releases the mirror assembly 1808, the springs 2412 push the mirror assembly 1808 out of the display portion 1802, as the second end 2408 of the rod 2406 can now travel along the right side of the track 2404. As the mirror assembly 1808 becomes fully extended, the second end 2408 of the rod 2406 comes to rest at the bottom of the track 2404, as shown in FIG. 26. FIG. 26 shows the mirror assembly 1808 bent towards the base (not shown in FIG. 26), which may occur automatically when the mirror assembly 1808 is extended or may occur upon a user positioning the mirror assembly 1808 into place. In order to close the mirror assembly 1808, a user pushes the mirror assembly 1808 back into the display portion 1802, until the second end 2408 of the rod 2406 reaches the top left corner of the track 2404, as shown in FIG. 27. When the user releases the mirror assembly 1808, the second end 2408 of the rod 2406 slides to the middle of the top of the track 2404, as shown in FIG. 24. It should be appreciated that the track 2404 has two stable positions for the second end 2408 of the rod, at the middle of the top and at the middle of the bottom, providing a stable configuration when the mirror assembly 1808 is in an open configuration and in a closed configuration.

Figure 28:
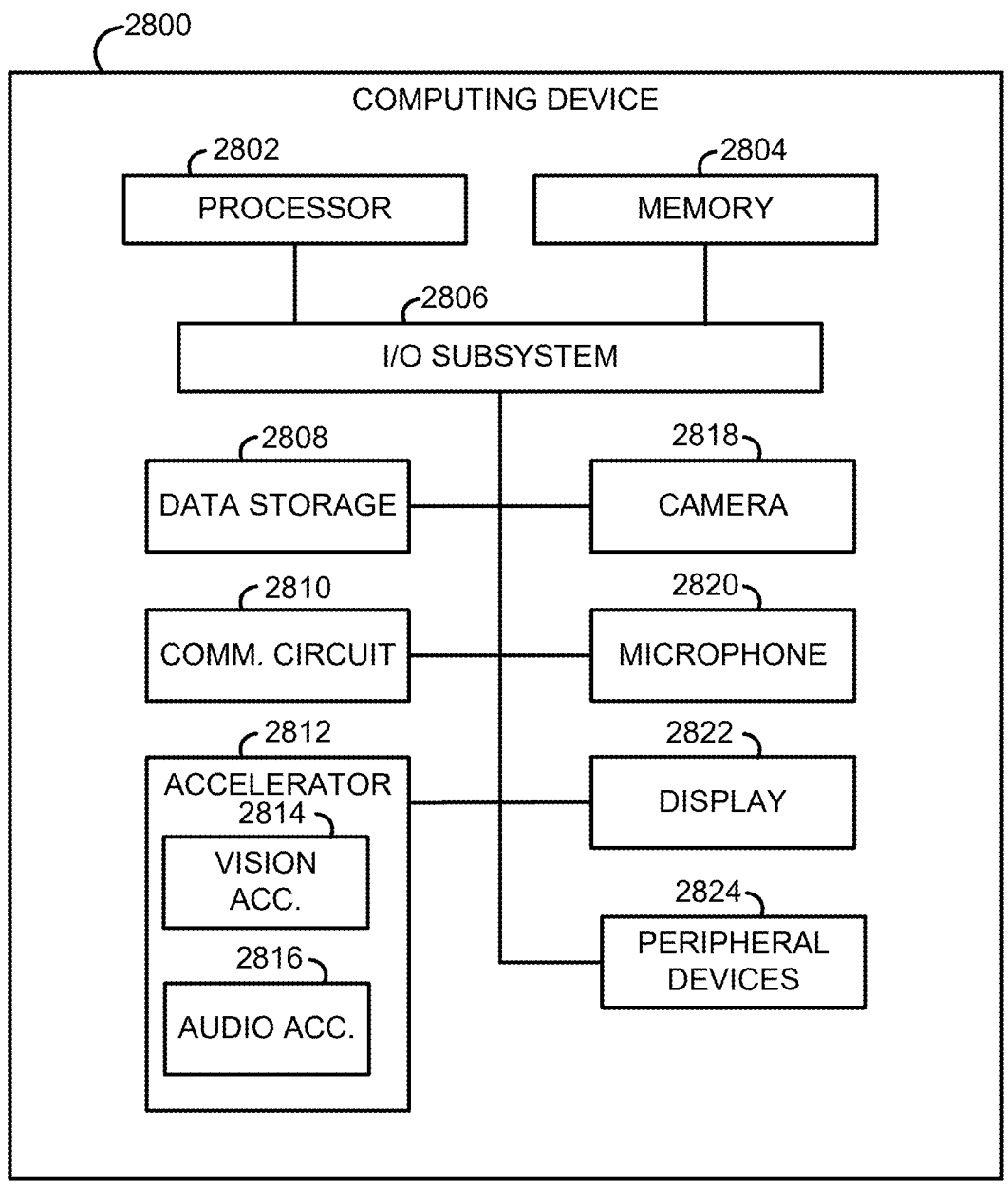
FIG. 28 is a simplified block diagram of at least one embodiment of a computing device for video conferencing.

Referring now to FIG. 28, in one embodiment, a computing device 2800 for video conferencing is shown. In use, the illustrative computing device 2800 captures video and audio of one or more users of the computing device 2800 when the users are in a video conference. The computing device 2800 monitors the video and audio data for intentional and unintentional input that can be used to control the video and audio data sent to the remote computing device on the other end of the video conference. For example, an unintentional input may be a user suddenly standing up from their chair and leaving the room. In response to such an input, the computing device 2800 may automatically stop sending video and audio data to the remote computing device 2800. Other intentional and unintentional inputs are envisioned, as are other responses by the computing device 2800, as discussed in more detail below.

The computing device 2800 may be embodied as any type of computing device. For example, the computing device 2800 may be embodied as or otherwise be included in, without limitation, a server computer, an embedded computing system, a System-on-a-Chip (SoC), a multiprocessor system, a processor-based system, a consumer electronic device, a smartphone, a cellular phone, a desktop computer, a tablet computer, a notebook computer, a laptop computer, a network device, a router, a switch, a networked computer, a wearable computer, a handset, a messaging device, a camera device, and/or any other computing device. In some embodiments, the computing device 2800 may be located in a data center, such as an enterprise data center (e.g., a data center owned and operated by a company and typically located on company premises), managed services data center (e.g., a data center managed by a third party on behalf of a company), a colocated data center (e.g., a data center in which data center infrastructure is provided by the data center host and a company provides and manages their own data center components (servers, etc.)), cloud data center (e.g., a data center operated by a cloud services provider that host companies applications and data), and an edge data center (e.g., a data center, typically having a smaller footprint than other data center types, located close to the geographic area that it serves).

The illustrative computing device 2800 includes a processor 2802, a memory 2804, an input/output (I/O) subsystem 2806, data storage 2808, a communication circuit 2810, one or more accelerators 2812, a camera 2818, a microphone 2820, a display 2822, and one or more peripheral devices 2824. In some embodiments, one or more of the illustrative components of the computing device 2800 may be incorporated in, or otherwise form a portion of, another component. For example, the memory 2804, or portions thereof, may be incorporated in the processor 2802 in some embodiments. In some embodiments, one or more of the illustrative components may be physically separated from another component. In some embodiments, the computing device 2800 may be embodied as a computing device described above, such as computing device 100, 122, 200, 300, or 900. Accordingly, in some embodiments, the computing device 2800 may include a lid controller hub, such as LCH 155, 260, 305 or 954.

The processor 2802 may be embodied as any type of processor capable of performing the functions described herein. For example, the processor 2802 may be embodied as a single or multi-core processor(s), a single or multi-socket processor, a digital signal processor, a graphics processor, a neural network compute engine, an image processor, a microcontroller, or other processor or processing/controlling circuit. Similarly, the memory 2804 may be embodied as any type of volatile or non-volatile memory or data storage capable of performing the functions described herein. In operation, the memory 2804 may store various data and software used during operation of the computing device 2800 such as operating systems, applications, programs, libraries, and drivers. The memory 2804 is communicatively coupled to the processor 2802 via the I/O subsystem 2806, which may be embodied as circuitry and/or components to facilitate input/output operations with the processor 2802, the memory 2804, and other components of the computing device 2800. For example, the I/O subsystem 2806 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. The I/O subsystem 2806 may connect various internal and external components of the computing device 2800 to each other with use of any suitable connector, interconnect, bus, protocol, etc., such as an SoC fabric, PCIe®, USB2, USB3, USB4, NVMe®, Thunderbolt®, and/or the like. In some embodiments, the I/O subsystem 2806 may form a portion of a system-on-a-chip (SoC) and be incorporated, along with the processor 2802, the memory 2804, and other components of the computing device 2800 on a single integrated circuit chip.

The data storage 2808 may be embodied as any type of device or devices configured for the short-term or long-term storage of data. For example, the data storage 2808 may include any one or more memory devices and circuits, memory cards, hard disk drives, solid-state drives, or other data storage devices.

The communication circuit 2810 may be embodied as any type of interface capable of interfacing the computing device 2800 with other computing devices, such as over one or more wired or wireless connections. In some embodiments, the communication circuit 2810 may be capable of interfacing with any appropriate cable type, such as an electrical cable or an optical cable. The communication circuit 2810 may be configured to use any one or more communication technology and associated protocols (e.g., Ethernet, Bluetooth®, Wi-Fi®, WiMAX, near field communication (NFC), etc.). The communication circuit 2810 may be located on silicon separate from the processor 2802, or the communication circuit 2810 may be included in a multi-chip package with the processor 2802, or even on the same die as the processor 2802. The communication circuit 2810 may be embodied as one or more add-in-boards, daughtercards, network interface cards, controller chips, chipsets, specialized components such as a field programmable gate array (FPGA) or application specific integrated circuit (ASIC), or other devices that may be used by the computing device 2802 to connect with another computing device. In some embodiments, communication circuit 2810 may be embodied as part of a system-on-a-chip (SoC) that includes one or more processors, or included on a multichip package that also contains one or more processors. In some embodiments, the communication circuit 2810 may include a local processor (not shown) and/or a local memory (not shown) that are both local to the communication circuit 2810. In such embodiments, the local processor of the communication circuit 2810 may be capable of performing one or more of the functions of the processor 2802 described herein. Additionally or alternatively, in such embodiments, the local memory of the communication circuit 2810 may be integrated into one or more components of the computing device 2802 at the board level, socket level, chip level, and/or other levels.

The accelerator(s) 2812 are configured to perform certain computing tasks, such as video processing or audio processing. The accelerator(s) 2812 may be embodied as one or more processors, data processing unit, graphics processing unit, field programmable gate arrays (FPGAs), application-specific integrated circuits (ASICs), and/or any combination of the above. In the illustrative embodiment, the accelerators 2812 include a vision accelerator 2814 and an audio accelerator 2816. The vision accelerator 2814 is configured to perform real-time vision processing of video data captured by the camera 2818 or received by the communication circuit 2810. The vision accelerator 2814 may perform tasks such as object recognition, motion recognition, gaze estimation, and/or other vision processing tasks. The audio accelerator 2816 is configured to perform real-time audio processing of audio data captured by the microphone 2820. The audio accelerator 2816 may perform tasks such as sound localization, sound identification, noise filtering, and/or the other audio processing tasks. The accelerator(s) 2812 may implement machine-learning-based algorithms, such as a neural network. In the illustrative embodiment, each of the vision accelerator 2814 and/or the audio accelerator 2816 is configured to operate on very low power, such as 5-20 milliwatts each. In other embodiments, the various accelerators 2812 may use more or less power. In embodiments in which the computing device 2800 comprises a lid controller hub, the accelerator(s) can be part of an audio module (e.g., 170, 264, 364) and/or a vision/imaging module (e.g., 172, 263, 363).

The camera 2818 may be similar to the camera 1806, a description of which will not be repeated in the interest of clarity.

The microphone 2820 is configured to sense sound waves and output an electrical signal indicative of the sound waves. In the illustrative embodiment, the computing device 2800 may have more than one microphone 2820, such as an array of microphones 2820 in different positions. Having more than one microphone 2820 may enable the computing device 2800 (e.g., the audio accelerator 2816) to perform sound localization, enabling the computing device 2800 to spatially filter audio sent to a remote computing device during a video conference. For example, if one user of the computing device 2800 is talking to a user on the other end of the video conference and another person is talking in the background, the computing device 2800 may filter out the person talking in the background and only send the voice of the user participating in the video conference.

The display 2822 may be embodied as any type of display on which information may be displayed to a user of the computing device 2800, such as a touchscreen display, a liquid crystal display (LCD), a thin film transistor LCD (TFT-LCD), a light emitting diode (LED) display, an organic light emitting diode (OLED) display, a cathode ray tube (CRT) display, a plasma display, an image projector (e.g., 2D or 3D), a laser projector, a heads-up display, and/or other display technology.

In some embodiments, the computing device 2800 may include other or additional components, such as those commonly found in a computing device. For example, the computing device 2800 may also have peripheral devices 2824, such as a keyboard, a mouse, a speaker, an external storage device, etc. In some embodiments, the computing device 2800 may be connected to a dock that can interface with various devices, including peripheral devices 2824. In some embodiments, the peripheral devices 2824 may include additional sensors that the computing device 2800 can use to monitor the video conference, such as a time-of-flight sensor or a millimeter wave sensor.

Figure 29:
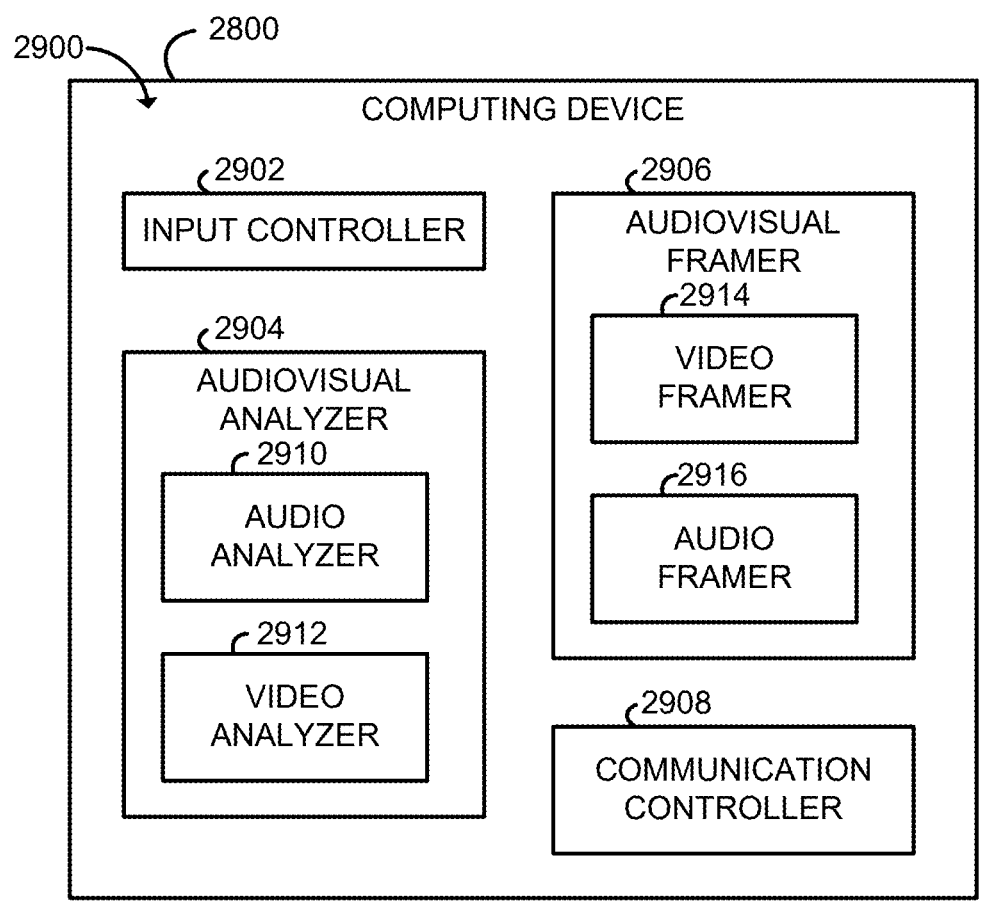
FIG. 29 is a simplified block diagram of at least one embodiment of an environment that may be established by the computing device of FIG. 28.

It should be appreciated that, in some embodiments, computing device 2800 may include some or all of the computing device 1800 described above in regard to FIGS. 18-27. For example, the computing device 2800 may have a mirror assembly that can move from a closed configuration to an open configuration in which a mirror reflects an image from a whiteboard to the camera 2818. Referring now to FIG. 29, in an illustrative embodiment, the computing device 2800 establishes an environment 2900 during operation. The illustrative environment 2900 includes an input controller 2902, an audiovisual analyzer 2904, an audiovisual framer 2906, and a communication controller 2908. The various modules of the environment 2900 may be embodied as hardware, software, firmware, or a combination thereof. For example, the various modules, logic, and other components of the environment 2900 may form a portion of, or otherwise be established by, the processor 2802, the accelerators 2812 (such as the vision accelerator 2814 and/or the audio accelerator 2816), the memory 2804, the data storage 2808, or other hardware components of the computing device 2800. As such, in some embodiments, one or more of the modules of the environment 2900 may be embodied as circuitry or collection of electrical devices (e.g., input controller circuitry 2902, audiovisual analyzer circuitry 2904, audiovisual framer circuitry 2906, etc.). It should be appreciated that, in such embodiments, one or more of the circuits (e.g., the input controller circuitry 2902, the audiovisual analyzer circuitry 2904, the audiovisual framer circuitry 2906, etc.) may form a portion of one or more of the processor 2802, the accelerators 2812, the vision accelerator 2814, the audio accelerator 2816, the memory 2804, the I/O subsystem 2806, the data storage 2808, an LCH (e.g., 155, 260, 305, 954), constituent components of an LCH (e.g., audio module 170, 264, 364, 1730; vision/imaging module 172, 263, 363) and/or other components of the computing device 2800. For example, in some embodiments, some or all of the modules may be embodied as the processor 2802, the vision accelerator 2814, and/or the audio accelerator 2816 as well as the memory 2802 and/or data storage 2808 storing instructions to be executed by the processor 2802, the vision accelerator 2814, and/or the audio accelerator 2816. Additionally, in some embodiments, one or more of the illustrative modules may form a portion of another module and/or one or more of the illustrative modules may be independent of one another. Further, in some embodiments, one or more of the modules of the environment 2900 may be embodied as virtualized hardware components or emulated architecture, which may be established and maintained by the processor 2802 or other components of the computing device 2800. It should be appreciated that some of the functionality of one or more of the modules of the environment 2900 may require a hardware implementation, in which case embodiments of modules which implement such functionality will be embodied at least partially as hardware.

The input controller 2902, which may be embodied as hardware, firmware, software, virtualized hardware, emulated architecture, and/or a combination thereof as discussed above, is configured to control the camera 2818 and microphone 2820. The input controller 2902 can receive video data from the camera 2818 (e.g., as one or more images) and may receive audio data from the microphone 2820. In some embodiments, the input controller 2902 the audio data the input controller 2902 receives may include an audio stream from each of several microphones 2820. In the illustrative embodiment, the input controller 2902 receives video data and audio data of a user of the computing device 2800 during a video conference. The input controller 2902 may receive video data of a user in different environments, such as a work-from-home environment, a public environment (such as a coffee shop), an office environment, etc. In some embodiments, the input controller 2902 may receive video data of multiple users, such as multiple users together in a conference room. Similarly, the input controller 2902 may receive audio data corresponding to each of those environments. The input controller 2902 may receive voice data of one or more users, voice data from one or more persons in a background, background noise, etc.

The input controller 2902 can also enable or disable the camera 2818 and/or the microphone 2820. To do so, the input controller 2902 can configure the camera 2818 and/or the microphone 2820 to be turned off (i.e., not generating any video or audio data, respectively). Additionally or alternatively, the input controller 2902 can discard the video and/or audio data, preventing any other component from accessing the video or audio data. In some embodiments, the input controller 2902 can be implemented as a vision/imaging module that is a part of a lid controller hub, such as vision/imaging module 172, 263, or 363.

The audiovisual analyzer 2904, which may be embodied as hardware, firmware, software, virtualized hardware, emulated architecture, and/or a combination thereof as discussed above, is configured to perform analysis of the video data and/or audio data. The audiovisual analyzer 2904 includes an audio analyzer 2910 to analyze audio data and a video analyzer 2912 to analyze video data.

The video analyzer 2912 may perform various kinds of analysis on video data. For example, the video analyzer 2912 may perform object detection on video data. The video analyzer 2912 may recognize one or more persons in the video data, including persons in the background that are not participating in the video conference. The video analyzer 2912 may recognize other objects in the video, such as objects that a user is interacting with. In some embodiments, audiovisual analyzer 2904 and/or the video analyzer 2912 can be implemented as a part of a vision/imaging module (e.g., 172, 263, 363) or an audio module (170, 264, 364) of a lid controller hub (e.g., 155, 260, 305, 954).

The audio analyzer 2910 may perform various kinds of analysis on audio data. For example, the audio analyzer 2912 may perform sound localization on the audio data to localize sounds in particular directions. The audio analyzer 2912 may associate localized sounds with parts of the video data, such as associating a sound of a user's voice with the video of that user. In some embodiments, audio analyzer 2912 may analyze the different localized sounds separately to determine, e.g., who is speaking, what audio or video may be a region of interest, what should be transmitted to a remote user of the video conference, etc.

The audiovisual analyzer 2904 may analyze one or more users that are present in the video and/or audio data. For example, the audiovisual analyzer 2904 analyzes a user's mannerisms. The user's mannerisms may indicate, e.g., what the user is paying attention to, whether the user appears engaged with the video conference, what the user is doing (such as eating or drinking), whether the user is standing up or walking way, whether the user is reacting to events in the same area as the user (i.e., events other than those occurring as part of the video conference), etc. The audiovisual analyzer 2904 may analyze a user's gaze. The user may be looking at a display 2822 of the computing device 2800, at the camera 2818, at another person participating in the video conference, another person not participating in the video conference, at a whiteboard that the user or another participant in the video conference is drawing on, at a distracting event that is occurring, etc. The audiovisual analyzer 2904 analyzes a user for unintentional input. Unintentional input may be any input that the audiovisual analyzer 2904 determines can be used as an input to control the audio or video data sent to a remote user. For example, unintentional input may be the user suddenly getting up from the computer in response to an external event, such as a loud noise in the user's environment. It should be appreciated that unintentional input may be determined based on some of the other analysis performed on the user, environment, etc., such as a user's mannerisms, a user's gaze, speech recognition, etc.

The audiovisual analyzer 2904 may use any suitable algorithm or approach for analyzing video data and audio data. In the illustrative embodiment, the audiovisual analyzer 2904 may use machine-learning-based algorithms, object recognition, rules, etc., and/or any combination of the above, to perform any suitable function described herein, such as determining a user's gaze, determining a user's movements, determining a user's speech, etc.

The audiovisual analyzer 2904 may analyze both audio data and video data together. For example, the audiovisual analyzer 2904 may both perform sound localization and monitor lip movement in order to determine who is speaking. The audiovisual analyzer 2904 may monitor lip movement using any suitable algorithm, such as a machine-learning-based algorithm. In some embodiments, the audiovisual analyzer 2904 may use information from sensors besides the camera 2818 and microphone 2820, such as a time of flight sensor, a millimeter wave sensor, etc. Such sensors may be used to monitor the position of users and objects in the environment.

In some embodiments, the audiovisual analyzer 2904 performs speech recognition of the audio data. The audiovisual analyzer 2904 may determines words the user is speaking, a tone of voice, a volume of speech, etc. In some embodiments, the audiovisual analyzer 2904 may monitor lip movements of the users as part of speech recognition or to identify a user that is speaking. In some embodiments, a user may instruct the computing device 2800 to modify the audio or video being transmitted using a voice command, such as by instructing the computing device 2800 to turn on or off a camera 2818 or to mute or unmute a microphone 2820.

Additionally or alternatively, in some embodiments, the audiovisual analyzer 2904 may perform gesture recognition on video data. For example, the user may make a gesture of holding up their hand, palm facing the camera 2818, to instruct the computing device 2800 to turn off the camera 2818.

In some embodiments, the audiovisual analyzer 2904 analyzes an environment of the user. The audiovisual analyzer 2904 may analyze objects in the environment, such as objects that are moving in the background of the user. The audiovisual analyzer 2904 may analyze people that are in the environment of the user, such a person that has entered the background of the video of the user.

The audiovisual analyzer 2904 determines one or more candidate regions of interest. For example, a candidate region of interest may be the face of a user that is speaking, the face of a user that is looking at the camera 2818, an object that a user is interacting with, a person in the room that a user is speaking to, etc. The audiovisual analyzer 2904 may use the analysis performed on the video data and/or audio data to determine the candidate regions of interest. After generating candidate regions of interest, the audiovisual analyzer 2904 may select one of the candidate regions of interest. For example, the audiovisual analyzer 2904 may rank each candidate region of interest based on, e.g., weighting factors, rules, machine-learning-based algorithms, etc. and select the candidate region of interest with the highest ranking.

The audiovisual framer 2906, which may be embodied as hardware, firmware, software, virtualized hardware, emulated architecture, and/or a combination thereof as discussed above, is configured to determine which portion of the video data and/or audio data to transmit based on the analysis performed on the video data and/or audio data. The audiovisual framer 2906 includes a video framer 2914 and an audio framer 2916.

The video framer 2914 may determine one or more regions of the video scene to frame. In a multi-user environment, the audiovisual framer 2906 may, e.g., frame one user that is speaking while cropping or otherwise not showing users that are not speaking. The video framer 2914 may monitor a gaze of one user and frame the video to be on what the user is looking at, which may be another person, an object in the environment, etc. The video framer 2914 may frame the video data to crop out a person that is eating or drinking in a multi-user environment or may turn off the camera of a person that is eating or drinking in a single-user environment. The video framer 2914 may identify and crop out a person that is having a side-conversation, framing instead a person that is paying attention or speaking to remote participants in the video conference.

If there is a distraction or other even in the background, such as a person walking behind a user or a person entering a room, the audiovisual framer 2906 may frame the user more tightly in order to crop out the distraction behind the user. In some embodiments, the audiovisual framer 2906 may determine whether video should be transmitted at all. For example, if the audiovisual analyzer 2904 determines that a user suddenly gets up from their computer, the audiovisual framer 2906 may determine that no video should be transmitted. The audiovisual framer 2906 may determine that video data should not be sent and/or may turn off the camera 2818. In some embodiments, the audiovisual framer 2906 may turn off the video if the user is already muted and then appears distracted, such as by suddenly getting up out of their chair.

The audio framer 2916 determines which portions of audio to transmit. The audio framer 2916 determines one or more localized sound sources to transmit. For example, if one localized sound source is a person that is facing the camera 2818 talking and another localized sound source is a person that is not facing the camera 2818 talking in the background, the audio framer 2916 may select the sound source of the person that is facing the camera 2818 for transmission and not include the sound of the person talking in the background in the transmission. The audio framer 2916 may determine whether audio should be transmitted at all. For example, if the user turns away from the camera 2818 and speaks to a person in the background, the audio framer 2916 may determine that no sound should be sent to the remote participant in the video conference. The audio framer 2916 may turn off the microphone 2820 entirely or may simply selectively mute the user while the user is not facing the camera 2818. In some embodiments, the audio framer 2916 may use sound localization to focus the sound direction based on what the video framer 2914 frames.

The communication controller 2908, which may be embodied as hardware, firmware, software, virtualized hardware, emulated architecture, and/or a combination thereof as discussed above, is configured to send and receive data. In some embodiments, the computing device 2800 may be remote from the user, and the communication controller 2908 may receive video data and/or audio data from a remote computing device that is physically present with the user. For example, the computing device 2800 may be in a data center, and the user's computing device may send video data and/or audio data to the computing device 2800 for processing before video data and/or audio data is sent to another participant in the video conference.

Additionally or alternatively, the communication controller 2908 transmits the selected video data and/or audio data to a remote computing device to a remote participant in the video conference. It should be appreciated that, in embodiments in which the computing device 2800 determines that no video and no audio should be transmitted, the communication controller 2908 may not send any video or audio data to the remote computing device.

Figure 30:
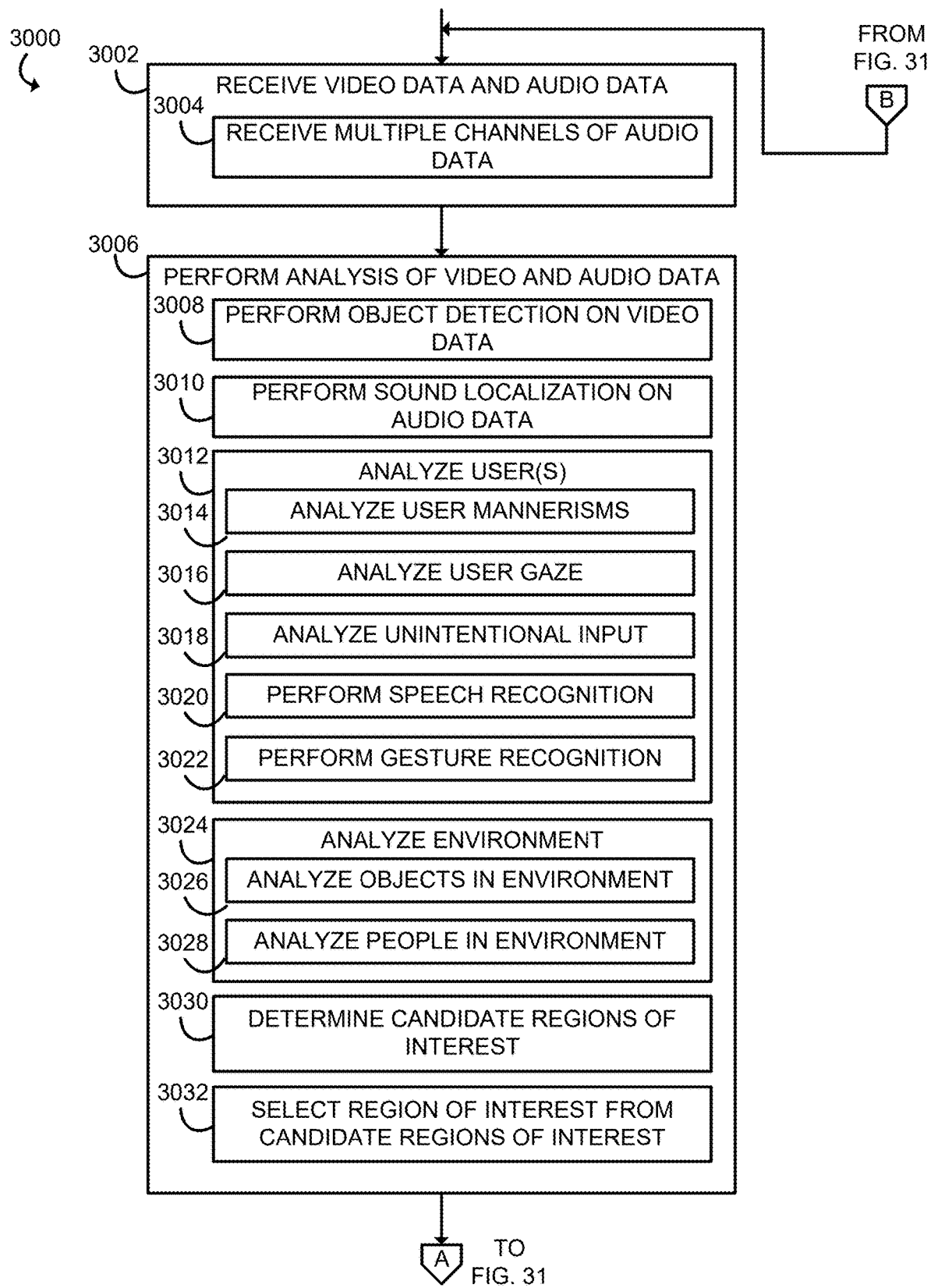
FIGS. 30-31 are a simplified flow diagram of at least one embodiment of a method for video conferencing that may be executed by the computing device of FIG. 28.
Figure 31:
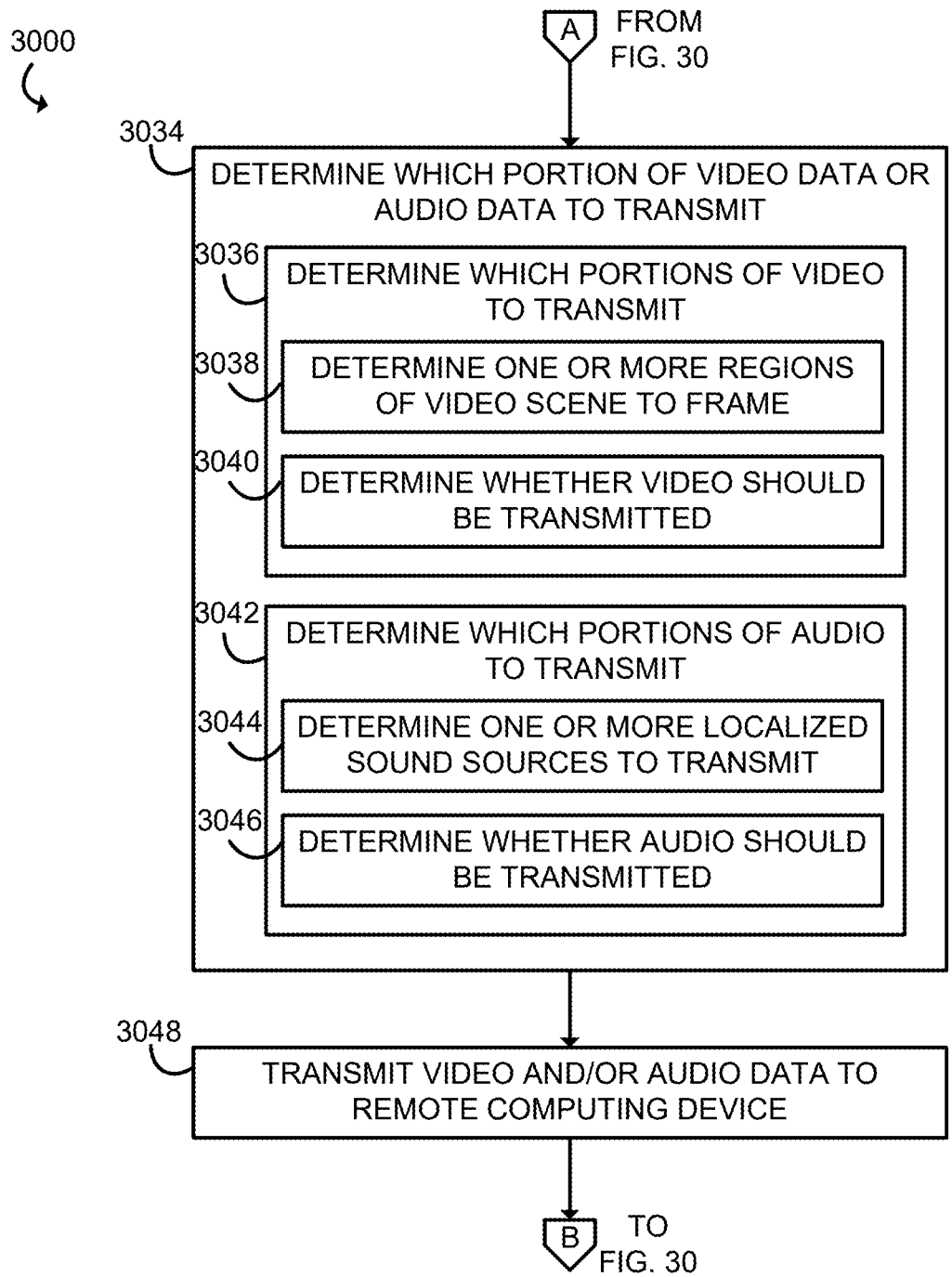

Referring now to FIG. 30, in use, the computing device 2800 may execute a method 3000 for processing video and audio during a video conference. The method 3000 begins in block 3002, in which the computing device 2800 receives video data and/or audio data during a video conference. In some embodiments, in block 3004, the computing device 2800 receives multiple channels of audio data, such as audio data from two different microphones 2820. In the illustrative embodiment, the computing device 2800 is physically present with the user, and the computing device 2800 receives video data and/or audio data from the camera 2818 and/or the microphone 2820. In other embodiments, the computing device 2800 may be remote from the user, and the computing device 2800 may receive video data and/or audio data from a remote computing device that is physically present with the user. For example, the computing device 2800 may be in a data center, and the user's computing device may send video data and/or audio data to the computing device 2800 for processing before video data and/or audio data is sent to another participant in the video conference.

In block 3006, the computing device 2800 performs analysis of the video data and/or audio data. The computing device 2800 may perform object detection on video data in block 3008. For example, the computing device 2800 may recognize one or more persons in the video data, including persons in the background that are not participating in the video conference. The computing device 2800 may recognize other objects in the video, such as objects that a user is interacting with. In block 3010, the computing device 2800 may perform sound localization on the audio data to localize sounds in particular directions. The computing device 2800 may associate localized sounds with parts of the video data, such as associating a sound of a user's voice with the video of that user. In some embodiments, the computing device 2800 may analyze the different localized sounds separately to determine, e.g., who is speaking, what audio or video may be a region of interest, what should be transmitted to a remote user of the video conference, etc.

In block 3012, the computing device 2800 analyzes one or more users that are present in the video and/or audio data. The computing device 2800 analyzes a user's mannerisms in block 3014. The user's mannerisms may indicate, e.g., what the user is paying attention to, whether the user appears engaged with the video conference, what the user is doing (such as eating or drinking), whether the user is standing up or walking way, whether the user is reacting to events in the same area as the user (i.e., events other than those occurring as part of the video conference), etc. The computing device 2800 analyzes a user's gaze in block 3016. The user may be looking at a display 2822 of the computing device 2800, another person participating in the video conference, another person not participating in the video conference, at a distracting event that is occurring, etc. The computing device 2800 analyzes a user for unintentional input in block 3018. Unintentional input may be any input that the computing device 2800 determines can be used as an input to control the audio or video data sent to a remote user. For example, unintentional input may be the user suddenly getting up from the computer in response to an external event, such as a loud noise in the user's environment. It should be appreciated that unintentional input may be determined based on some of the other analysis performed on the user, environment, etc., such as a user's mannerisms, a user's gaze, speech recognition, etc.

In block 3020, the computing device 2800 performs speech recognition of the audio data. The computing device 2800 may determines words the user is speaking, a tone of voice, a volume of speech, etc. In some embodiments, the computing device 2800 may monitor lip movements of the users as part of speech recognition or to identify a user that is speaking. In some embodiments, a user may instruct the computing device 2800 to modify the audio or video being transmitted using a voice command, such as by instructing the computing device 2800 to turn on or off a camera 2818 or to mute or unmute a microphone 2820.

In block 3022, the computing device 2800 may perform gesture recognition on video data. For example, the user may make a gesture of holding up their hand, palm facing the camera 2818, to instruct the computing device 2800 to turn off the camera 2818.

In block 3024, the computing device 2800 analyzes an environment of the user. The computing device 2800 may analyze objects in the environment, such as objects that are moving in the background of the user, in block 3026. The computing device 2800 may analyze people that are in the environment of the user, such a person that has entered the background of the video of the user, in block 3028.

In block 3030, the computing device 2800 determines one or more candidate regions of interest. For example, a candidate region of interest may be the face of a user that is speaking, the face of a user that is looking at the camera 2818, an object that a user is interacting with, a person in the room that a user is speaking to, etc. The computing device

2800 may use the analysis performed on the video data and/or audio data to determine the candidate regions of interest. In block 3032, the computing device 2800 may select a region of interest from the candidate regions of interest. In some embodiments, the computing device 2800 may use information from sensors besides the camera 2818 and microphone 2820, such as a time of flight sensor, a millimeter wave sensor, etc. Such sensors may be used to monitor the position of users and objects in the environment.

Referring now to FIG. 14, in block 3034, the computing device 2800 determines which portion of the video data and/or audio data to transmit based on the analysis performed on the video data and/or audio data. In block 3036, the computing device 2800 determines which portions of video should be transmitted. For example, the computing device 2800 may determine one or more regions of the video scene to frame and then transmit to the receiving computing device in block 3038. In a multi-user environment, the computing device 2800 may, e.g., frame one user that is speaking while cropping or otherwise not showing users that are not speaking. If there is a distraction or other even in the background, such as a person walking behind a user, the computing device 2800 may frame the user more tightly in order to crop out the distraction behind the user. In some embodiments, in block 3040, the computing device 2800 may determine whether video should be transmitted at all. For example, if a user suddenly gets up from their computer, the computing device 2800 may determine that no video should be transmitted. The computing device 2800 may determine that video data should not be sent and/or may turn off the camera 2818.

In block 3042, the computing device 2800 determines which portions of audio to transmit. In block 3044, the computing device 1100 determines one or more localized sound sources to transmit. For example, if one localized sound source is a person that is facing the camera 2818 talking and another localized sound source is a person that is not facing the camera 2818 talking in the background, the computing device 2800 may select the sound source of the person that is facing the camera 2818 for transmission and not include the sound of the person talking in the background in the transmission. In block 3046, the computing device 2800 may determine whether audio should be transmitted at all. For example, if the user turns away from the camera 2818 and speaks to a person in the background, the computing device 2800 may determine that no sound should be sent to the remote participant in the video conference. The computing device 2800 may turn off the microphone 2820 entirely or may simply selectively mute the user while the user is not facing the camera 2818.

In block 3048, the computing device 2800 transmits the selected video data and/or audio data to a remote computing device to a remote participant in the video conference. It should be appreciated that, in embodiments in which the computing device 2800 determines that no video and no audio should be transmitted, the computing device 2800 may not send any video or audio data to the remote computing device. The method 3000 loops back to block 3002 in FIG. 30 to continue receiving video data and/or audio data.

Examples

Illustrative examples of the technologies disclosed herein are provided below. An embodiment of the technologies may include any one or more, and any combination of, the examples described below.

Example 1 includes a computing device comprising input controller circuitry to receive video data of a user in a video conference; receive audio data of the user in the video conference; audiovisual analyzer circuitry to perform an analysis of the video data and the audio data; and audiovisual framer circuitry to determine which portion of the video data or the audio data to transmit based on the analysis of the video data and the audio data.

Example 2 includes the subject matter of Example 1, and wherein to perform an analysis of the video data and the audio data comprises to monitor mannerisms of the user in the video conference, wherein to determine which portion of the video data or the audio data to transmit comprises to determine which portion of the video data or the audio data to transmit based on the mannerisms of the user in the video conference.

Example 3 includes the subject matter of any of Examples 1 and 2, and wherein to perform an analysis of the video data and the audio data comprises to determine that the user is eating, wherein to determine which portion of the video data or the audio data to transmit comprises to determine which portion of the video data or the audio data to transmit based on the determination that the user is eating.

Example 4 includes the subject matter of any of Examples 1-3, and wherein to perform an analysis of the video data and the audio data comprises to determine that a first user in the video data is speaking and that a second user in the video data is not speaking, wherein to determine which portion of the video data or the audio data to transmit comprises to determine that a portion of the video data with the first user that is speaking is to be transmitted.

Example 5 includes the subject matter of any of Examples 1-4, and wherein to perform the analysis of the video data and the audio data comprises to perform sound localization on the audio data to generate a localized sound corresponding to the first user that is speaking, wherein to determine which portion of the video data or the audio data to transmit comprises to determine that the localized sound corresponding to the first user that is speaking is to be transmitted.

Example 6 includes the subject matter of any of Examples 1-5, and wherein to perform an analysis of the video data and the audio data comprises to determine that the user has stood up, wherein to determine which portion of the video data or the audio data to transmit comprises to determine that no video is to be transmitted based on the determination that the user has stood up.

Example 7 includes the subject matter of any of Examples 1-6, and wherein to perform an analysis of the video data and the audio data comprises to determine that a person has entered the environment behind the user, wherein to determine which portion of the video data or the audio data to transmit comprises to determine that video showing the person that entered the environment behind the user should not be transmitted.

Example 8 includes the subject matter of any of Examples 1-7, and wherein to perform an analysis of the video data and the audio data comprises to determine a gaze of the user, wherein to determine which portion of the video data or the audio data to transmit comprises to determine which portion of the video data or the audio data to transmit based on a gaze of the user.

Example 9 includes a method comprising receiving, by a computing device, video data of a user in a video conference; receiving, by the computing device, audio data of the user in the video conference; performing, by the computing device, an analysis of the video data and the audio data; and determining, by the computing device, which portion of the video data or the audio data to transmit based on the analysis of the video data and the audio data.

Example 10 includes the subject matter of Example 9, and wherein performing an analysis of the video data and the audio data comprises monitoring mannerisms of the user in the video conference, wherein determining which portion of the video data or the audio data to transmit comprises determining which portion of the video data or the audio data to transmit based on the mannerisms of the user in the video conference.

Example 11 includes the subject matter of any of Examples 9 and 10, and wherein performing an analysis of the video data and the audio data comprises determining that the user is eating, wherein determining which portion of the video data or the audio data to transmit comprises determining which portion of the video data or the audio data to transmit based on the determination that the user is eating.

Example 12 includes the subject matter of any of Examples 9-11, and wherein performing an analysis of the video data and the audio data comprises determining that a first user in the video data is speaking and that a second user in the video data is not speaking, wherein determining which portion of the video data or the audio data to transmit comprises determining that a portion of the video data with the first user that is speaking is to be transmitted.

Example 13 includes the subject matter of any of Examples 9-12, and wherein performing the analysis of the video data and the audio data comprises performing sound localization on the audio data to generate a localized sound corresponding to the first user that is speaking, wherein determining which portion of the video data or the audio data to transmit comprises determining that the localized sound corresponding to the first user that is speaking is to be transmitted.

Example 14 includes the subject matter of any of Examples 9-13, and wherein performing an analysis of the video data and the audio data comprises determining that the user has stood up, wherein determining which portion of the video data or the audio data to transmit comprises determining that no video is to be transmitted based on the determination that the user has stood up.

Example 15 includes the subject matter of any of Examples 9-14, and wherein performing an analysis of the video data and the audio data comprises determining that a person has entered the environment behind the user, wherein determining which portion of the video data or the audio data to transmit comprises determining that video showing the person that entered the environment behind the user should not be transmitted.

Example 16 includes the subject matter of any of Examples 9-15, and wherein performing an analysis of the video data and the audio data comprises determining a gaze of the user, wherein determining which portion of the video data or the audio data to transmit comprises determining which portion of the video data or the audio data to transmit based on a gaze of the user.

Example 17 includes a computing device comprising means for receiving video data of a user in a video conference; means for receiving audio data of the user in the video conference; means for performing an analysis of the video data and the audio data; and means for determining which portion of the video data or the audio data to transmit based on the analysis of the video data and the audio data.

Example 18 includes the subject matter of Example 17, and wherein the means for performing an analysis of the video data and the audio data comprises means for monitoring mannerisms of the user in the video conference, wherein the means for determining which portion of the video data or the audio data to transmit comprises means for determining which portion of the video data or the audio data to transmit based on the mannerisms of the user in the video conference.

Example 19 includes the subject matter of any of Examples 17 and 18, and wherein the means for performing an analysis of the video data and the audio data comprises means for determining that the user is eating, wherein the means for determining which portion of the video data or the audio data to transmit comprises means for determining which portion of the video data or the audio data to transmit based on the determination that the user is eating.

Example 20 includes the subject matter of any of Examples 17-19, and wherein the means for performing an analysis of the video data and the audio data comprises means for determining that a first user in the video data is speaking and that a second user in the video data is not speaking, wherein the means for determining which portion of the video data or the audio data to transmit comprises means for determining that a portion of the video data with the first user that is speaking is to be transmitted.

Example 21 includes the subject matter of any of Examples 17-20, and wherein the means for performing the analysis of the video data and the audio data comprises means for performing sound localization on the audio data to generate a localized sound corresponding to the first user that is speaking, wherein the means for determining which portion of the video data or the audio data to transmit comprises means for determining that the localized sound corresponding to the first user that is speaking is to be transmitted.

Example 22 includes the subject matter of any of Examples 17-21, and wherein the means for performing an analysis of the video data and the audio data comprises means for determining that the user has stood up, wherein the means for determining which portion of the video data or the audio data to transmit comprises means for determining that no video is to be transmitted based on the determination that the user has stood up.

Example 23 includes the subject matter of any of Examples 17-22, and wherein the means for performing an analysis of the video data and the audio data comprises means for determining that a person has entered the environment behind the user, wherein the means for determining which portion of the video data or the audio data to transmit comprises means for determining that video showing the person that entered the environment behind the user should not be transmitted.

Example 24 includes the subject matter of any of Examples 17-23, and wherein the means for performing an analysis of the video data and the audio data comprises means for determining a gaze of the user, wherein the means for determining which portion of the video data or the audio data to transmit comprises means for determining which portion of the video data or the audio data to transmit based on a gaze of the user.

Example 25 includes one or more computer-readable media comprising a plurality of instructions stored thereon that, when executed, causes a computing device to receive video data of a user in a video conference; receive audio data of the user in the video conference; perform an analysis of the video data and the audio data; and determine which portion of the video data or the audio data to transmit based on the analysis of the video data and the audio data.

Example 26 includes the subject matter of Example 25, and wherein to perform an analysis of the video data and the audio data comprises to monitor mannerisms of the user in the video conference, wherein to determine which portion of the video data or the audio data to transmit comprises to determine which portion of the video data or the audio data to transmit based on the mannerisms of the user in the video conference.

Example 27 includes the subject matter of any of Examples 25 and 26, and wherein to perform an analysis of the video data and the audio data comprises to determine that the user is eating, wherein to determine which portion of the video data or the audio data to transmit comprises to determine which portion of the video data or the audio data to transmit based on the determination that the user is eating.

Example 28 includes the subject matter of any of Examples 25-27, and wherein to perform an analysis of the video data and the audio data comprises to determine that a first user in the video data is speaking and that a second user in the video data is not speaking, wherein to determine which portion of the video data or the audio data to transmit comprises to determine that a portion of the video data with the first user that is speaking is to be transmitted.

Example 29 includes the subject matter of any of Examples 25-28, and wherein to perform the analysis of the video data and the audio data comprises to perform sound localization on the audio data to generate a localized sound corresponding to the first user that is speaking, wherein to determine which portion of the video data or the audio data to transmit comprises to determine that the localized sound corresponding to the first user that is speaking is to be transmitted.

Example 30 includes the subject matter of any of Examples 25-29, and wherein to perform an analysis of the video data and the audio data comprises to determine that the user has stood up, wherein to determine which portion of the video data or the audio data to transmit comprises to determine that no video is to be transmitted based on the determination that the user has stood up.

Example 31 includes the subject matter of any of Examples 25-30, and wherein to perform an analysis of the video data and the audio data comprises to determine that a person has entered the environment behind the user, wherein to determine which portion of the video data or the audio data to transmit comprises to determine that video showing the person that entered the environment behind the user should not be transmitted.

Example 32 includes the subject matter of any of Examples 25-31, and wherein to perform an analysis of the video data and the audio data comprises to determine a gaze of the user, wherein to determine which portion of the video data or the audio data to transmit comprises to determine which portion of the video data or the audio data to transmit based on a gaze of the user.

Example 33 includes a computing device comprising a base portion comprising a keyboard; a display portion comprising a display and a camera, the display portion attached to the base portion; and a mirror assembly comprising a mirror, the mirror assembly having an open configuration and a closed configuration, wherein the mirror assembly is positioned inside the display portion in the closed configuration and at least part of the mirror assembly is positioned outside the display portion in the open configuration, wherein the mirror is positionable in a field of view of the camera to change a direction of the field of view of the camera when the mirror assembly is in the open configuration.

Example 34 includes the subject matter of Example 33, and further including an actuator to move the mirror assembly between the closed configuration and the open configuration.

Example 35 includes the subject matter of any of Examples 33 and 34, and wherein the actuator is a shape memory alloy spring.

Example 36 includes the subject matter of any of Examples 33-35, and wherein the computing device is configured to sense a drawing board placed on top of the base portion, wherein the computing device is configured to pass current through the shape memory alloy spring to activate the actuator when the drawing board is sensed on top of the base portion.

Example 37 includes the subject matter of any of Examples 33-36, and wherein the actuator is configured to move the mirror assembly between the closed configuration and the open configuration when a user presses on the mirror assembly.

Example 38 includes the subject matter of any of Examples 33-37, and wherein the mirror assembly comprises a living hinge.

Example 39 includes the subject matter of any of Examples 33-38, and wherein the mirror assembly comprises a layer of polypropylene that forms at least part of the living hinge.

Example 40 includes the subject matter of any of Examples 33-39, and further including one or more protrusions positioned at one edge of the display portion, wherein the one or more protrusions are configured to hold the mirror assembly in place when the mirror assembly is in the open position.

Example 41 includes the subject matter of any of Examples 33-40, and further including a drawing board, wherein the drawing board includes one or more magnets, further comprising a sensor to sense the one or more magnets in the drawing board when the drawing board is placed on top of the base portion.

Example 42 includes a computing device comprising a base portion comprising a keyboard; a display portion comprising a display and a camera, the display portion attached to the base portion; and a mirror assembly comprising a mirror, the mirror assembly having an open configuration and a closed configuration, means for positioning the mirror assembly in a closed configuration inside the display portion and in an open configuration in which the mirror is positionable in a field of view of the camera.

Example 43 includes the subject matter of Example 42, and wherein the means for positioning the mirror assembly comprises an actuator to move the mirror assembly between the closed configuration and the open configuration.

Example 44 includes the subject matter of any of Examples 42 and 43, and wherein the actuator is a shape memory alloy spring.

Example 45 includes the subject matter of any of Examples 42-44, and wherein the computing device is configured to sense a drawing board placed on top of the base portion, wherein the computing device is configured to pass current through the shape memory alloy spring to activate the actuator when the drawing board is sensed on top of the base portion.

Example 46 includes the subject matter of any of Examples 42-45, and wherein the actuator is configured to move the mirror assembly between the closed configuration and the open configuration when a user presses on the mirror assembly.

Example 47 includes the subject matter of any of Examples 42-46, and wherein the means for positioning the mirror assembly comprises a living hinge.

Example 48 includes the subject matter of any of Examples 42-47, and wherein the mirror assembly comprises a layer of polypropylene that forms at least part of the living hinge.

Example 49 includes the subject matter of any of Examples 42-48, and further including one or more protrusions positioned at one edge of the display portion, wherein the one or more protrusions are configured to hold the mirror assembly in place when the mirror assembly is in the open position.

Example 50 includes the subject matter of any of Examples 42-49, and further including a drawing board, wherein the drawing board includes one or more magnets, further comprising a sensor to sense the one or more magnets in the drawing board when the drawing board is placed on top of the base portion.

Example 51 includes a computing device comprising a display portion comprising a display and a camera; and a mirror assembly comprising a mirror, the mirror assembly having an open configuration and a closed configuration, wherein the mirror assembly is positioned behind the display inside the display portion in the closed configuration and at least part of the mirror assembly is positioned outside the display portion in the open configuration, wherein the mirror is positionable in a field of view of the camera to change a direction of the field of view of the camera when the mirror assembly is in the open configuration.

Example 52 includes the subject matter of Example 51, and further including an actuator to move the mirror assembly between the closed configuration and the open configuration.

Example 53 includes the subject matter of any of Examples 51 and 52, and wherein the actuator is a shape memory alloy spring.

Example 54 includes the subject matter of any of Examples 51-53, and wherein the computing device is configured to sense a drawing board placed on top of a base portion connected to the display portion, wherein the computing device is configured to pass current through the shape memory alloy spring to activate the actuator when the drawing board is sensed on top of the base portion.

Example 55 includes the subject matter of any of Examples 51-54, and wherein the actuator is configured to move the mirror assembly between the closed configuration and the open configuration when a user presses on the mirror assembly.

Example 56 includes the subject matter of any of Examples 51-55, and wherein the mirror assembly comprises a living hinge.

Example 57 includes the subject matter of any of Examples 51-56, and wherein the mirror assembly comprises a layer of polypropylene that forms at least part of the living hinge.

Example 58 includes the subject matter of any of Examples 51-57, and further including one or more protrusions positioned at one edge of the display portion, wherein the one or more protrusions are configured to hold the mirror assembly in place when the mirror assembly is in the open position.

Example 59 includes the subject matter of any of Examples 51-58, and further including a drawing board, wherein the drawing board includes one or more magnets, further comprising a sensor to sense the one or more magnets in the drawing board when the drawing board is placed on top of a base portion connected to the display portion.

The invention claimed is:

1. A computing device comprising:
input controller circuitry to:
receive video data of a user in a video conference; and
receive audio data of the user in the video conference;
audiovisual analyzer circuitry to perform an analysis of the video data and the audio data, wherein to perform an analysis of the video data and the audio data comprises to perform an analysis of the video data to determine that the user is talking to a person in a background of the video data; and
audiovisual framer circuitry to determine which portion of the video data or the audio data to transmit based on the analysis of the video data and the audio data, wherein to determine which portion of the video data or the audio data to transmit comprises to determine not to transmit a portion of the audio data corresponding to the user talking to the person in the background of the video data.

2. The computing device of claim 1, wherein to perform an analysis of the video data and the audio data comprises to monitor mannerisms of the user in the video conference,
wherein to determine which portion of the video data or the audio data to transmit comprises to determine which portion of the video data or the audio data to transmit based on the mannerisms of the user in the video conference.

3. The computing device of claim 1, wherein to perform an analysis of the video data and the audio data comprises to determine that the user is eating,
wherein to determine which portion of the video data or the audio data to transmit comprises to determine which portion of the video data or the audio data to transmit based on the determination that the user is eating.

4. The computing device of claim 1, wherein to perform the analysis of the video data and the audio data comprises to:
determine that a first user in the video data is speaking and that a second user in the video data is not speaking; and
perform sound localization on the audio data to generate a localized sound corresponding to the first user that is speaking,
wherein to determine which portion of the video data or the audio data to transmit comprises to determine that the localized sound corresponding to the first user that is speaking is to be transmitted.

5. The computing device of claim 1, wherein to perform an analysis of the video data and the audio data comprises to determine that the user has stood up,
wherein to determine which portion of the video data or the audio data to transmit comprises to determine that no video is to be transmitted based on the determination that the user has stood up.

6. The computing device of claim 1, wherein to perform an analysis of the video data and the audio data comprises to determine that a person has entered an environment behind the user,
wherein to determine which portion of the video data or the audio data to transmit comprises to determine that video showing the person that entered the environment behind the user should not be transmitted.

7. The computing device of claim 1, wherein to perform an analysis of the video data and the audio data comprises to determine a gaze of the user,
wherein to determine which portion of the video data or the audio data to transmit comprises to determine which portion of the video data or the audio data to transmit based on a gaze of the user.

8. A method comprising:
receiving, by a computing device, video data of a user in a video conference;
receiving, by the computing device, audio data of the user in the video conference;
performing, by the computing device, an analysis of the video data and the audio data, wherein performing the analysis of the video data and the audio data comprises performing an analysis of the video data to determine that the user is not facing a camera used to capture the video data; and
determining, by the computing device, which portion of the video data or the audio data to transmit based on the analysis of the video data and the audio data, wherein determining which portion of the video data or the audio data to transmit comprises determining not to transmit a portion of the audio data corresponding to the user not facing the camera.

9. The method of claim 8, wherein performing an analysis of the video data and the audio data comprises monitoring mannerisms of the user in the video conference,
wherein determining which portion of the video data or the audio data to transmit comprises determining which portion of the video data or the audio data to transmit based on the mannerisms of the user in the video conference.

10. The method of claim 8, wherein performing an analysis of the video data and the audio data comprises determining that the user is eating,
wherein determining which portion of the video data or the audio data to transmit comprises determining which portion of the video data or the audio data to transmit based on the determination that the user is eating.

11. The method of claim 8, wherein performing an analysis of the video data and the audio data comprises determining that a first user in the video data is speaking and that a second user in the video data is not speaking,
wherein determining which portion of the video data or the audio data to transmit comprises determining that a portion of the video data with the first user that is speaking is to be transmitted.

12. The method of claim 11, wherein performing the analysis of the video data and the audio data comprises performing sound localization on the audio data to generate a localized sound corresponding to the first user that is speaking,
wherein determining which portion of the video data or the audio data to transmit comprises determining that the localized sound corresponding to the first user that is speaking is to be transmitted.

13. The method of claim 8, wherein performing an analysis of the video data and the audio data comprises determining that the user has stood up,
wherein determining which portion of the video data or the audio data to transmit comprises determining that no video is to be transmitted based on the determination that the user has stood up.

14. One or more non-transitory computer-readable media comprising a plurality of instructions stored thereon that, when executed, causes a computing device to:
receive video data of a user in a video conference;
receive audio data of the user in the video conference;
perform an analysis of the video data and the audio data, wherein to perform the analysis of the video data and the audio data comprises to perform an analysis of the video data to determine that the user is not facing a camera used to capture the video data; and
determine which portion of the video data or the audio data to transmit based on the analysis of the video data and the audio data, wherein to determine which portion of the video data or the audio data to transmit comprises to determine not to transmit a portion of the audio data corresponding to the user not facing the camera.

15. The one or more non-transitory computer-readable media of claim 14, wherein to perform an analysis of the video data and the audio data comprises to monitor mannerisms of the user in the video conference,
wherein to determine which portion of the video data or the audio data to transmit comprises to determine which portion of the video data or the audio data to transmit based on the mannerisms of the user in the video conference.

16. The one or more non-transitory computer-readable media of claim 14, wherein to perform an analysis of the video data and the audio data comprises to determine that the user is eating,
wherein to determine which portion of the video data or the audio data to transmit comprises to determine which portion of the video data or the audio data to transmit based on the determination that the user is eating.

17. The one or more non-transitory computer-readable media of claim 14, wherein to perform an analysis of the video data and the audio data comprises to determine that a first user in the video data is speaking and that a second user in the video data is not speaking,
wherein to determine which portion of the video data or the audio data to transmit comprises to determine that a portion of the video data with the first user that is speaking is to be transmitted.

18. The one or more non-transitory computer-readable media of claim 17, wherein to perform the analysis of the video data and the audio data comprises to perform sound localization on the audio data to generate a localized sound corresponding to the first user that is speaking,
wherein to determine which portion of the video data or the audio data to transmit comprises to determine that the localized sound corresponding to the first user that is speaking is to be transmitted.

19. The one or more non-transitory computer-readable media of claim 14, wherein to perform an analysis of the video data and the audio data comprises to determine that the user has stood up,
wherein to determine which portion of the video data or the audio data to transmit comprises to determine that no video is to be transmitted based on the determination that the user has stood up.

20. The computing device of claim 1, wherein to perform an analysis of the video data and the audio data comprises to perform an analysis of the video data to determine that the user is not facing a camera used to capture the video data, wherein to determine which portion of the video data or the audio data to transmit comprises to determine not to transmit a portion of the audio data corresponding to the user not facing the camera.

21. The computing device of claim 1, wherein to perform an analysis of the video data and the audio data comprises to perform an analysis of the video data to determine that an event has occurred in the background of the video data, wherein to determine which portion of the video data or the audio data to transmit comprises to frame the user more tightly in response to a determination that the event has occurred in the background of the video data, thereby at least partially cropping out the event from the video data.

22. The computing device of claim 1, wherein to perform the analysis of the video data and the audio data comprises to determine that a first user in the video data is speaking and that a second user in the video data is not speaking,
   wherein to determine which portion of the video data or the audio data to transmit comprises to frame the first user in the video data that is speaking and at least partially crop out the second user in the video data that is not speaking.

23. The computing device of claim 1, wherein to determine which portion of the video data or the audio data to transmit based on the determination that the user is eating comprises cropping out the user eating from the video data.

\* \* \* \* \*